United States Patent
Tanaka et al.

(10) Patent No.: US 8,125,857 B2
(45) Date of Patent: Feb. 28, 2012

(54) HEAT-ASSISTED MAGNETIC RECORDING HEAD INCLUDING PLASMON GENERATOR

(75) Inventors: Kosuke Tanaka, Tokyo (JP); Daisuke Miyauchi, Tokyo (JP); Susumu Aoki, Tokyo (JP); Tetsuya Roppongi, Tokyo (JP); Tsutomu Chou, Tokyo (JP); Shinji Hara, Tokyo (JP); Eiji Komura, Tokyo (JP)

(73) Assignee: TDK Corporation, Tokyo (JP)

( * ) Notice: Subject to any disclaimer, the term of this patent is extended or adjusted under 35 U.S.C. 154(b) by 122 days.

(21) Appl. No.: 12/728,600

(22) Filed: Mar. 22, 2010

(65) Prior Publication Data
US 2011/0228419 A1    Sep. 22, 2011

(51) Int. Cl.
G11B 11/00 (2006.01)
(52) U.S. Cl. .................. 369/13.33; 369/112.27
(58) Field of Classification Search .......... 369/13.02, 369/13.03, 13.13, 13.12, 13.33, 13.24, 13.32, 369/112.27; 360/59, 245.3; 385/31, 129
See application file for complete search history.

(56) References Cited

U.S. PATENT DOCUMENTS

| | | | |
|---|---|---|---|
| 7,221,826 B2 | 5/2007 | Hanashima et al. | |
| 7,454,095 B2 | 11/2008 | Baehr-Jones et al. | |
| 7,529,158 B2 | 5/2009 | Matsumoto et al. | |
| 7,821,732 B2 * | 10/2010 | Komura et al. | 360/59 |
| 7,911,882 B2 * | 3/2011 | Shimazawa et al. | 369/13.33 |
| 8,000,178 B2 * | 8/2011 | Shimazawa et al. | 369/13.33 |
| 2007/0139818 A1 | 6/2007 | Shimazawa et al. | |
| 2009/0168220 A1 | 7/2009 | Komura et al. | |
| 2011/0205860 A1* | 8/2011 | Chou et al. | 369/13.24 |
| 2011/0216634 A1 | 9/2011 | Chou et al. | |
| 2011/0228420 A1 | 9/2011 | Hara et al. | |

FOREIGN PATENT DOCUMENTS
JP    A-2004-302241    10/2004

OTHER PUBLICATIONS
Sep. 21, 2011 Notice of Allowance issued in U.S. Appl. No. 12/710,129.
Sep. 15, 2011 Office Action issued in U.S. Appl. No. 12/728,890.
Sep. 19, 2011 Office Action issued in U.S. Appl. No. 12/719,496.
U.S. Appl. No. 12/617,853, filed Nov. 13, 2009 to Komura et al.
U.S. Appl. No. 12/385,447, filed Apr. 8, 2009 to Sasaki et al.
U.S. Appl. No. 12/557,078, filed Sep. 10, 2009 to Miyauchi et al.
U.S. Appl. No. 12/585,150, filed Sep. 4, 2009 to Sasaki et al.

* cited by examiner

*Primary Examiner* — Ali Neyzari
(74) *Attorney, Agent, or Firm* — Oliff & Berridge, PLC

(57) ABSTRACT

A plasmon generator has an outer surface including a propagation edge, and has a near-field light generating part lying at an end of the propagation edge and located in a medium facing surface. The propagation edge faces an evanescent light generating surface of a waveguide's core with a predetermined distance therebetween and extends in a direction perpendicular to the medium facing surface. The propagation edge is arc-shaped in a cross section parallel to the medium facing surface. The plasmon generator includes a shape changing portion in which a radius of curvature of the propagation edge in the cross section parallel to the medium facing surface continuously decreases with decreasing distance to the medium facing surface.

9 Claims, 33 Drawing Sheets

HEAT-ASSISTED MAGNETIC RECORDING HEAD INCLUDING PLASMON GENERATOR

BACKGROUND OF THE INVENTION

1. Field of the Invention

The present invention relates to a heat-assisted magnetic recording head including a plasmon generator for use in heat-assisted magnetic recording where a magnetic recording medium is irradiated with near-field light to lower the coercivity of the magnetic recording medium for data writing.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) intended for reading and a write head including an induction-type electromagnetic transducer intended for writing are stacked on a substrate. In a magnetic disk drive, the thin-film magnetic head is mounted on a slider that flies slightly above the surface of the magnetic recording medium.

Magnetic recording media are discrete media each made of an aggregate of magnetic fine particles, each magnetic fine particle forming a single-domain structure. A single recording bit of a magnetic recording medium is composed of a plurality of magnetic fine particles. For improved recording density, it is necessary to reduce asperities at the borders between adjoining recording bits. To achieve this, the magnetic fine particles must be made smaller. However, making the magnetic fine particles smaller causes the problem that the thermal stability of magnetization of the magnetic fine particles decreases with decreasing volume of the magnetic fine particles. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the foregoing problems, there has been proposed a technique so-called heat-assisted magnetic recording. This technique uses a magnetic recording medium having high coercivity. When writing data, a magnetic field and heat are simultaneously applied to the area of the magnetic recording medium where to write data, so that the area rises in temperature and drops in coercivity for data writing. Hereinafter, a magnetic head for use in heat-assisted magnetic recording will be referred to as a heat-assisted magnetic recording head.

In heat-assisted magnetic recording, near-field light is typically used as a means for applying heat to the magnetic recording medium. A commonly known method for generating near-field light is to use a near-field optical probe or so-called plasmon antenna, which is a piece of metal that generates near-field light from plasmons excited by irradiation with light.

However, the plasmon antenna which generates near-field light by direct irradiation with light is known to exhibit very low efficiency of transformation of the applied light into near-field light. The energy of the light applied to the plasmon antenna is mostly reflected off the surface of the plasmon antenna, or transformed into thermal energy and absorbed by the plasmon antenna. The plasmon antenna is small in volume since the size of the plasmon antenna is set to be smaller than or equal to the wavelength of the light. The plasmon antenna therefore shows a significant increase in temperature when it absorbs the thermal energy.

Such a temperature increase makes the plasmon antenna expand in volume and protrude from a medium facing surface, which is the surface of the heat-assisted magnetic recording head to face the magnetic recording medium. This causes an end of the read head located in the medium facing surface to get farther from the magnetic recording medium, thereby causing the problem that a servo signal cannot be read during write operations.

There has been known a technique in which a dielectric and a metal are arranged to face each other with a predetermined gap therebetween, and surface plasmons are excited on the metal by utilizing evanescent light that results from the total reflection of the light propagated through the dielectric at the surface of the dielectric. As a related technique, U.S. Pat. No. 7,454,095 discloses a technique in which a metal waveguide and a dielectric waveguide are arranged to face each other with a predetermined gap therebetween, and the metal waveguide is coupled with the dielectric waveguide in a surface plasmon mode. It is then conceivable to establish coupling between the light propagated through the waveguide's core and a plasmon generator, a piece of metal, in a surface plasmon mode through a buffer part so that surface plasmons are excited on the plasmon generator, instead of directly irradiating the plasmon generator with the light. According to such a technique, it is possible to transform the light propagated through the core into near-field light with high efficiency. Since the plasmon generator is not directly irradiated with the light propagated through the core, it is also possible to prevent the plasmon generator from excessively increasing in temperature.

The plasmon generator may be shaped to have an edge part that faces the outer surface of the core with a predetermined distance therebetween. An example of such a shape is a triangular-prism shape. Such a plasmon generator has a front end face that is located in the medium facing surface. The front end face includes a tip that lies at an end of the edge part to form a near-field light generating part. In the plasmon generator, surface plasmons are excited on the edge part through coupling with the evanescent light that occurs from the outer surface of the core. The surface plasmons are propagated along the edge part to the near-field light generating part located in the medium facing surface, and the near-field light generating part generates near-field light based on the surface plasmons. With such a plasmon generator, it is possible to propagate the surface plasmons excited on the edge part to the near-field light generating part with high efficiency.

In the plasmon generator actually fabricated, the edge part is rounded in a microscopic view. Therefore, the edge part in cross section parallel to the medium facing surface and the tip in the front end face both have an arc shape in a microscopic view, although they are shaped like a pointed edge in a macroscopic view. In order to increase the recording density of a magnetic recording device, it is preferred that the near-field light have a smaller spot diameter. For that purpose, it is effective to minimize the radius of curvature of the edge part in cross section parallel to the medium facing surface and that of the tip in the front end face. Reducing the radius of curvature of the edge part in cross section parallel to the medium facing surface, however, causes the problem of reducing surface plasmons to be excited on the edge part, thereby causing a drop in the use efficiency of the light that is propagated through the core.

OBJECT AND SUMMARY OF THE INVENTION

It is an object of the present invention to provide a heat-assisted magnetic recording head that allows efficient use of light propagated through a waveguide's core and allows generation of near-field light having a small spot diameter from a plasmon generator, and to provide a head gimbal assembly and a magnetic recording device that each include such a heat-assisted magnetic recording head.

A heat-assisted magnetic recording head of the present invention includes: a medium facing surface that faces a magnetic recording medium; a magnetic pole that has an end face located in the medium facing surface and produces a write magnetic field for writing data on the magnetic recording medium; a waveguide including a core and a clad, the core propagating light; and a plasmon generator.

The core has an evanescent light generating surface that generates evanescent light based on the light propagated through the core. The plasmon generator has an outer surface including a propagation edge, and has a near-field light generating part lying at an end of the propagation edge and located in the medium facing surface. The propagation edge faces the evanescent light generating surface with a predetermined distance therebetween and extends in a direction perpendicular to the medium facing surface. The propagation edge is arc-shaped in a cross section parallel to the medium facing surface. A surface plasmon is excited on the propagation edge through coupling with the evanescent light generated from the evanescent light generating surface. The surface plasmon is propagated along the propagation edge to the near-field light generating part. The near-field light generating part generates near-field light based on the surface plasmon. The plasmon generator includes a shape changing portion in which the radius of curvature of the propagation edge in the cross section parallel to the medium facing surface continuously decreases with decreasing distance to the medium facing surface.

In the heat-assisted magnetic recording head of the present invention, the radius of curvature of the propagation edge at the medium facing surface may be equal to a minimum value of the radius of curvature of the propagation edge in the shape changing portion. In such a case, the shape changing portion may have an end located in the medium facing surface.

In the heat-assisted magnetic recording head of the present invention, the outer surface of the plasmon generator may further include a front end face located in the medium facing surface. The front end face may include a tip that forms the near-field light generating part. In such a case, the plasmon generator may have a V-shaped portion including the propagation edge and the front end face. The V-shaped portion is V-shaped in cross section parallel to the medium facing surface. The magnetic pole may include a portion accommodated in the V-shaped portion.

In the heat-assisted magnetic recording head of the present invention, in the case where the plasmon generator has the V-shaped portion, the plasmon generator may further have a bottom part that is shaped like a plate and faces the evanescent light generating surface, and two sidewall parts that are each shaped like a plate. The two sidewall parts are located farther from the evanescent light generating surface than is the bottom part and are connected to opposite ends of the bottom part in a direction parallel to the medium facing surface and the evanescent light generating surface. The bottom part has a width that decreases with decreasing distance to the medium facing surface, the width being in the direction parallel to the medium facing surface and the evanescent light generating surface. The distance between the two sidewall parts in the direction parallel to the medium facing surface and the evanescent light generating surface increases with increasing distance from the evanescent light generating surface, and decreases with decreasing distance to the medium facing surface. The bottom part and the two sidewall parts are located farther from the medium facing surface than is the V-shaped portion, such that the bottom part and the two sidewall parts are continuous with the V-shaped portion. The magnetic pole may include a portion that is accommodated in a space formed by the bottom part and the two sidewall parts so as to be in contact with the bottom part and the two sidewall parts.

The heat-assisted magnetic recording head of the present invention may further include a buffer part that is located between the evanescent light generating surface and the propagation edge and has a refractive index lower than that of the core.

A head gimbal assembly of the present invention includes: the heat-assisted magnetic recording head of the present invention; and a suspension that supports the heat-assisted magnetic recording head. A magnetic recording device of the present invention includes: a magnetic recording medium; the heat-assisted magnetic recording head of the present invention; and a positioning device that supports the heat-assisted magnetic recording head and positions the same with respect to the magnetic recording medium.

In the heat-assisted magnetic recording head, the head gimbal assembly, and the magnetic recording device of the present invention, a surface plasmon is excited on the propagation edge of the plasmon generator through coupling with the evanescent light generated from the evanescent light generating surface of the core of the waveguide. The surface plasmon is propagated along the propagation edge to the near-field light generating part. The near-field light generating part generates near-field light based on the surface plasmon. In the present invention, the plasmon generator includes the shape changing portion in which the radius of curvature of the propagation edge in the cross section parallel to the medium facing surface continuously decreases with decreasing distance to the medium facing surface. The present invention thus makes it possible to use the light propagated through the core of the waveguide with high efficiency and to generate near-field light having a small spot diameter from the plasmon generator.

Other and further objects, features and advantages of the present invention will appear more fully from the following description.

DETAILED DESCRIPTION OF THE PREFERRED EMBODIMENTS

First Embodiment

Figure 6:
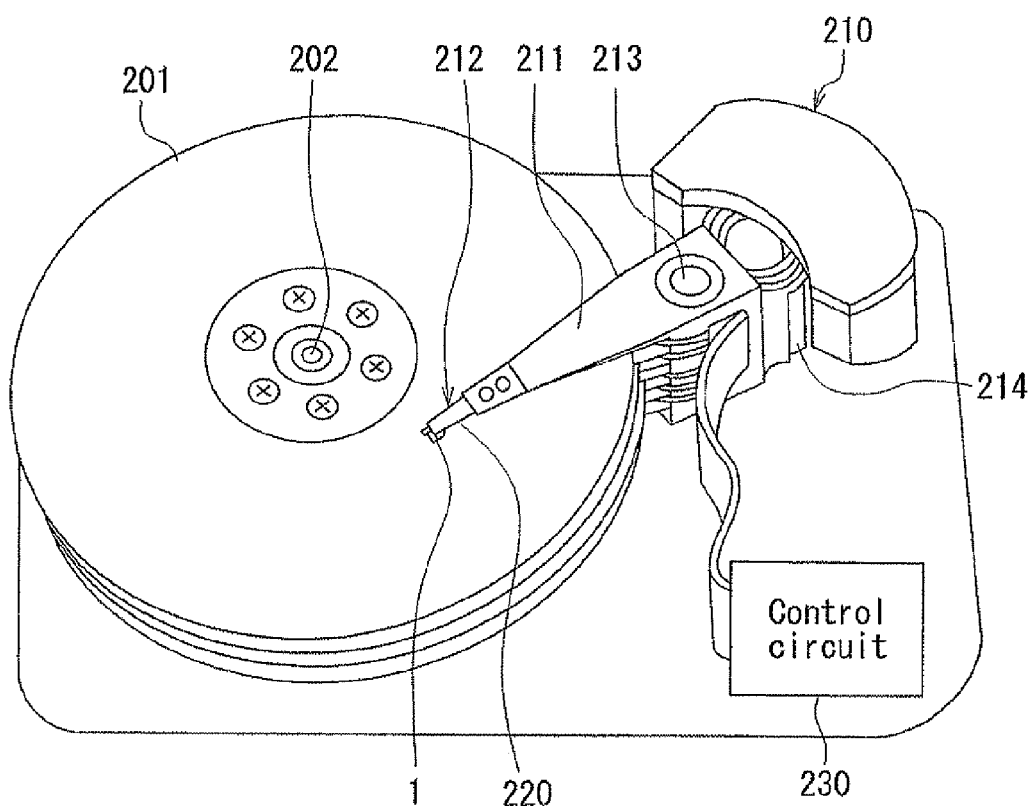
FIG. 6 is a perspective view showing a magnetic recording device according to the first embodiment of the invention.

Preferred embodiments of the present invention will now be described in detail with reference to the drawings. First, reference is made to FIG. 6 to describe a magnetic disk drive as a magnetic recording device according to a first embodiment of the invention. As shown in FIG. 6, the magnetic disk drive includes a plurality of magnetic disks 201 as a plurality of magnetic recording media, and a spindle motor 202 for rotating the plurality of magnetic disks 201. The magnetic disks 201 of the present embodiment are for use in perpendicular magnetic recording. Each magnetic disk 201 has such a structure that a soft magnetic backing layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a heat-assisted magnetic recording head 1 according to the present embodiment, and a suspension 220 that supports the heat-assisted magnetic recording head 1.

The assembly carriage device 210 is a device for positioning each heat-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single heat-assisted magnetic recording head 1.

The magnetic disk drive further includes a control circuit 230 that controls the read/write operations of the heat-assisted magnetic recording heads 1 and also controls the light emitting operation of a laser diode serving as a light source for generating laser light for heat-assisted magnetic recording described later.

Figure 7:
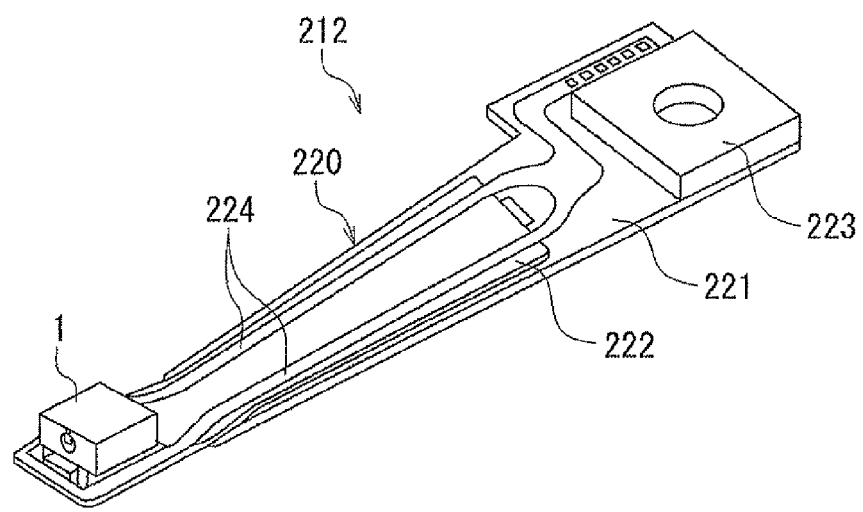
FIG. 7 is a perspective view showing a head gimbal assembly according to the first embodiment of the invention.

FIG. 7 is a perspective view showing the head gimbal assembly 212 of FIG. 6. As previously described, the head gimbal assembly 212 includes the heat-assisted magnetic recording head 1 and the suspension 220. The suspension 220 has a load beam 221, a flexure 222 fixed to the load beam 221 and having flexibility, a base plate 223 provided at the base part of the load beam 221, and a wiring member 224 provided on the load beam 221 and the flexure 222. The wiring member 224 includes a plurality of leads. The heat-assisted magnetic recording head 1 is fixed to the flexure 222 at the distal end of the suspension 220 such that the head 1 faces the surface of the magnetic disk 201 with a predetermined spacing (flying height). One end of the wiring member 224 is electrically connected to a plurality of terminals of the heat-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to the one having the configuration shown in FIG. 7. For example, the head gimbal assembly of the present invention may have an IC chip for driving the head that is mounted somewhere along the suspension 220.

Figure 8:
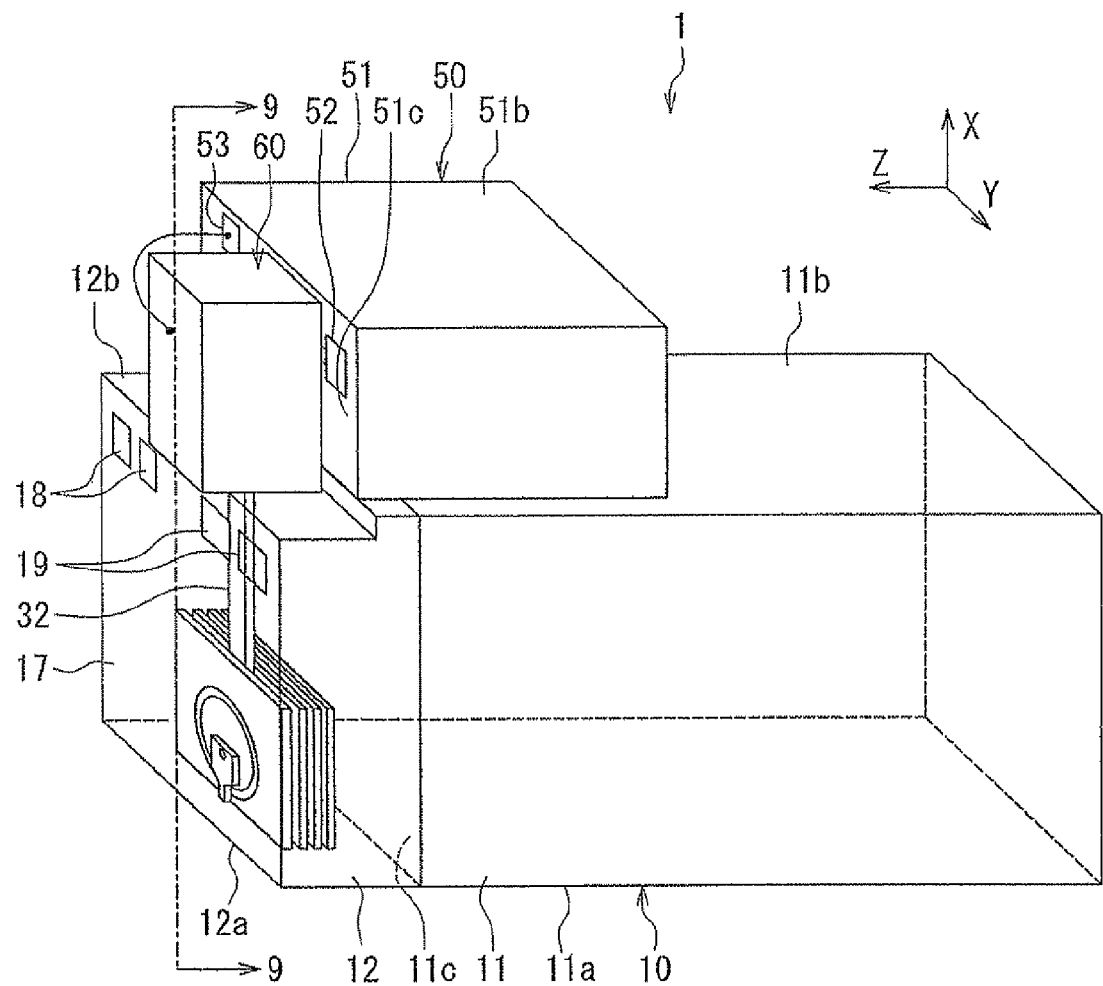
FIG. 8 is a perspective view showing the heat-assisted magnetic recording head according to the first embodiment of the invention.
Figure 9:
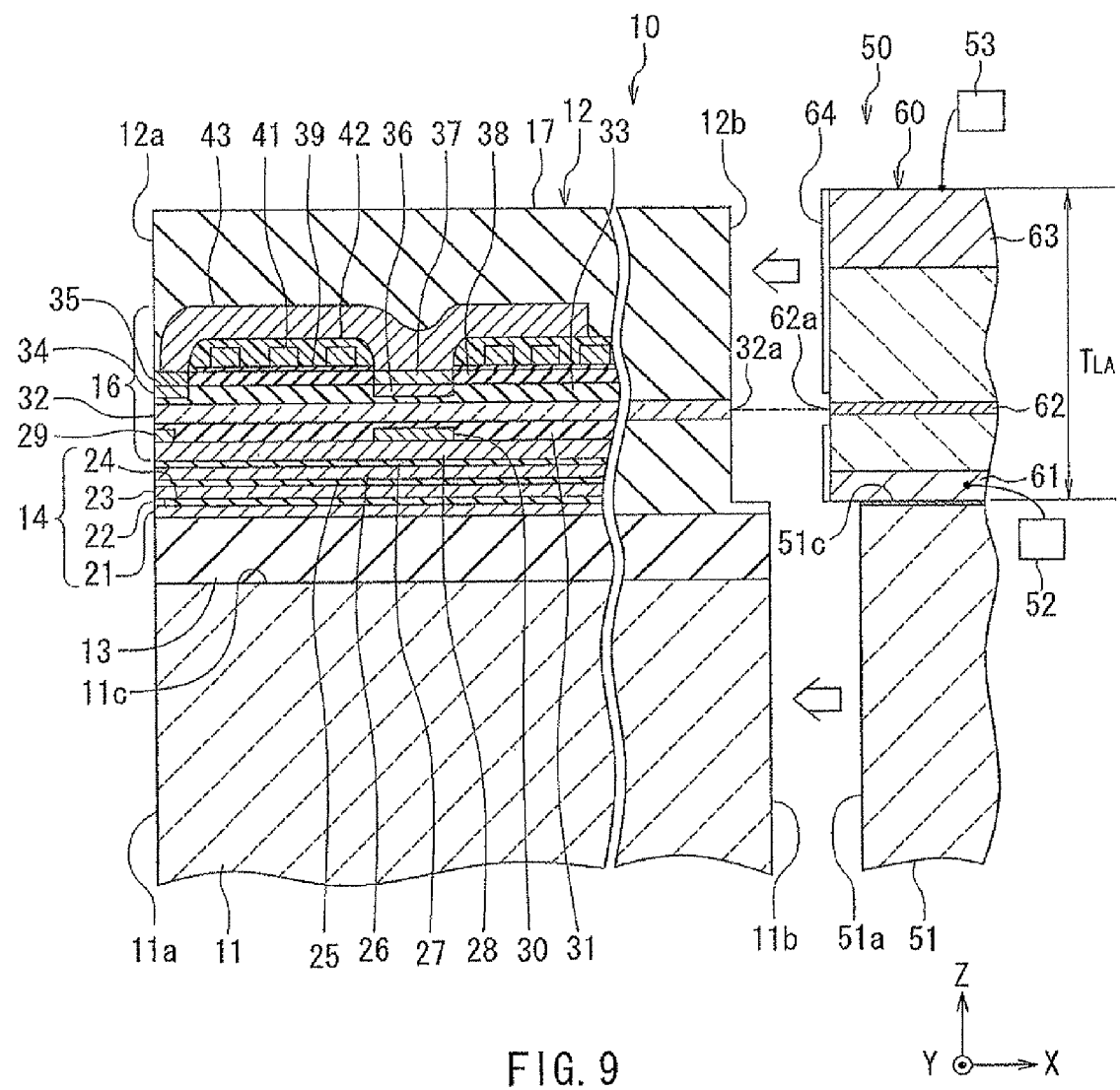
FIG. 9 shows a cross section taken along line 9-9 of FIG. 8.
Figure 10:
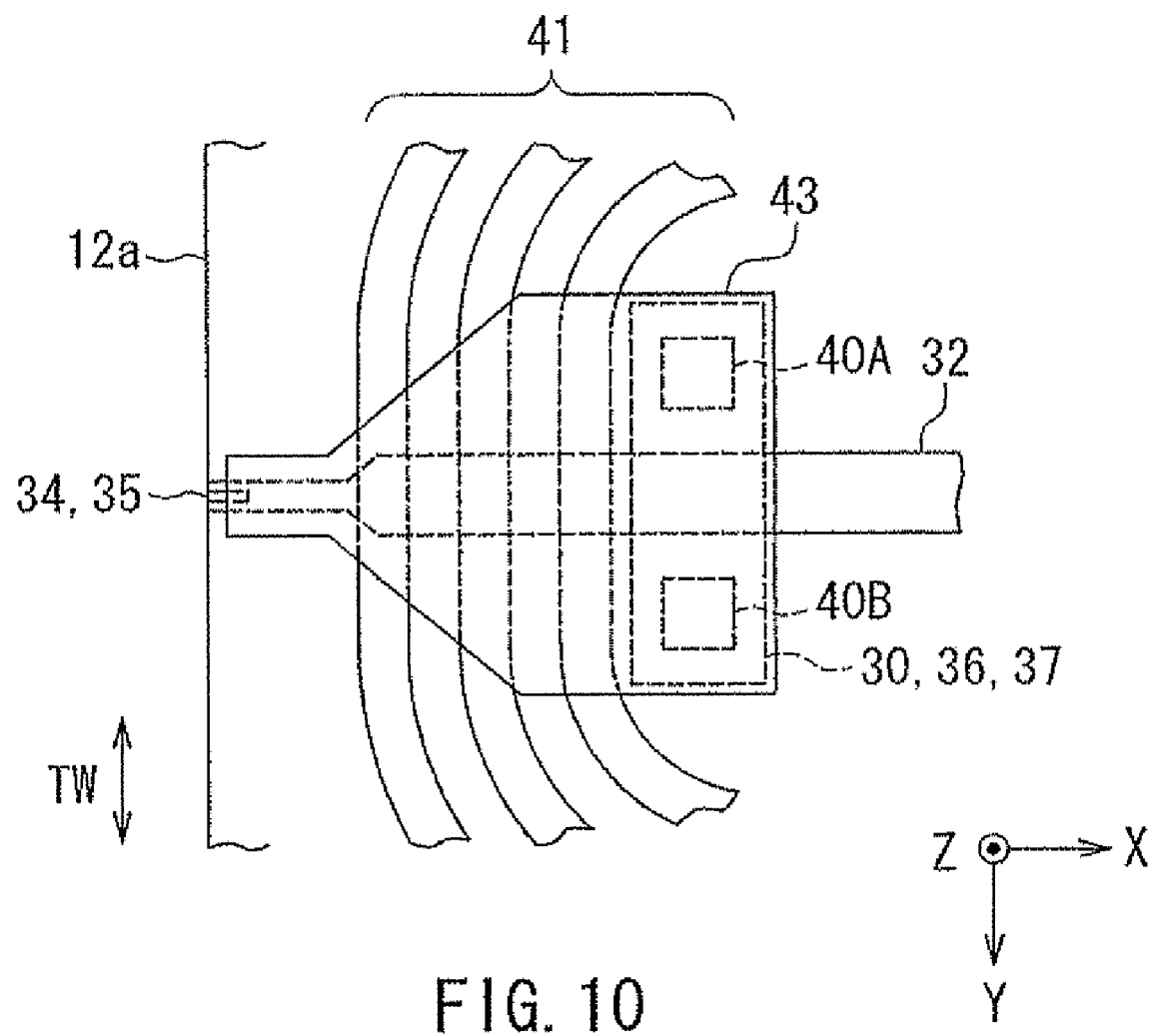
FIG. 10 is a plan view showing a part of a head unit of the heat-assisted magnetic recording head according to the first embodiment of the invention.

The configuration of the heat-assisted magnetic recording head 1 according to the present embodiment will now be described with reference to FIG. 8 to FIG. 10. FIG. 8 is a perspective view of the heat-assisted magnetic recording head 1. FIG. 9 shows a cross section taken along line 9-9 of FIG. 8. FIG. 10 is a plan view showing a part of a head unit of the heat-assisted magnetic recording head. The heat-assisted magnetic recording head 1 includes a slider 10 and a light source unit 50. FIG. 9 shows the state where the slider 10 and the light source unit 50 are separated from each other.

The slider 10 includes a slider substrate 11 and a head unit 12. The slider substrate 11 is rectangular-solid-shaped and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces that connect the medium facing surface 11a to the rear surface 11b. One of the four surfaces that connect the medium facing surface 11a to the rear surface 11b is an element-forming surface 11c. The element-forming surface 11c is perpendicular to the medium facing surface 11a. The head unit 12 is disposed on the element-forming surface 11c. The medium facing surface 11a is processed so as to obtain an appropriate flying height of the slider 10 with respect to the magnetic disk 201. The head unit 12 has a medium facing surface 12a that faces the magnetic disk 201, and a rear surface 12b opposite to the medium facing surface 12a. The medium facing surface 12a is parallel to the medium facing surface 11a of the slider substrate 11.

Where the components of the head unit 12 are concerned, with respect to a reference position, a position located in a direction that is perpendicular to the element-forming surface 11c and gets away from the element-forming surface 11c is defined as "above", and a position located in a direction opposite to the above-mentioned direction is defined as "below". Where the layers included in the head unit 12 are concerned, the surface closer to the element-forming surface 11c is defined as a "bottom surface," and the surface farther from the element-forming surface 11c as a "top surface."

Moreover, X direction, Y direction, Z direction, −X direction, −Y direction, and −Z direction will be defined as follows. The X direction is a direction perpendicular to the medium facing surface 11a and heading from the medium facing surface 11a toward the rear surface 11b. The Y direction is a direction parallel to the medium facing surface 11a and the element-forming surface 11c and heading from the back side to the front side of FIG. 9. The Z direction is a direction perpendicular to the element-forming surface 11c and getting away from the element-forming surface 11c. The −X direction, the −Y direction, and the −Z direction are opposite to the X direction, the Y direction, and the Z direction, respectively. As viewed from the slider 10, the magnetic disk 201 moves in the Z direction. The slider 10 has an air inflow end (a leading end) at the end of the medium facing surface 11a in the −Z direction. The slider 10 has an air outflow end (a trailing end) at the end of the medium facing surface 12a in the Z direction. Track width direction TW is a direction parallel to the Y direction.

The light source unit 50 includes a laser diode 60 serving as a light source for emitting laser light, and a rectangular-solid-shaped support member 51 that supports the laser diode 60. The support member 51 is made of, for example, a ceramic material such as aluminum oxide-titanium carbide ($Al_2O_3$—TiC). The support member 51 has a bonding surface 51a, a rear surface 51b opposite to the bonding surface 51a, and four surfaces that connect the bonding surface 51a to the rear surface 51b. One of the four surfaces that connect the bonding surface 51a to the rear surface 51b is a light-source-mounting surface 51c. The bonding surface 51a is the surface to be bonded to the rear surface 11b of the slider substrate 11. The light-source-mounting surface 51c is perpendicular to the bonding surface 51a and parallel to the element-forming surface 11c. The laser diode 60 is mounted on the light-source-mounting surface 51c. The support member 51 may have the function of a heat sink for dissipating heat generated by the laser diode 60, in addition to the function of supporting the laser diode 60.

As shown in FIG. 9, the head unit 12 includes an insulating layer 13 disposed on the element-forming surface 11c, and also includes a read head 14, a write head 16, and a protection layer 17 that are stacked in this order on the insulating layer 13. The insulating layer 13 and the protection layer 17 are each made of an insulating material such as $Al_2O_3$ (hereinafter, also referred to as alumina).

The read head 14 includes: a bottom shield layer 21 disposed on the insulating layer 13; an MR element 22 disposed on the bottom shield layer 21; a top shield layer 23 disposed on the MR element 22; and an insulating layer 24 disposed between the bottom shield layer 21 and the top shield layer 23 around the MR element 22. The bottom shield layer 21 and the top shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction nearly parallel to the plane of layers constituting the GMR element or the current-perpendicular-to-plane (CPP) type in which the sense current is fed in a direction nearly perpendicular to the plane of layers constituting the GMR element. If the MR element 22 is a TMR element or a CPP-type GMR element, the bottom shield layer 21 and the top shield layer 23 may also function as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head unit 12 further includes: an insulating layer 25 disposed on the top shield layer 23; a middle shield layer 26 disposed on the insulating layer 25; and an insulating layer 27 disposed on the middle shield layer 26. The middle shield layer 26 has the function of shielding the MR element 22 from a magnetic field produced in the write head 16. The insulating layers 25 and 27 are each made of an insulating material such as alumina. The middle shield layer 26 is made of a soft magnetic material. The insulating layer 25 and the middle shield layer 26 may be omitted.

The write head 16 of the present embodiment is for use in perpendicular magnetic recording. The write head 16 includes: a bottom yoke layer 28 disposed on the insulating layer 27; a bottom shield layer 29 disposed on the bottom yoke layer 28 in the vicinity of the medium facing surface 12a; and a coupling layer 30 disposed on the bottom yoke layer 28 at a position away from the medium facing surface 12a. The bottom yoke layer 28, the bottom shield layer 29, and the coupling layer 30 are each made of a soft magnetic material.

The write head 16 further includes a waveguide that includes a core 32 and a clad. The clad includes a clad layer 31 and a clad layer 33. The clad layer 31 covers the bottom yoke layer 28, the bottom shield layer 29, and the coupling layer 30. The core 32 lies on the clad layer 31. The clad layer 33 covers the clad layer 31 and the core 32. The core 32 extends in the direction perpendicular to the medium facing surface 12a (the X direction). The core 32 has an incident end 32a, an end face closer to the medium facing surface 12a, a top surface, a bottom surface, and two side surfaces. The end face of the core 32 may be located in the medium facing surface 12a or away from the medium facing surface 12a. FIG. 9 shows an example where the end face of the core 32 is located in the medium facing surface 12a. The core 32 propagates laser light that is emitted from the laser diode 60 and incident on the incident end 32a.

The core 32 is made of a dielectric material that transmits the laser light. Each of the clad layers 31 and 33 is made of a dielectric material and has a refractive index lower than that of the core 32. For example, if the laser light has a wavelength of 600 nm and the core 32 is made of $Al_2O_3$ (refractive index n=1.63), the clad layers 31 and 33 may be made of $SiO_2$ (refractive index n=1.46). If the core 32 is made of tantalum oxide such as $Ta_2O_5$ (n=2.16), the clad layers 31 and 33 may be made of $SiO_2$ (n=1.46) or $Al_2O_3$ (n=1.63).

The write head 16 further includes: a plasmon generator 34 disposed above the core 32 near the medium facing surface 12a; and a magnetic pole 35 disposed at such a position that the plasmon generator 34 is interposed between the magnetic pole 35 and the core 32. The plasmon generator 34 is made of a conductive material such as metal. For example, the plasmon generator 34 may be made of one element selected from the group consisting of Pd, Pt, Rh, Ir, Ru, Au, Ag, Cu, and Al, or of an alloy composed of two or more of these elements. The magnetic pole 35 is made of a soft magnetic material, or a magnetic metal material in particular. The shapes and layout of the core 32, the plasmon generator 34 and the magnetic pole 35 will be detailed later.

The write head 16 further includes: a coupling layer 36 embedded in the clad layer 33 at a position away from the medium facing surface 12a; and a coupling layer 37 lying on the coupling layer 36. The coupling layers 36 and 37 are located above the coupling layer 30. The coupling layers 36 and 37 are each made of a soft magnetic material.

As shown in FIG. 10, the write head 16 further includes two coupling portions 40A and 40B that are embedded in the clad layers 31 and 33. The coupling portions 40A and 40B are each made of a soft magnetic material. The coupling portions 40A and 40B are located on opposite sides of the core 32 in the track width direction TW, each at a distance from the core 32. The bottom surfaces of the coupling portions 40A and 40B are in contact with the top surface of the coupling layer 30. The top surfaces of the coupling portions 40A and 40B are in contact with the bottom surface of the coupling layer 36.

The write head 16 further includes: an insulating layer 38 disposed around the magnetic pole 35 and the coupling layer 37; an insulating layer 39 disposed on the insulating layer 38; a coil 41 disposed on the insulating layer 39; and an insulating layer 42 covering the coil 41. The insulating layers 38 and 39 are each made of an insulating material such as alumina. The coil 41 is planar spiral-shaped and wound around the coupling layer 37. The coil 41 produces a magnetic field corresponding to data to be written on the magnetic disk 201. The coil 41 is made of a conductive material such as copper. The insulating layer 42 is made of photoresist, for example.

The write head 16 further includes a top yoke layer 43. The top yoke layer 43 is disposed over the magnetic pole 35, the insulating layer 42 and the coupling layer 37. The top yoke layer 43 is in contact with the top surface of the magnetic pole 35 at a position near the medium facing surface 12a, and in contact with the top surface of the coupling layer 37 at a position away from the medium facing surface 12a.

In the write head 16, the bottom shield layer 29, the bottom yoke layer 28, the coupling layer 30, the coupling portions 40A and 40B, the coupling layers 36 and 37, the top yoke layer 43, and the magnetic pole 35 form a magnetic path for passing a magnetic flux corresponding to the magnetic field produced by the coil 41. The magnetic pole 35 has an end face located in the medium facing surface 12a, allows the magnetic flux corresponding to the magnetic field produced by the coil 41 to pass, and produces a write magnetic field for writing data on the magnetic disk 201 by means of the perpendicular magnetic recording system. The bottom shield layer 29 takes in a magnetic flux that is generated from the end face of the magnetic pole 35 and that expands in directions other than the direction perpendicular to the plane of the magnetic disk 201, and thereby prevents the magnetic flux from reaching the magnetic disk 201.

As shown in FIG. 9, the protection layer 17 is disposed to cover the write head 16. As shown in FIG. 8, the head unit 12 further includes a pair of terminals 18 that are disposed on the top surface of the protection layer 17 and electrically connected to the MR element 22, and another pair of terminals 19 that are disposed on the top surface of the protection layer 17 and electrically connected to the coil 41. These terminals 18 and 19 are electrically connected to the plurality of pad-shaped terminals of the wiring member 224 shown in FIG. 7.

The laser diode 60 may be a laser diode of InP type, GaAs type, GaN type or the like that is commonly used for such applications as communications, optical disc storage and material analysis. The laser diode 60 may emit laser light of any wavelength within the range of, for example, 375 nm to 1.7 μm. Specifically, the laser diode 60 may be an InGaAsP/InP quaternary mixed crystal laser diode having an emittable wavelength range of 1.2 to 1.67 μm, for example.

As shown in FIG. 9, the laser diode 60 has a multilayer structure including a lower electrode 61, an active layer 62, and an upper electrode 63. A reflecting layer 64 made of, for example, $SiO_2$ or $Al_2O_3$, is formed on two cleavage planes of the multilayer structure so as to excite oscillation by total reflection of light. The reflecting layer 64 has an opening for emitting laser light in the position of the active layer 62 including an emission center 62a. The laser diode 60 has a thickness $T_{LA}$ of around 60 to 200 μm, for example.

The light source unit 50 further includes a terminal 52 disposed on the light-source-mounting surface 51c and electrically connected to the lower electrode 61, and a terminal 53 disposed on the light-source-mounting surface 51c and electrically connected to the upper electrode 63. These terminals 52 and 53 are electrically connected to the plurality of pad-shaped terminals of the wiring member 224 shown in FIG. 7. When a predetermined voltage is applied to the laser diode 60 through the terminals 52 and 53, laser light is emitted from the emission center 62a of the laser diode 60. The laser light to be emitted from the laser diode 60 is preferably TM-mode polarized light whose electric field oscillates in a direction perpendicular to the plane of the active layer 62.

The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

The light source unit 50 is fixed to the slider 10 by bonding the bonding surface 51a of the support member 51 to the rear surface 11b of the slider substrate 11, as shown in FIG. 9. The laser diode 60 and the core 32 are positioned so that the laser light emitted from the laser diode 60 will be incident on the incident end 32a of the core 32.

Figure 1:
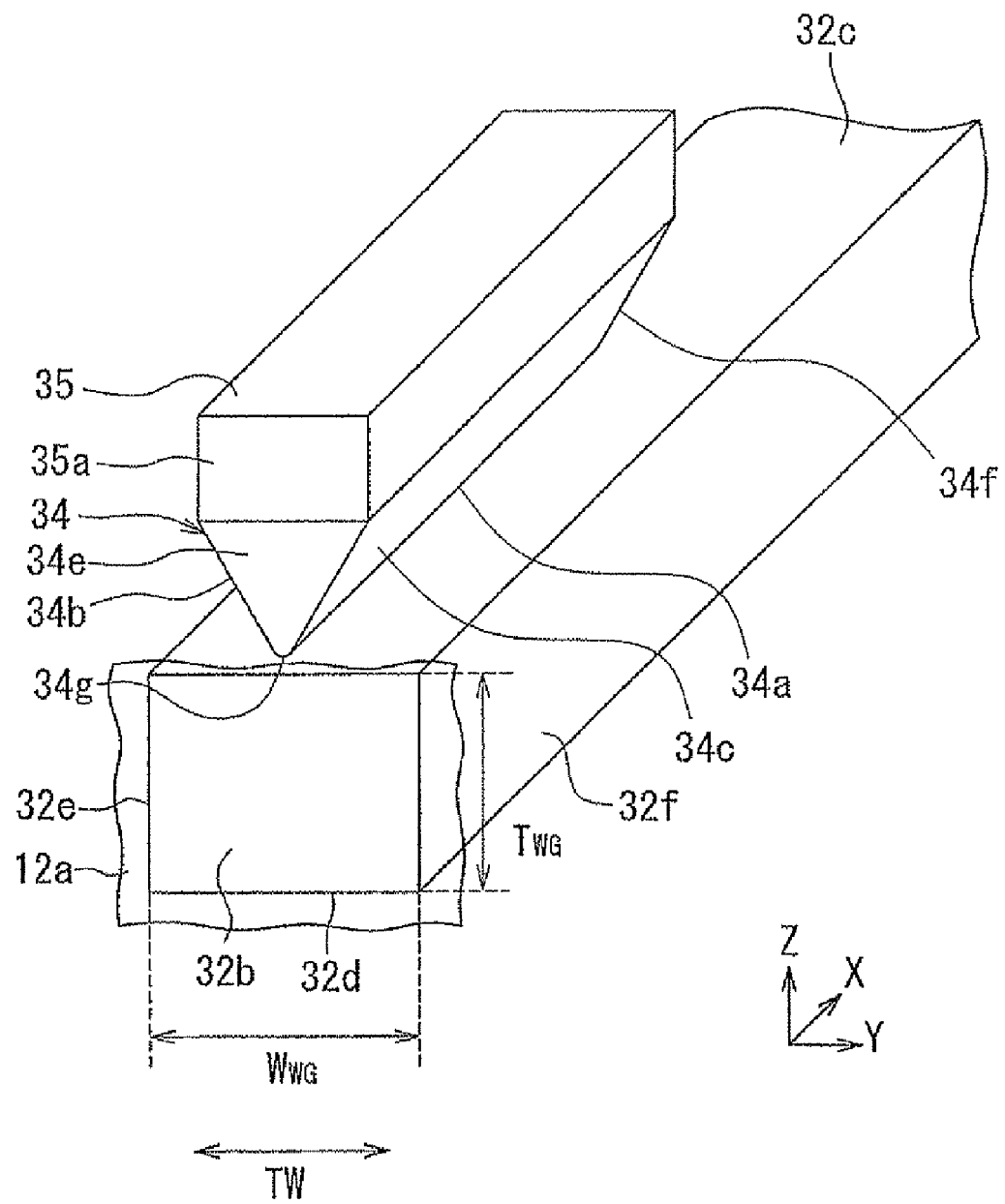
FIG. 1 is a perspective view showing a waveguide's core, a plasmon generator, and a magnetic pole of a heat-assisted magnetic recording head according to a first embodiment of the invention.
Figure 2:
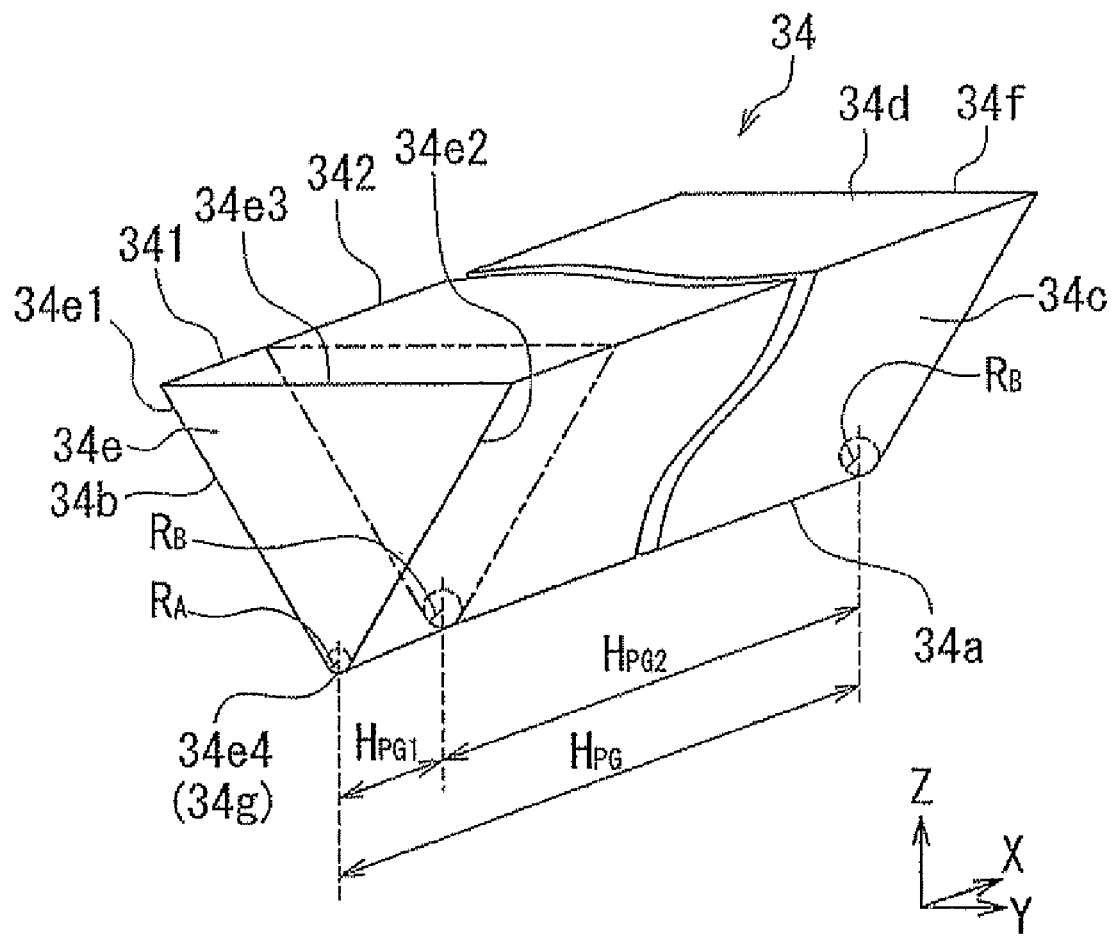
FIG. 2 is a perspective view showing the plasmon generator of FIG. 1.
Figure 3:
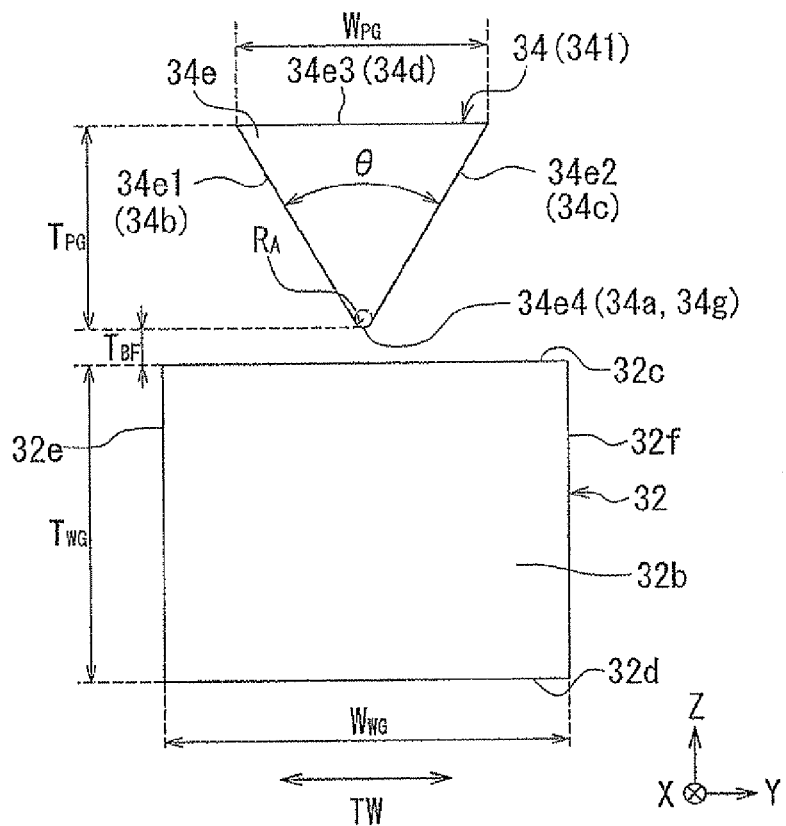
FIG. 3 is a front view of the core and the plasmon generator shown in FIG. 1.
Figure 4:
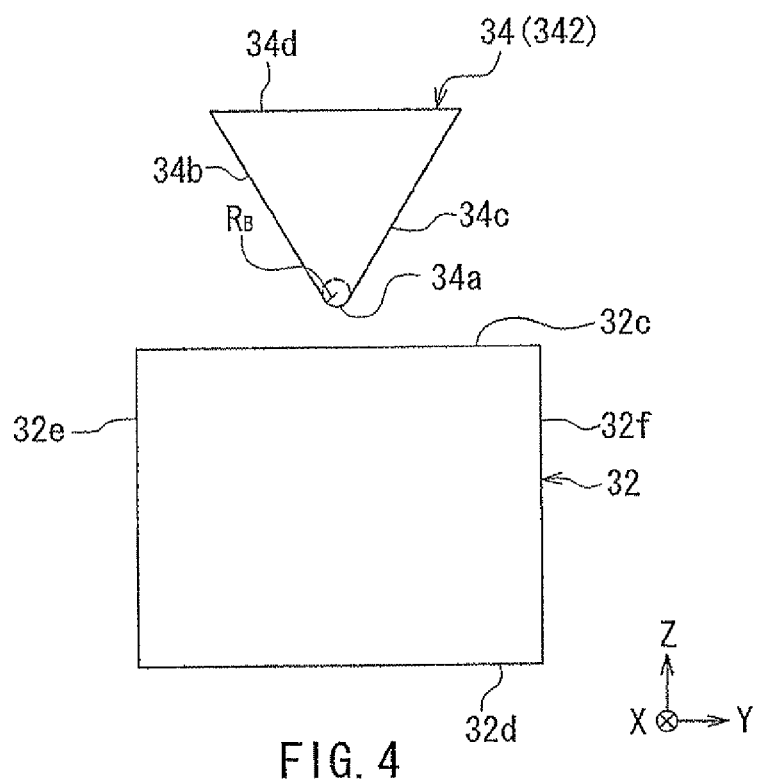
FIG. 4 is a cross-sectional view showing respective cross sections of the core and the plasmon generator shown in FIG. 1 parallel to the medium facing surface.
Figure 5:
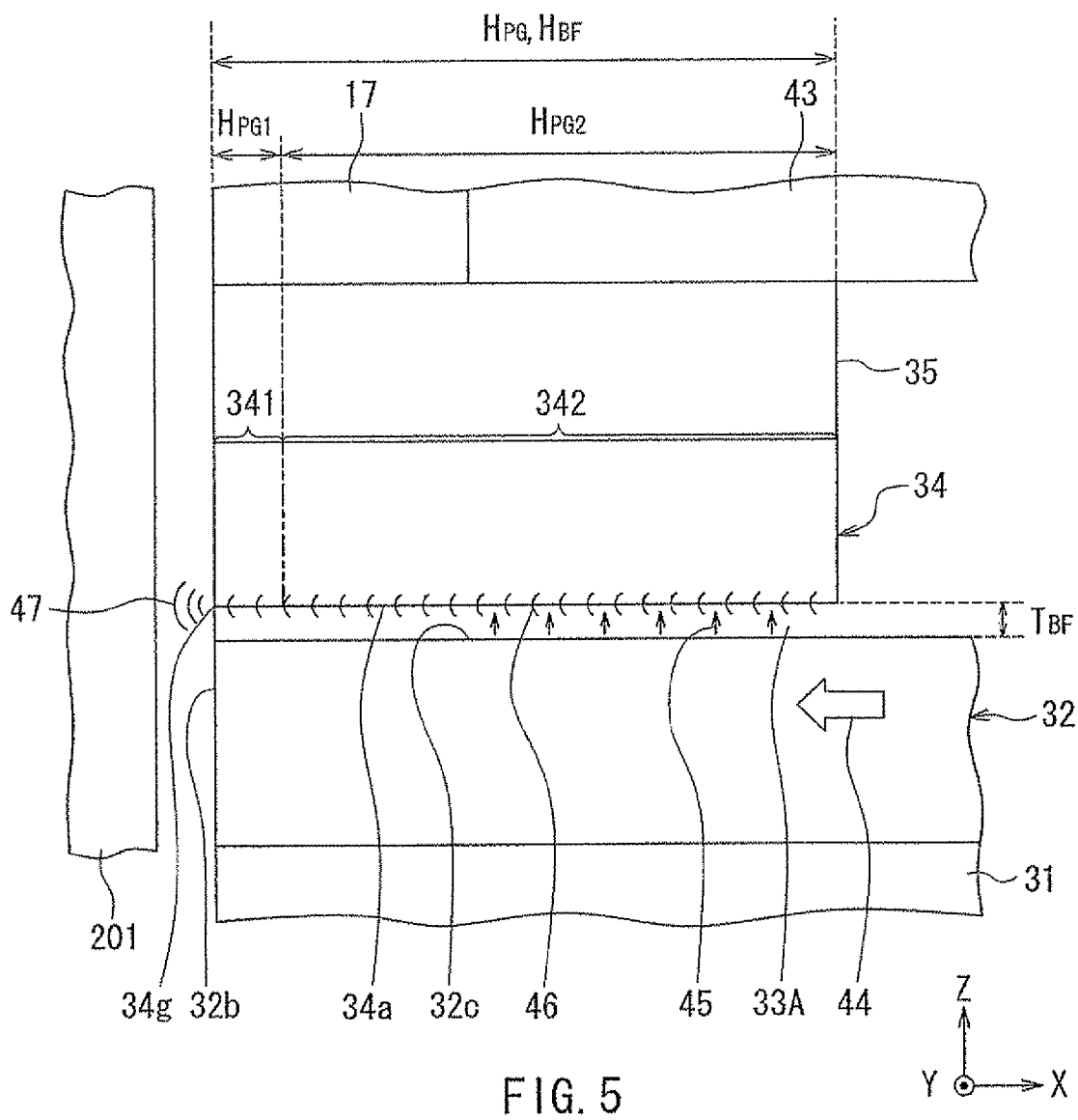
FIG. 5 is a cross-sectional view showing the core, the plasmon generator, and the magnetic pole of the heat-assisted magnetic recording head according to the first embodiment of the invention.

The shapes and layout of the core 32, the plasmon generator 34, and the magnetic pole 35 will now be described in detail with reference to FIG. 1 to FIG. 5. FIG. 1 is a perspective view showing the core 32, the plasmon generator 34, and the magnetic pole 35. FIG. 2 is a perspective view showing the plasmon generator 34 of FIG. 1. FIG. 3 is a front view showing the core 32 and the plasmon generator 34 in the medium facing surface 12a. FIG. 4 is a cross-sectional view showing respective cross sections of the core 32 and the plasmon generator 34 parallel to the medium facing surface 12a. FIG. 5 is a cross-sectional view showing the core 32, the plasmon generator 34, and the magnetic pole 35.

Aside from the incident end 32a shown in FIG. 9, the core 32 further has: an end face 32b that is closer to the medium facing surface 12a; an evanescent light generating surface 32c, which is a top surface; a bottom surface 32d; and two side surfaces 32e and 32f, as shown in FIG. 1. The evanescent light generating surface 32c generates evanescent light based on the light propagated through the core 32. FIG. 1, FIG. 3 and FIG. 5 show an example where the end face 32b is located in the medium facing surface 12a. The end face 32b may be located away from the medium facing surface 12a, however.

As shown in FIG. 1, the plasmon generator 34 has a near-field light generating part 34g located in the medium facing surface 12a. As shown in FIG. 1 and FIG. 2, the plasmon generator 34 is generally triangular-prism-shaped and has an outer surface as described below. The outer surface of the plasmon generator 34 includes a propagation edge 34a, a first inclined surface 34b, a second inclined surface 34c, and a top surface 34d. The propagation edge 34a faces the evanescent light generating surface 32c with a predetermined distance therebetween, and extends in a direction perpendicular to the medium facing surface 12a. As will be described later, the propagation edge 34a propagates plasmons. In a cross section parallel to the medium facing surface 12a, the propagation edge 34a is shaped like a pointed edge in a macroscopic view, but has an arc shape in a microscopic view. The near-field light generating part 34g lies at an end of the propagation edge 34a. The first and second inclined surfaces 34b and 34c are each connected to the propagation edge 34a. The first and second inclined surfaces 34b and 34c increase in distance from each other with increasing distance from the propagation edge 34a. The top surface 34d connects the respective top ends of the first inclined surface 34b and the second inclined surface 34c to each other.

The outer surface of the plasmon generator 34 further includes a front end face 34e located in the medium facing surface 12a and a rear end face 34f opposite to the front end face 34e. The front end face 34e and the rear end face 34f each connect the first inclined surface 34b, the second inclined surface 34c, and the top surface 34d to each other.

The front end face 34e is generally triangle-shaped. The front end face 34e has a first side 34e1 that lies at an end of the first inclined surface 34b, a second side 34e2 that lies at an end of the second inclined surface 34c, a third side 34e3 that lies at an end of the top surface 34d, and a tip 34e4 that lies at the bottom end of the front end face 34e. The tip 34e4 forms the near-field light generating part 34g. The tip 34e4 is shaped like a pointed edge in a macroscopic view, but has an arc shape in a microscopic view. The first and second sides 34e1 and 34e2 are each connected to the tip 34e4.

As shown in FIG. 3, the angle formed between the first inclined surface 34b and the second inclined surface 34c (the angle formed between the first side 34e1 and the second side 34e2 as well) will be represented by the symbol θ. θ falls within the range of 30 to 120 degrees, for example.

The plasmon generator 34 includes a shape changing portion 341 and a constant shape portion 342. The shape changing portion 341 is a portion of the plasmon generator 34 where the cross section of the plasmon generator 34 parallel to the medium facing surface 12a changes in shape according to the distance from the medium facing surface 12a. The change in shape is such that the radius of curvature of the propagation edge 34a in the cross section parallel to the medium facing surface 12a continuously decreases with decreasing distance to the medium facing surface 12a. The constant shape portion 342 is a portion of the plasmon generator 34 where the cross section of the plasmon generator 34 parallel to the medium facing surface 12a has a constant shape regardless of the distance from the medium facing surface 12a. In the constant shape portion 342, the radius of curvature of the propagation edge 34a in the cross section parallel to the medium facing surface 12a is constant regardless of the distance from the medium facing surface 12a. FIG. 4 shows a cross section of the plasmon generator 34 in the position of the border between the shape changing portion 341 and the constant shape portion 342. It should be noted that the plasmon generator 34 need not necessarily include the constant shape portion 342. In such a case, the entire plasmon generator 34 is composed of the shape changing portion 341.

At least a part of the propagation edge 34a lies in the shape changing portion 341. In the example shown in FIG. 2 to FIG. 4, the propagation edge 34a excluding the part lying in the shape changing portion 341 is in the constant shape portion 342.

The shape changing portion 341 has an end located in the medium facing surface 12a. The end of the shape changing portion 341 is the front end face 34e of the plasmon generator 34. The constant shape portion 342 is located farther from the medium facing surface 12a than is the shape changing portion 341, such that the constant shape portion 342 is continuous with the shape changing portion 341. In FIG. 2 and FIG. 5, the border between the shape changing portion 341 and the constant shape portion 342 is shown by a chain double-dashed line. In the shape changing portion 341, the radius of curvature of the propagation edge 34a comes to a minimum at the end of the shape changing portion 341, i.e., at the medium facing surface 12a, and comes to a maximum at the position of the border between the shape changing portion 341 and the constant shape portion 342. The radius of curvature of the propagation edge 34a at the medium facing surface 12a is equal to the minimum value of the radius of curvature of the propagation edge 34a in the shape changing portion 341. The radius of curvature of the propagation edge 34a in the constant shape portion 342 is equal to the maximum value of the radius of curvature of the propagation edge 34a in the shape changing portion 341.

As shown in FIG. 2 to FIG. 4, the radius of curvature of the propagation edge 34a at the medium facing surface 12a will be represented by the symbol $R_A$. The radius of curvature of the propagation edge 34a in the position of the border between the shape changing portion 341 and the constant shape portion 342 and that of the propagation edge 34a at the rear end face 34f will be represented by the symbol $R_B$. $R_A$ falls within the range of 3 to 20 nm, for example. $R_B$ falls within the range of 10 to 50 nm, for example.

The radius of curvature $R_A$ can be determined in the following manner, for example. Initially, an image of the front end face 34e of the plasmon generator 34 is captured by using a scanning ion microscope (SIM) which accompanies a focused ion beam (FIB) system. Next, a circle of appropriate size is drawn on the image so as to be inscribed between the propagation edge 34a, the first inclined surface 34b, and the second inclined surface 34c (the first side 34e1, the second side 34e2, and the tip 34e4) as shown by the broken line in FIG. 3. Then, the radius of the circle is determined as the radius of curvature $R_A$.

The radius of curvature $R_B$ can be determined in the following manner, for example. Initially, the head unit 12 is polished so that the constant shape portion 342 of the plasmon generator 34 appears in the polished surface that is parallel to the medium facing surface 12a. Next, an image of the end face of the constant shape portion 342 appearing in the polished surface is captured by using the foregoing SIM. Next, a circle of appropriate size is drawn on the image so as to be inscribed between the propagation edge 34a, the first inclined surface 34b, and the second inclined surface 34c as shown by the broken line in FIG. 4. Then, the radius of the circle is determined as the radius of curvature $R_B$. The radius of curvature of the propagation edge 34a in any cross section of the shape changing portion 341 of the plasmon generator 34 can also be determined in the same manner.

In the plasmon generator 34 of the present embodiment, the distance between the propagation edge 34a and the top surface 34d is constant or almost constant regardless of the distance from the medium facing surface 12a. In the present embodiment, the width of the top surface 34d in the Y direction is constant or almost constant regardless of the distance from the medium facing surface 12a.

As shown in FIG. 5, a part of the clad layer 33 that is interposed between the evanescent light generating surface 32c and the propagation edge 34a forms a buffer part 33A having a refractive index lower than that of the core 32.

As shown in FIG. 1, the magnetic pole 35 has an end face 35a located in the medium facing surface 12a. The end face 35a has a rectangular shape, for example. The bottom surface of the magnetic pole 35 is in contact with the top surface 34d of the plasmon generator 34.

As shown in FIG. 1 and FIG. 3, the width of the core 32 in the track width direction TW (the Y direction) in the vicinity of the plasmon generator 34 will be denoted by the symbol $W_{WG}$. The thickness (dimension in the Z direction) of the core 32 in the vicinity of the plasmon generator 34 will be denoted by the symbol $T_{WG}$. $W_{WG}$ falls within the range of 0.3 to 100 µm, for example. $T_{WG}$ falls within the range of 0.1 to 4 µm, for example. As shown in FIG. 10, the core 32 excluding the part in the vicinity of the plasmon generator 34 may have a width greater than $W_{WG}$.

As shown in FIG. 3, the dimension of the plasmon generator 34 in the track width direction TW (the Y direction) at the medium facing surface 12a will be denoted by the symbol $W_{PG}$. The dimension of the plasmon generator 34 in the Z direction at the medium facing surface 12a will be denoted by the symbol $T_{PG}$. Both $W_{PG}$ and $T_{PG}$ are sufficiently smaller than the wavelength of laser light to be propagated through the core 32. Both $W_{PG}$ and $T_{PG}$ fall within the range of 10 to 100 nm, for example.

As shown in FIG. 2 and FIG. 5, the length of the plasmon generator 34 in the X direction will be denoted by the symbol $H_{PG}$. $H_{PG}$ falls within the range of 0.6 to 4.0 µm, for example. The length of the shape changing portion 341 of the plasmon generator 34 in the X direction will be denoted by the symbol $H_{PG1}$. The length of the constant shape portion 342 of the plasmon generator 34 in the X direction will be denoted by the symbol $H_{PG2}$. In the case where the plasmon generator 34 includes the shape changing portion 341 and the constant shape portion 342, $H_{PG1}$ falls within the range of 0.01 to 3.5 µm, for example, and $H_{PG2}$ falls within the range of 0.5 to 3.99 µm, for example.

As shown in FIG. 5, the X-direction length of a portion of the propagation edge 34a of the plasmon generator 34 that faces the evanescent light generating surface 32c will be denoted by the symbol $H_{BF}$. As shown in FIG. 3 and FIG. 5, the distance between the propagation edge 34a and the evanescent light generating surface 32c will be denoted by the symbol $T_{BF}$. Both $H_{BF}$ and $T_{BF}$ are important parameters in achieving appropriate excitation and propagation of surface plasmons. $H_{BF}$ preferably falls within the range of 0.6 to 4.0 µm, and is preferably greater than the wavelength of the laser light to be propagated through the core 32. In the example shown in FIG. 5, the end face 32b of the core 32 is located in the medium facing surface 12a, so that $H_{BF}$ is equal to $H_{PG}$. $T_{BF}$ preferably falls within the range of 10 to 100 nm. As shown in FIG. 3, the distance between the tip 34e4 of the front end face 34e of the plasmon generator 34 and the end face 32b of the core 32 is equal to $T_{BF}$.

Reference is now made to FIG. 5 to describe the principle of generation of near-field light in the present embodiment and the principle of heat-assisted magnetic recording using the near-field light. Laser light 44 emitted from the laser diode 60 is propagated through the core 32 of the waveguide to reach the vicinity of the buffer part 33A. Here, the laser light 44 is totally reflected at the interface between the core 32 and the buffer part 33A. This generates evanescent light 45 permeating into the buffer part 33A. Then, the evanescent light 45 and fluctuations of charges on at least the propagation edge 34a of the outer surface of the plasmon generator 34 are coupled with each other to induce a surface plasmon polariton mode. In this way, surface plasmons 46 are excited at least on the propagation edge 34a through coupling with the evanescent light 45 generated from the evanescent light generating surface 32c.

The surface plasmons 46 excited at least on the propagation edge 34a of the outer surface of the plasmon generator 34 are transformed into edge plasmons to propagate along the propagation edge 34a to the near-field light generating part 34g. Consequently, the edge plasmons concentrate at the near-field light generating part 34g, and near-field light 47 occurs from the near-field light generating part 34g based on the edge plasmons. The near-field light 47 is projected toward the magnetic disk 201, reaches the surface of the magnetic disk 201, and heats a part of the magnetic recording layer of the magnetic disk 201. This lowers the coercivity of the part of the magnetic recording layer. In heat-assisted magnetic recording, the part of the magnetic recording layer with the lowered coercivity is subjected to a write magnetic field produced by the magnetic pole 35 for data writing.

Figure 11:
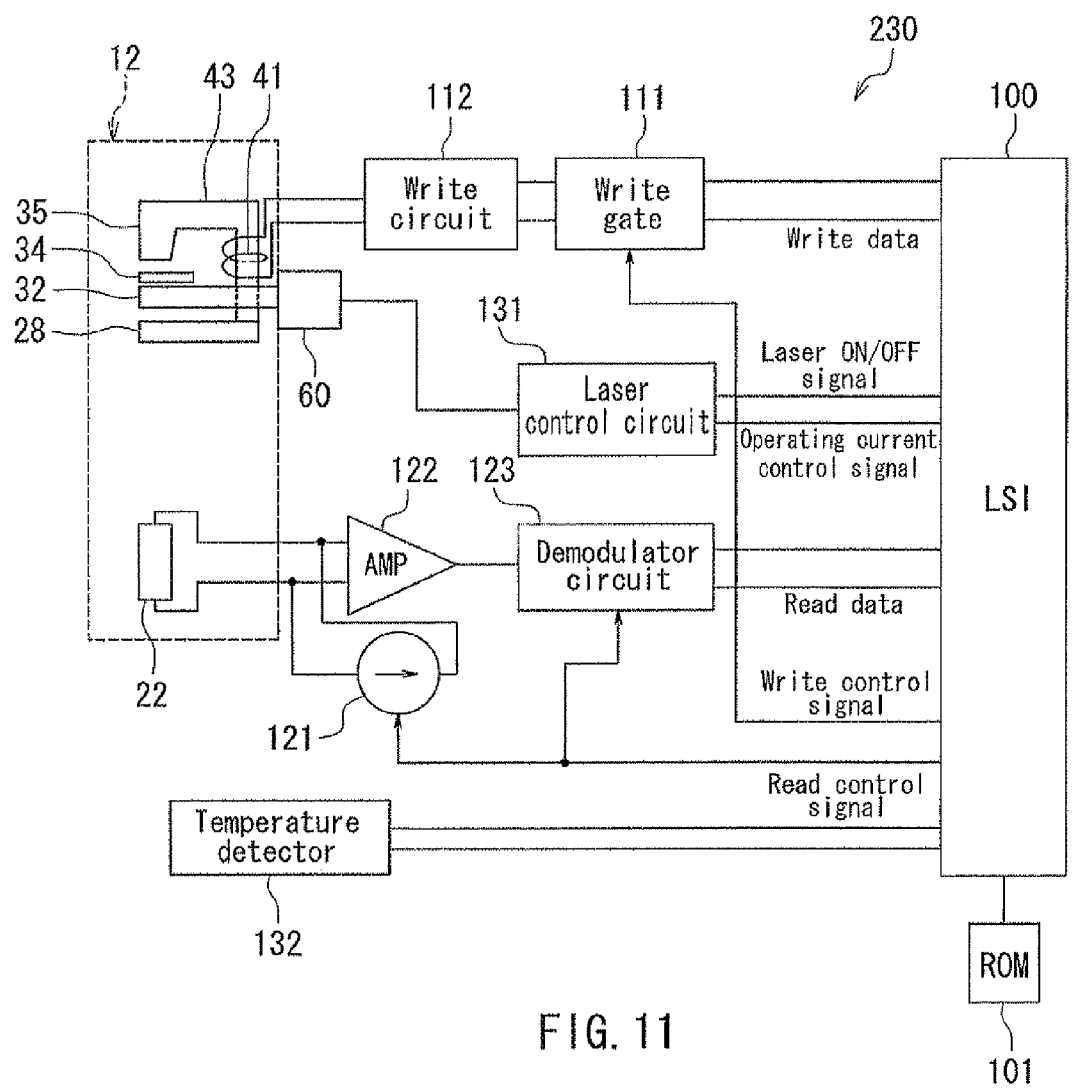
FIG. 11 is a block diagram showing the circuit configuration of the magnetic recording device according to the first embodiment of the invention.

Reference is now made to FIG. 11 to describe the circuit configuration of the control circuit 230 shown in FIG. 6 and the operation of the heat-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 41.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a write operation, the control LSI 100 supplies write data to the write gate 111. The write gate 111 supplies the write data to the write circuit 112 only when the write control signal indicates a write operation. According to the write data, the write circuit 112 passes a write current through the coil 41. Consequently, the magnetic pole 35 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and the laser light is propagated through the core 32. According to the principle of generation of near-field light described previously, the near-field light 47 occurs from the near-field light generating part 34g of the plasmon generator 34. The near-field light 47 heats a part of the magnetic recording layer of the magnetic disk 201, thereby lowering the coercivity of that part. When writing, the part of the magnetic recording layer with the lowered coercivity is subjected to the write magnetic field produced by the magnetic pole 35 for performing data writing.

On the basis of such factors as the temperature of the magnetic recording layer of the magnetic disk 201 measured by the temperature detector 132, the control LSI 100 consults the control table stored in the ROM 101 to determine the value of the operating current of the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60. The control table may further contain data that indicates the relationship between the operating current value and a temperature increase of the magnetic recording layer heated by the near-field light 47, and data that indicates the temperature dependence of the coercivity of the magnetic recording layer.

As shown in FIG. 11, the control circuit 230 has the signal system for controlling the laser diode 60, i.e., the signal system consisting of the laser ON/OFF signal and the operating current control signal, independent of the control signal system intended for read/write operations. This configuration makes it possible to implement various modes of energization of the laser diode 60, not only to energize the laser diode 60 simply in association with a write operation. It should be noted that the circuit configuration of the control circuit 230 is not limited to the one shown in FIG. 11.

Next, a method of manufacturing the slider 10 of the present embodiment will be described briefly. The method of manufacturing the slider 10 includes the steps of; forming components of a plurality of sliders 10 other than the slider substrates 11 on a substrate that includes portions to become the slider substrates 11 of the plurality of sliders 10, thereby fabricating a substructure that includes pre-slider portions arranged in a plurality of rows, the pre-slider portions being intended to become the sliders 10 later; and forming the plurality of sliders 10 by cutting the substructure to separate the plurality of pre-slider portions from each other. In the step of forming the plurality of sliders 10, the surfaces formed by cutting are polished into the medium facing surfaces 11a and 12a.

First and second examples of the method of forming the plasmon generator 34 will now be described. A description will initially be given of the first example of the method of forming the plasmon generator 34 with reference to FIG. 12A to FIG. 16C. The plasmon generator 34 formed by the first example includes the shape changing portion 341 only, and does not include the constant shape portion 342. FIG. 12A to FIG. 16C each show a part of a stack of layers fabricated in the process of forming the plasmon generator 34. Of FIG. 12A to FIG. 16C, FIG. nA (n is any integer between 12 and 16 inclusive) is a plan view of a part of the stack. FIG. nB is a cross-sectional view of a part of the stack at the position shown by the line nB-nB in FIG. nA. FIG. nC is a cross-sectional view of a part of the stack at the position shown by the line nC-nC in FIG. nA. The position shown by the line nB-nB is the position where the medium facing surface 12a is to be formed.

Figure 12A:
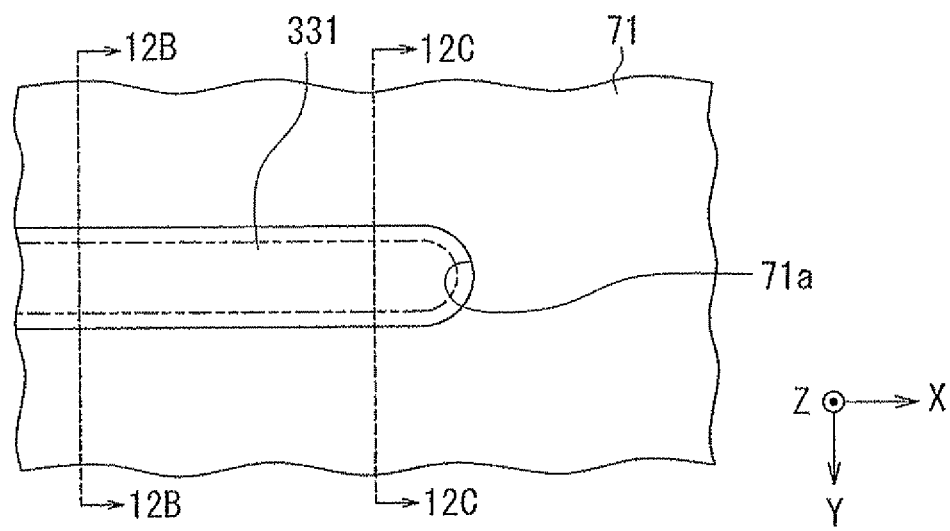
FIG. 12A to FIG. 12C are explanatory diagrams showing a step of a first example of the method of forming the plasmon generator of the first embodiment of the invention.
Figure 12B:
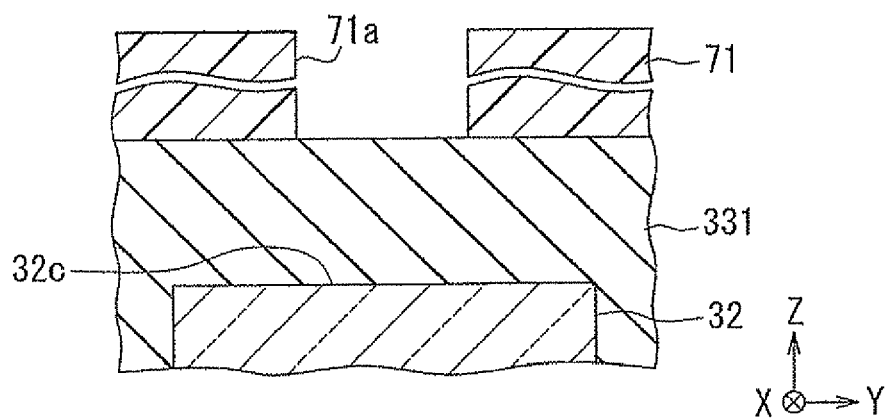
Figure 12C:
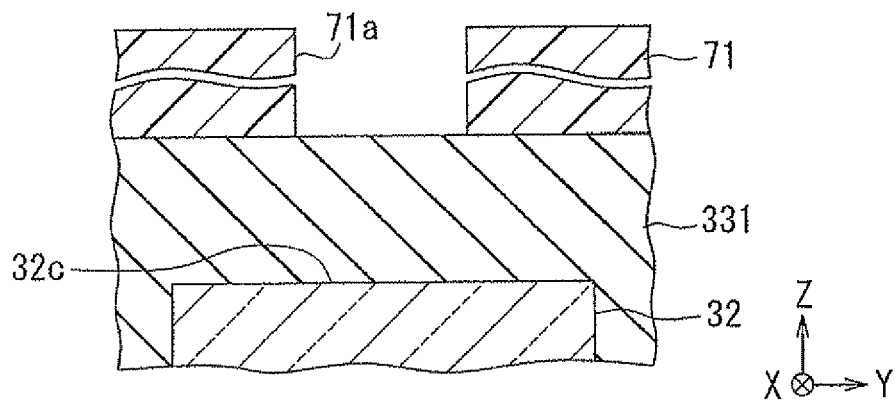

FIG. 12A to FIG. 12C show a step of the first example of the method of forming the plasmon generator 34. In this step, the core 32 of the waveguide is initially formed on the clad layer 31 and then a dielectric layer 331 is formed to cover the clad layer 31 and the core 32. The material of the dielectric layer 331 is the same as that of the clad layer 33. Next, an etching mask 71 made of photoresist or metal is formed on the dielectric layer 331. The etching mask 71 has an opening 71a that has a size slightly larger than the outer edge (shown by a chain double-dashed line in FIG. 12A) of the top end of the plasmon generator 34 to be formed later. The opening 71a has a constant width in the Y direction regardless of the distance from the position where the medium facing surface 12a is to be formed.

Figure 13A:
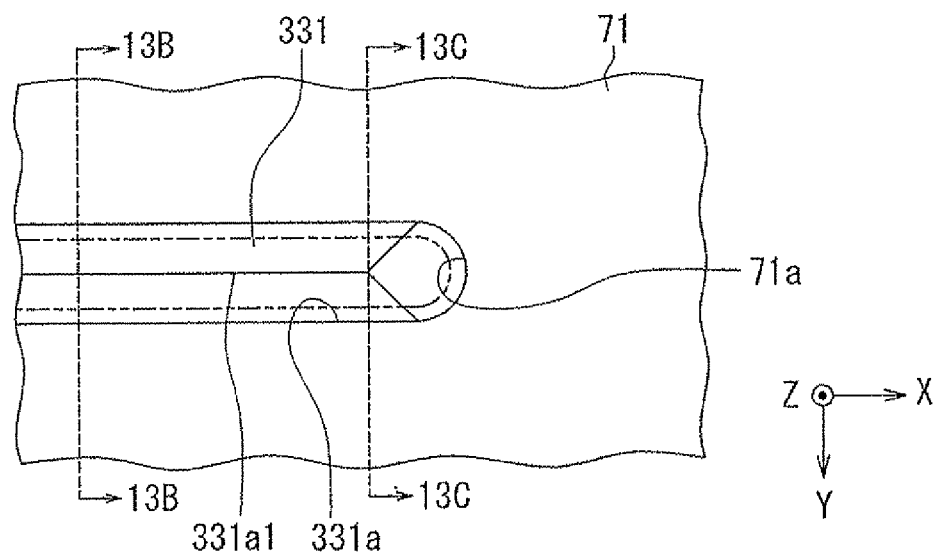
FIG. 13A to FIG. 13C are explanatory diagrams showing a step that follows the step shown in FIG. 12A to FIG. 12C.
Figure 13B:
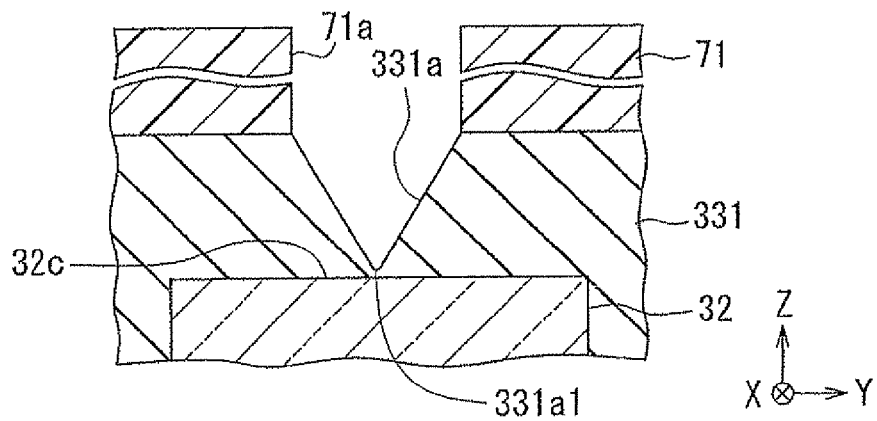
Figure 13C:
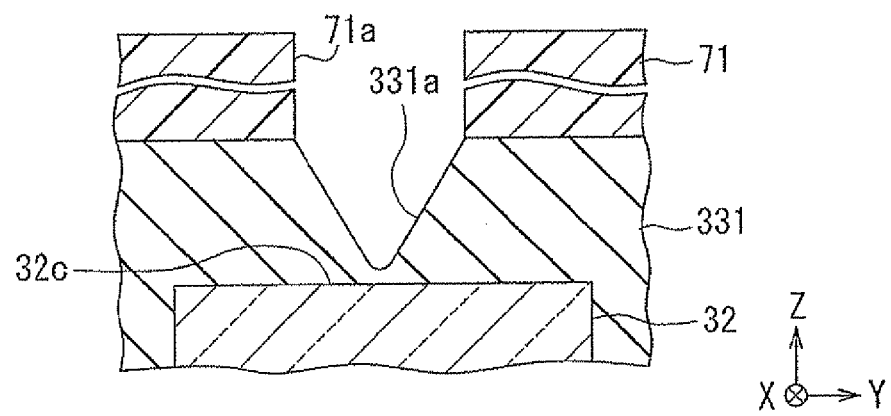

FIG. 13A to FIG. 13C show the next step. In this step, the dielectric layer 331 is etched by, for example, ion beam etching or reactive ion etching, whereby a V-shaped groove 331a is formed in the dielectric layer 331. The groove 331a is formed such that its bottom end 331a1 reaches the evanescent light generating surface 32c or faces the evanescent light generating surface 32c with a predetermined distance therebetween. The groove 331a is shaped to be slightly larger than the outer shape of the plasmon generator 34 to be formed later. In this step, the groove 331a is formed so that the radius of curvature of the bottom end 331a1 continuously decreases with decreasing distance to the position where the medium facing surface 12a is to be formed. Next, the etching mask 71 is removed.

A description will now be given of the reason that the groove 331a is formed so that the radius of curvature of the bottom end 331a1 continuously decreases with decreasing distance to the position where the medium facing surface 12a is to be formed. As shown in FIG. 13A, in the vicinity of the position where the medium facing surface 12a is to be formed, the etching mask 71 lies only on opposite sides of the opening 71a in the Y direction. In contrast, in the vicinity of the end of the opening 71a farthest from the position where the medium facing surface 12a is to be formed, the etching mask 71 lies on three sides, i.e., opposite sides of the opening 71a in the Y direction and the front side of the opening 71a in the X direction. In the vicinity of this end of the opening 71a, the dielectric layer 331 thus has an etching rate lower than in the vicinity of the position where the medium facing surface 12a is to be formed, because of the shading by the etching mask 71. This makes it difficult for the bottom end 331a1 of the groove 331a to have a sharply pointed shape. Consequently, as described above, the groove 331a is formed so that the radius of curvature of the bottom end 331a1 continuously decreases with decreasing distance to the position where the medium facing surface 12a is to be formed.

Figure 14A:
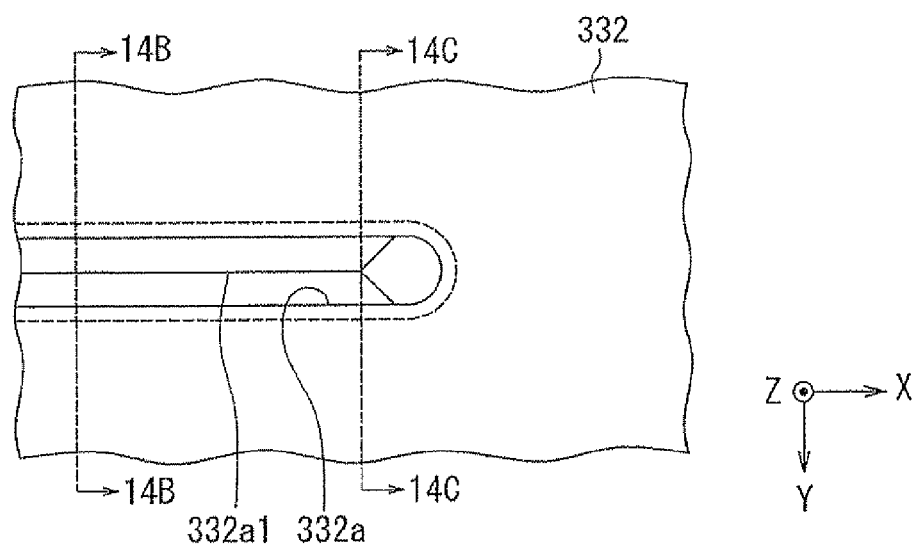
FIG. 14A to FIG. 14C are explanatory diagrams showing a step that follows the step shown in FIG. 13A to FIG. 13C.
Figure 14B:
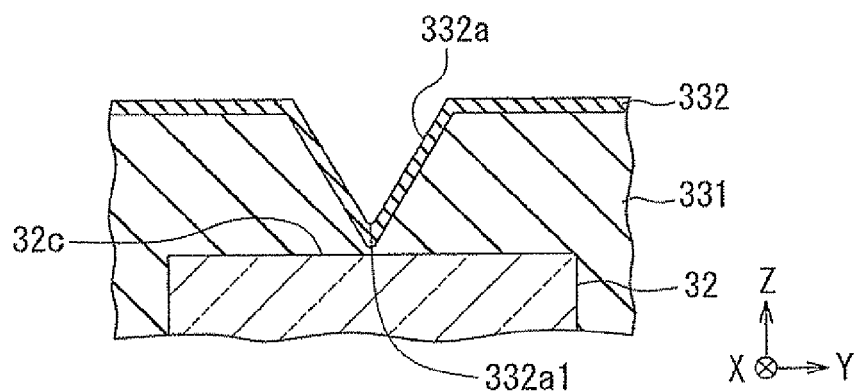
Figure 14C:
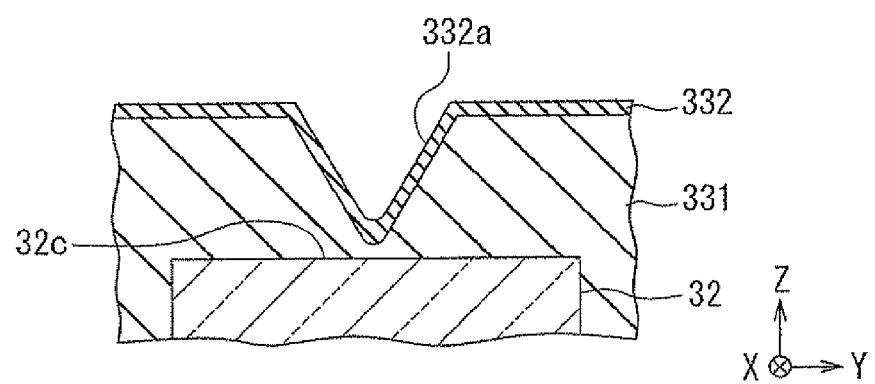

FIG. 14A to FIG. 14C show the next step. In this step, a dielectric film 332 is formed by, for example, sputtering, so as to cover the entire top surface of the stack shown in FIG. 13A to FIG. 13C. The material of the dielectric film 332 is the same as that of the clad layer 33. The dielectric film 332 is formed also in the groove 331a. The stack after the formation of the dielectric film 332 has a recess 332a for accommodating the plasmon generator 34 to be formed later. The recess 332a has a bottom end 332a1. The bottom end 332a1 faces the evanescent light generating surface 32c with a predetermined distance therebetween, and extends in the direction perpendicular to the medium facing surface 12a. The radius of curvature of the bottom end 332a1 continuously decreases with decreasing distance to the position where the medium facing surface 12a is to be formed.

Figure 15A:
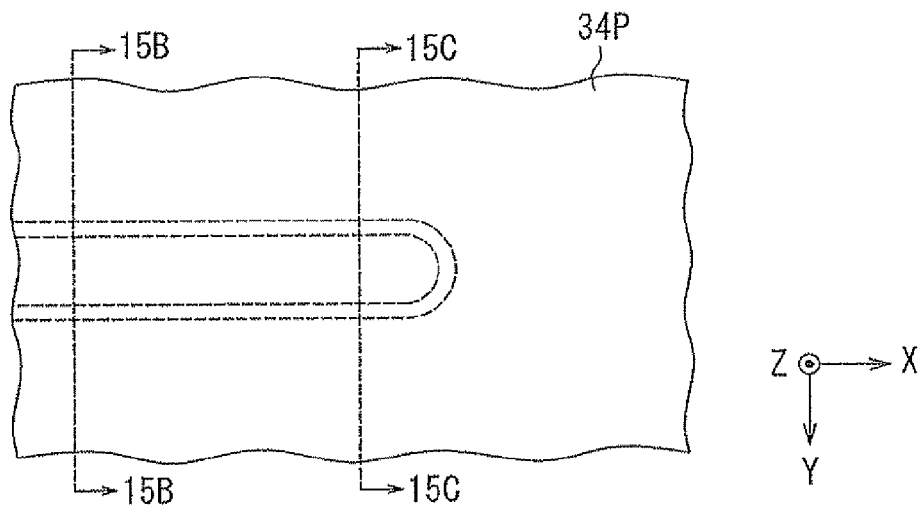
FIG. 15A to FIG. 15C are explanatory diagrams showing a step that follows the step shown in FIG. 14A to FIG. 14C.
Figure 15B:
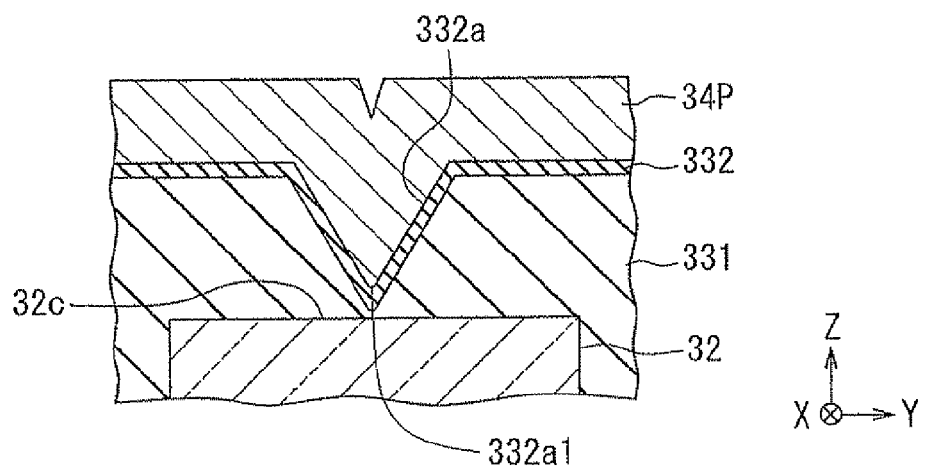
Figure 15C:
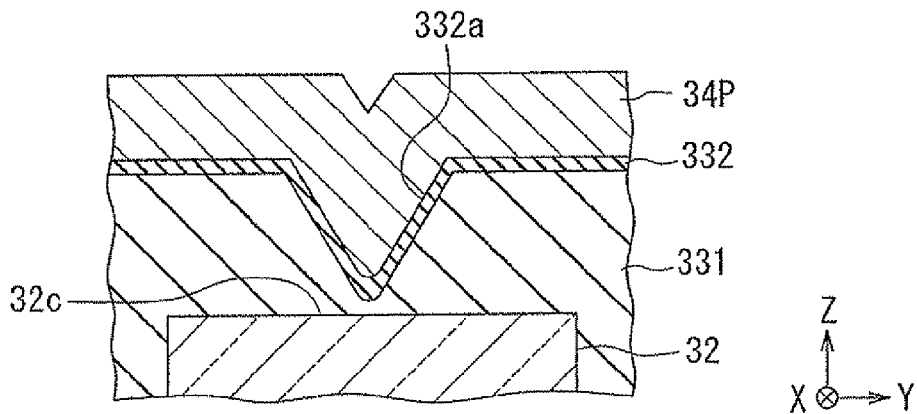

FIG. 15A to FIG. 15C show the next step. In this step, a metal film 34P, which is to become the plasmon generator 34 later, is formed over the entire top surface of the stack shown in FIG. 14A to FIG. 14C. The metal film 34P is formed into a thickness sufficient for at least filling the recess 332a. Before forming the metal film 34P, an adhesion film may be formed on the dielectric film 332 for the purpose of improving the adhesion of the metal film 34P to the dielectric film 332. The adhesion film may be made of Ti or Ta, for example. The adhesion film may have a thickness of 1 nm or so.

Figure 16A:
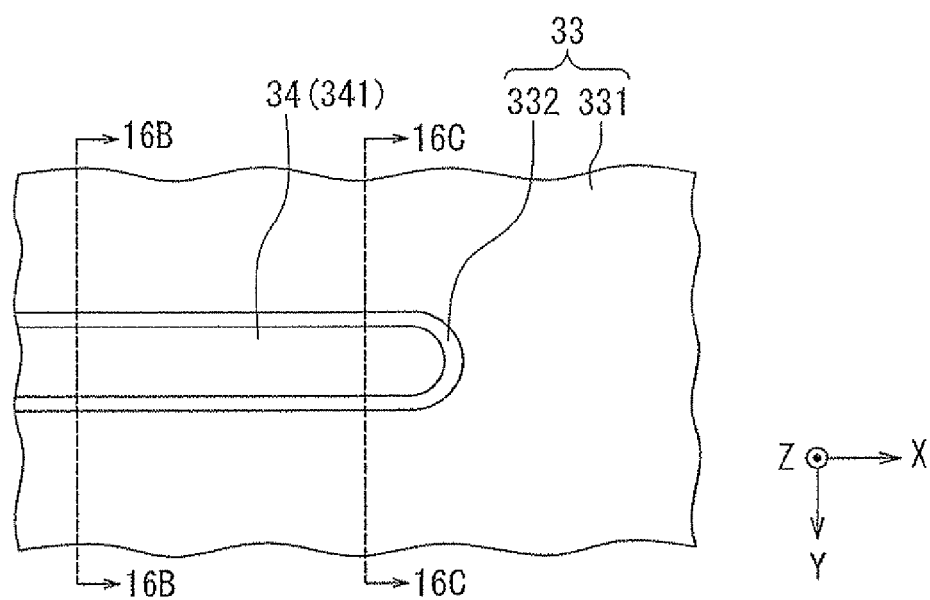
FIG. 16A to FIG. 16C are explanatory diagrams showing a step that follows the step shown in FIG. 15A to FIG. 15C.
Figure 16B:
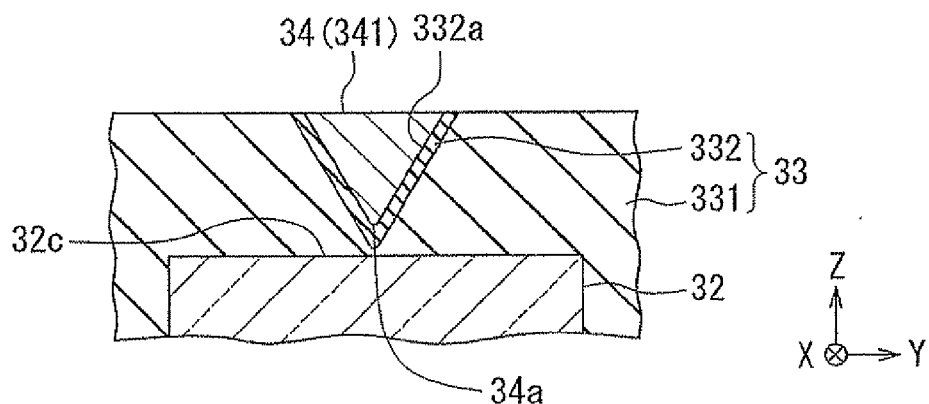
Figure 16C:
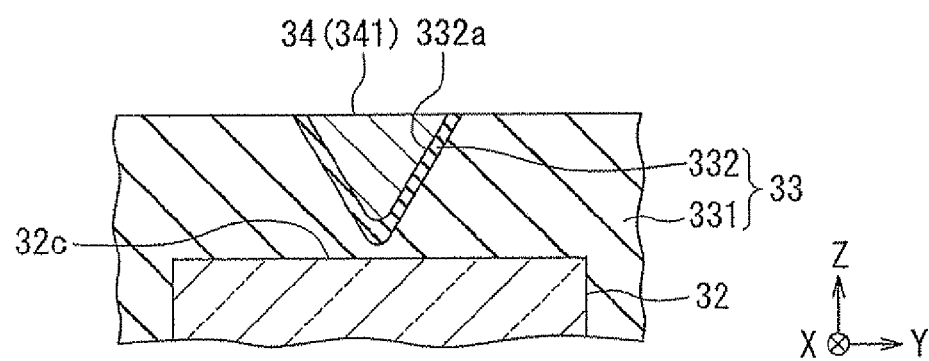

FIG. 16A to FIG. 16C show the next step. In this step, the metal film 34P is polished by, for example, chemical mechanical polishing, until the dielectric film 332 or the dielectric layer 331 is exposed. FIG. 16A to FIG. 16C show an example where the metal film 34P is polished until the dielectric layer 331 is exposed. As a result, the remaining dielectric layer 331 and dielectric film 332 constitute the clad layer 33. A part of the dielectric layer 331 and the dielectric film 332 constitute the buffer part 33A. The metal film 34P becomes the plasmon generator 34 (shape changing portion 341).

The second example of the method of forming the plasmon generator 34 will now be described with reference to FIG. 17A to FIG. 21C. The plasmon generator 34 formed by the second example includes the shape changing portion 341 and the constant shape portion 342. FIG. 17A to FIG. 21C each show a part of a stack of layers fabricated in the process of forming the plasmon generator 34. Of FIG. 17A to FIG. 21C, FIG. nA (n is any integer between 17 and 21 inclusive) is a plan view of a part of the stack. FIG. nB is a cross-sectional view of a part of the stack at the position shown by the line nB-nB in FIG. nA. FIG. nC is a cross-sectional view of a part of the stack at the position shown by the line nC-nC in FIG. nA. The position shown by the line nB-nB is the position where the medium facing surface 12a is to be formed.

Figure 17A:
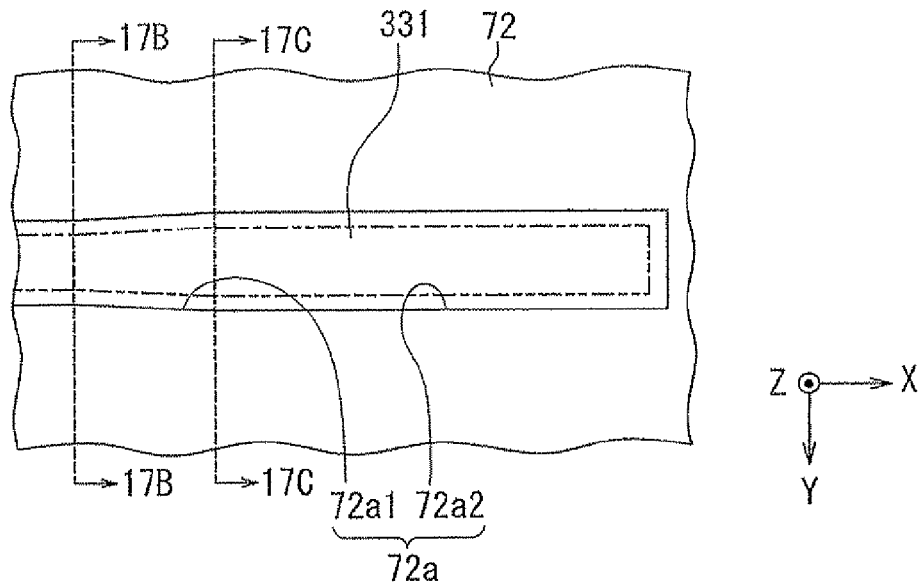
FIG. 17A to FIG. 17C are explanatory diagrams showing a step of a second example of the method of forming the plasmon generator of the first embodiment of the invention.
Figure 17B:
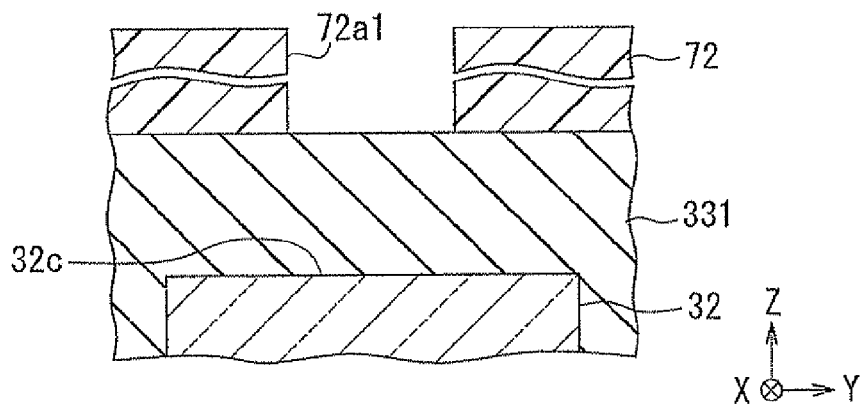
Figure 17C:
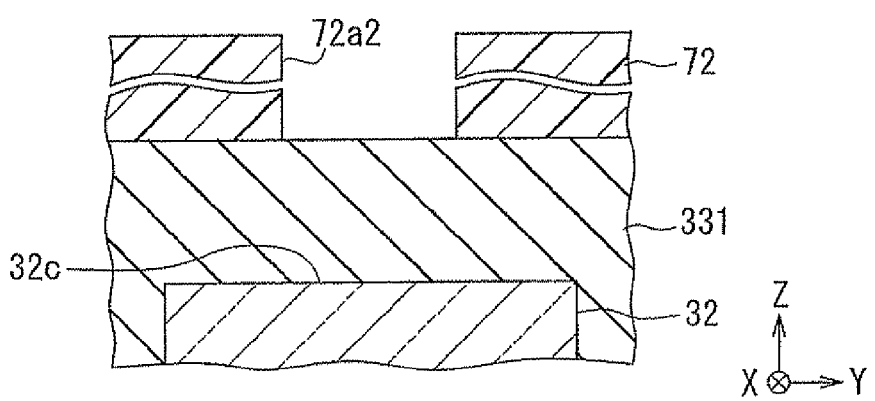

FIG. 17A to FIG. 17C show a step of the second example of the method of forming the plasmon generator 34. The steps of the second example are the same as those of the first example up to the step of forming the dielectric layer 331. In the second example, after the formation of the dielectric layer 331, an etching mask 72 made of photoresist or metal is formed on the dielectric layer 331. The etching mask 72 has an opening 72a that has a size slightly larger than the outer edge (shown by a chain double-dashed line in FIG. 17A) of the top end of the plasmon generator 34 to be formed later. The opening 72a includes a width changing portion 72a1 that is located closer to the position where the medium facing surface 12a is to be formed, and a constant width portion 72a2 that is located farther from the position where the medium facing surface 12a is to be formed. The width changing portion 72a1 continuously decreases in width in the Y direction with decreasing distance to the position where the medium facing surface 12a is to be formed. The constant width portion 72a2 has a constant width in the Y direction regardless of the distance from the position where the medium facing surface 12a is to be formed. The Y-direction width of the width changing portion 72a1 in the position where the medium facing surface 12a is to be formed is slightly smaller than that in the position of the border between the width changing portion 72a1 and the constant width portion 72a2.

Figure 18A:
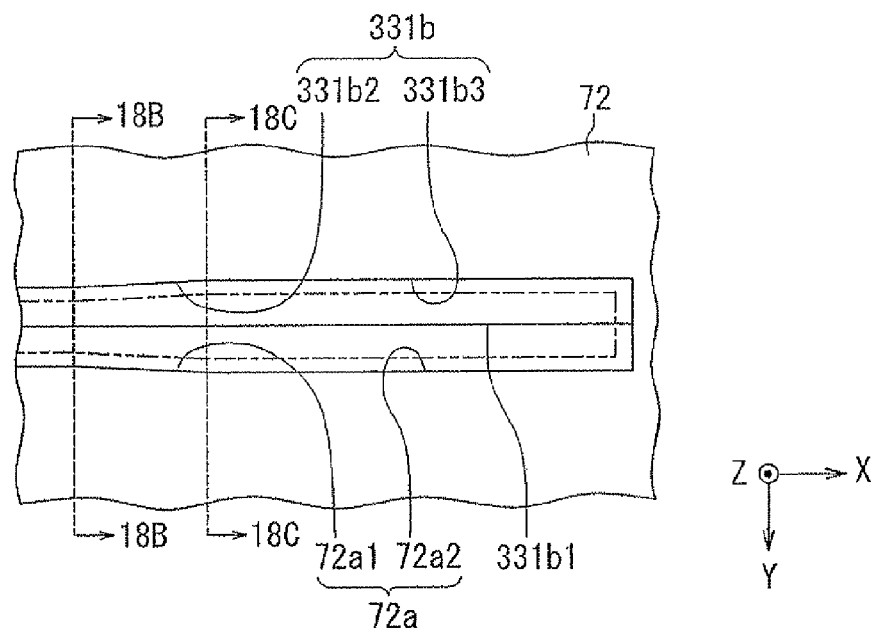
FIG. 18A to FIG. 18C are explanatory diagrams showing a step that follows the step shown in FIG. 17A to FIG. 17C.
Figure 18B:
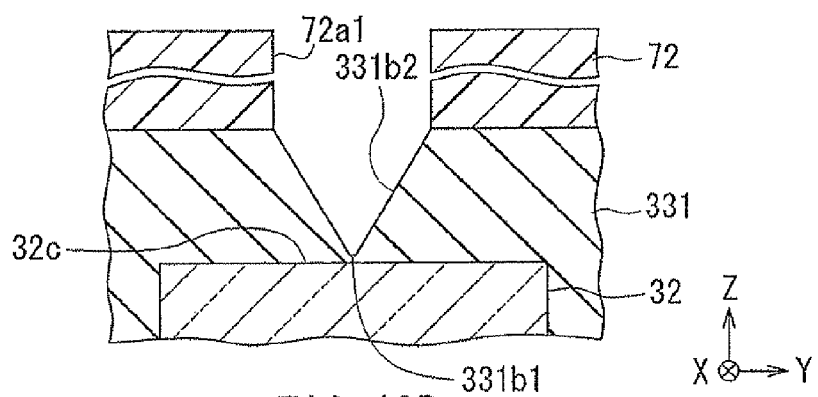
Figure 18C:
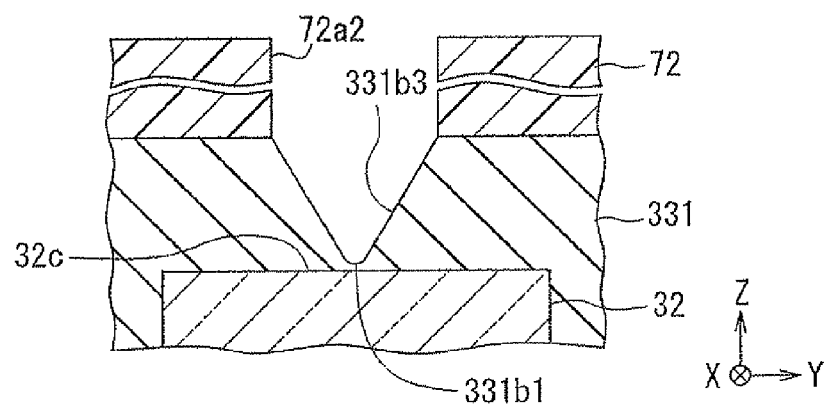

FIG. 18A to FIG. 18C show the next step. In this step, the dielectric layer 331 is etched by, for example, ion beam etching or reactive ion etching, whereby a V-shaped groove 331b is formed in the dielectric layer 331. The groove 331b is formed such that its bottom end 331b1 reaches the evanescent light generating surface 32c or faces the evanescent light generating surface 32c with a predetermined distance therebetween. The groove 331b is shaped to be slightly larger than the outer shape of the plasmon generator 34 to be formed later. The groove 331b includes a shape changing portion 331b2 that is located in a position corresponding to the shape changing portion 341 of the plasmon generator 34, and a constant shape portion 331b3 that is located in a position corresponding to the constant shape portion 342 of the plasmon generator 34. In this step, the shape changing portion 331b2 is formed so that the radius of curvature of the bottom end 331b1 continuously decreases with decreasing distance to the position where the medium facing surface 12a is to be formed. The constant shape portion 331b3 is formed so that the radius of curvature of the bottom end 331b1 is constant regardless of the distance from the position where the medium facing surface 12a is to be formed. Next, the etching mask 72 is removed.

A description will now be given of the reason that the shape changing portion 331b2 and the constant shape portion 331b3 of the groove 331b are formed in the foregoing shape. In the step of forming the groove 331b, the groove 331b is intended to be formed into such a shape that the constant shape portion 331b3 has a trapezoidal cross section with its lower side shorter than its upper side, the lower side being extremely short. The constant shape portion 331b3 actually formed has a rounded corner, however, and the bottom end 331b1 has an arc shape with a large radius of curvature. In such a case, the bottom end 331b1 in the constant shape portion 331b3 has a constant radius of curvature regardless of the distance from the position where the medium facing surface 12a is to be formed. Meanwhile, the width changing portion 72a1 of the etching mask 72 continuously decreases in width with decreasing distance to the position where the medium facing surface 12a is to be formed. Due to such a configuration of the etching mask 72, the cross-sectional shape of the shape changing portion 331b2 of the groove 331b gets closer to a strict triangular shape with decreasing distance to the position where the medium facing surface 12a is to be formed. Consequently, in the shape changing portion 331b2, the radius of curvature of the bottom end 331b1 continuously decreases with decreasing distance to the position where the medium facing surface 12a is to be formed.

Figure 19A:
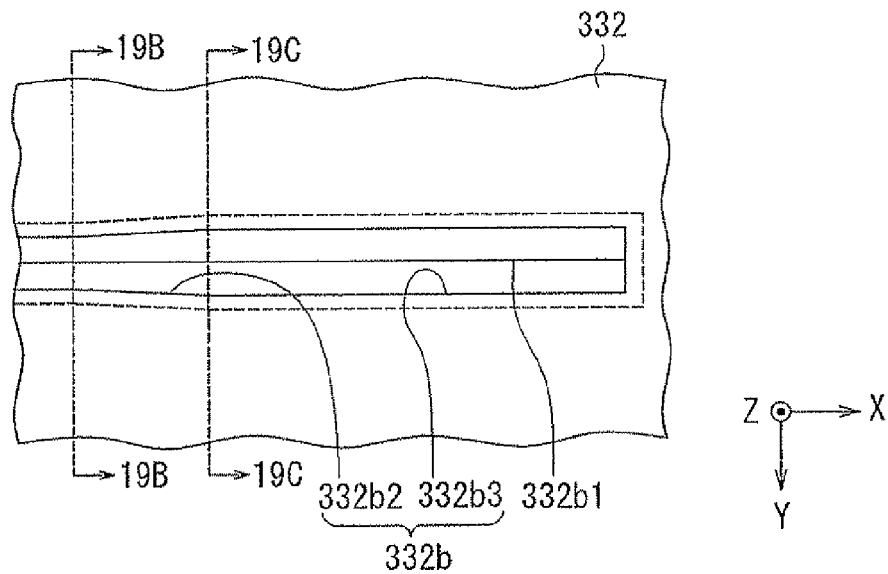
FIG. 19A to FIG. 19C are explanatory diagrams showing a step that follows the step shown in FIG. 18A to FIG. 18C.
Figure 19B:
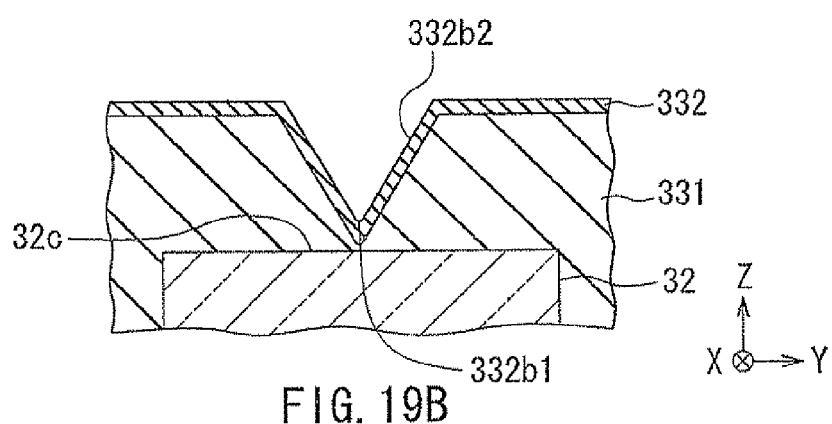
Figure 19C:
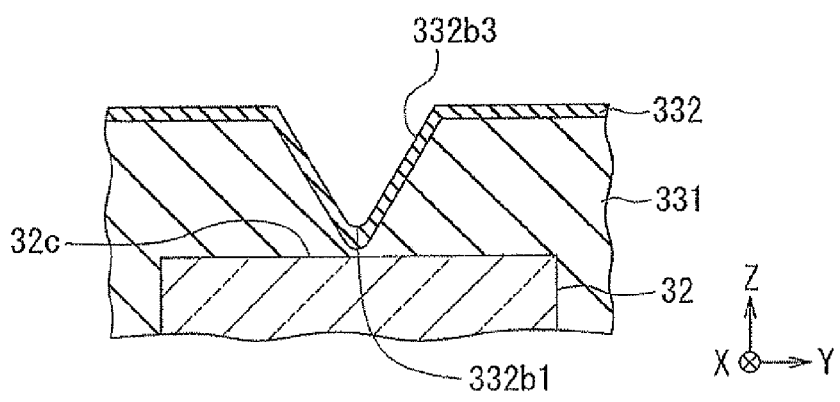

FIG. 19A to FIG. 19C show the next step. In this step, a dielectric film 332 is formed by, for example, sputtering, so as to cover the entire top surface of the stack shown in FIG. 18A to FIG. 18C. The material of the dielectric film 332 is the same as that of the clad layer 33. The dielectric film 332 is formed also in the groove 331b. The stack after the formation of the dielectric film 332 has a recess 332b for accommodating the plasmon generator 34 to be formed later. The recess 332b has a bottom end 332b1. The bottom end 332b1 faces the evanescent light generating surface 32c with a predetermined distance therebetween, and extends in the direction perpendicular to the medium facing surface 12a. The recess 332b includes a shape changing portion 332b2 that is located closer to the position where the medium facing surface 12a is to be formed, and a constant shape portion 332b3 that is located farther from the position where the medium facing surface 12a is to be formed. In the shape changing portion 332b2, the radius of curvature of the bottom end 332b1 continuously decreases with decreasing distance to the position where the medium facing surface 12a is to be formed. In the constant shape portion 332b3, the radius of curvature of the bottom end 332b1 is constant regardless of the distance from the position where the medium facing surface 12a is to be formed.

Figure 20A:
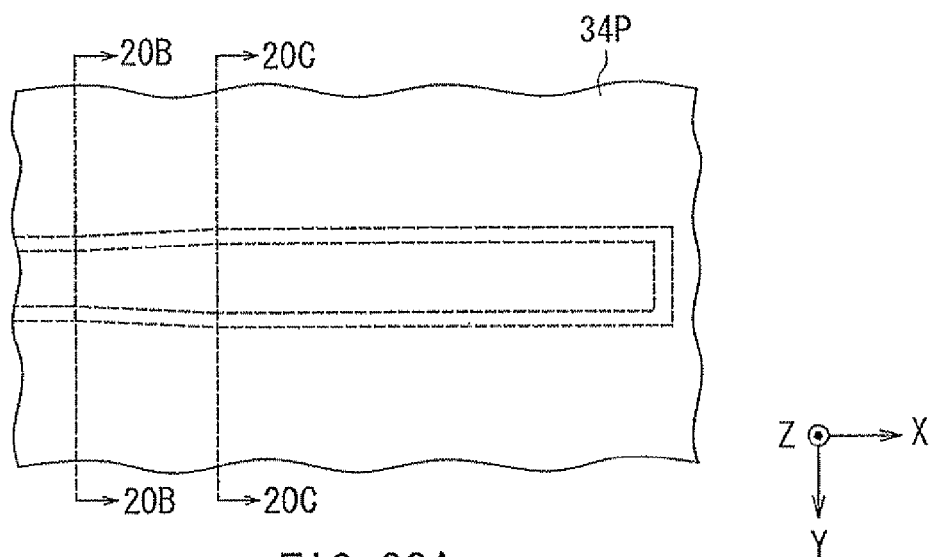
FIG. 20A to FIG. 20C are explanatory diagrams showing a step that follows the step shown in FIG. 19A to FIG. 19C.
Figure 20B:
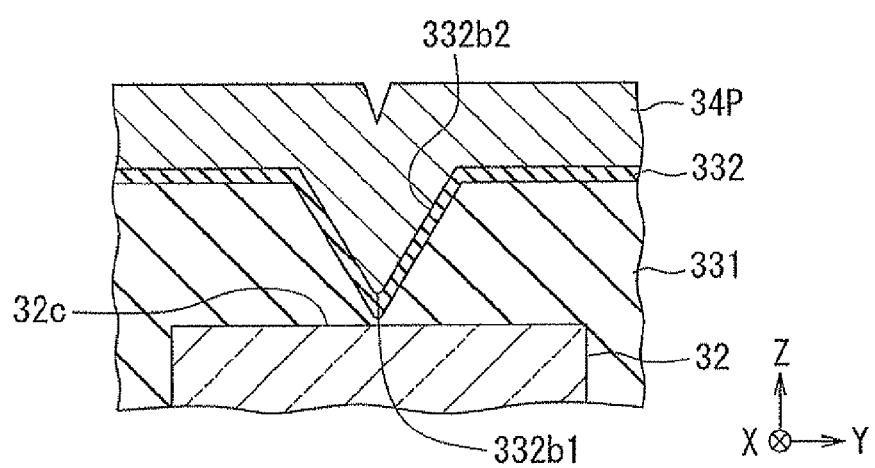
Figure 20C:
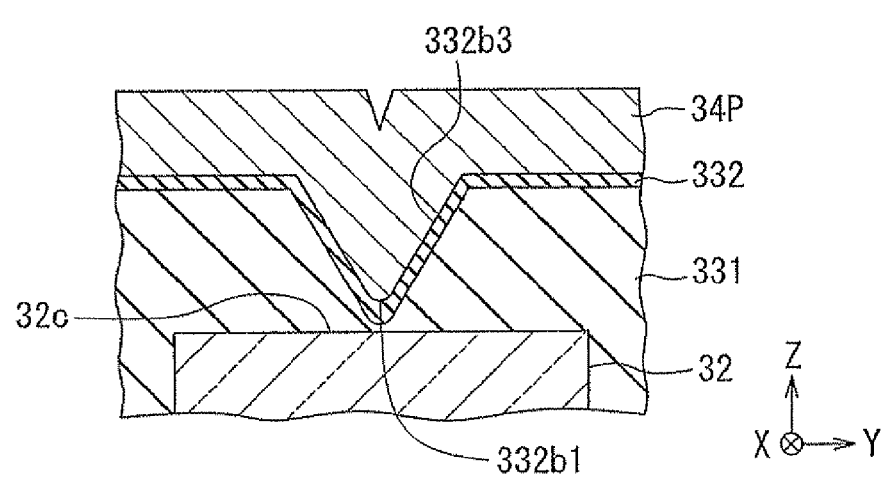

FIG. 20A to FIG. 20C show the next step. In this step, a metal film 34P, which is to become the plasmon generator 34 later, is formed over the entire top surface of the stack shown in FIG. 19A to FIG. 19C. The metal film 34P is formed into a thickness sufficient for at least filling the recess 332b. Before forming the metal film 34P, as in the first example, an adhesion film may be formed on the dielectric film 332 for the purpose of improving the adhesion of the metal film 34P to the dielectric film 332.

Figure 21A:
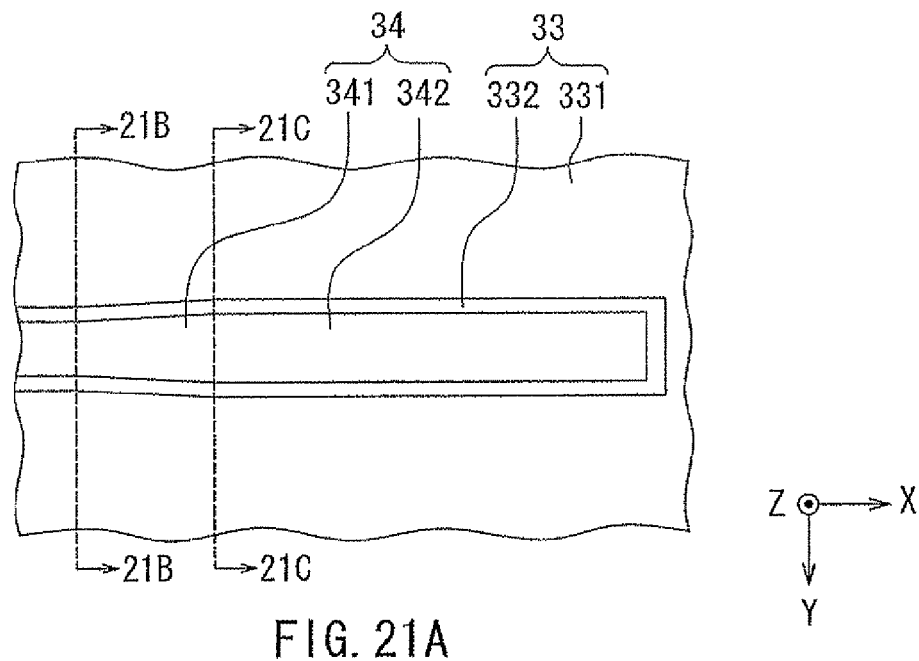
FIG. 21A to FIG. 21C are explanatory diagrams showing a step that follows the step shown in FIG. 20A to FIG. 20C.
Figure 21B:
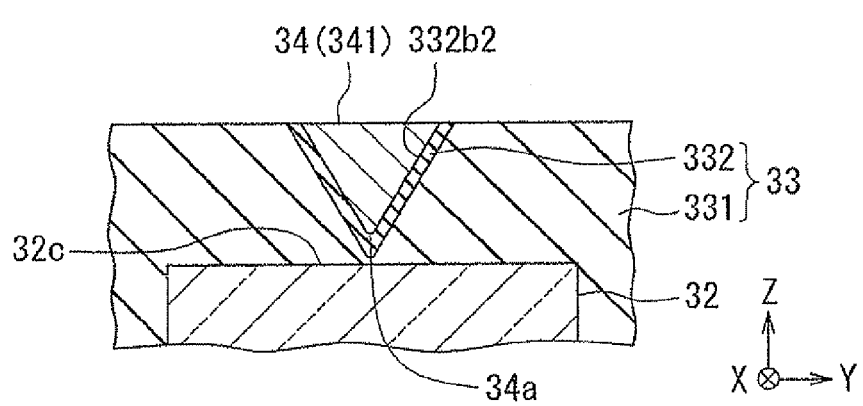
Figure 21C:
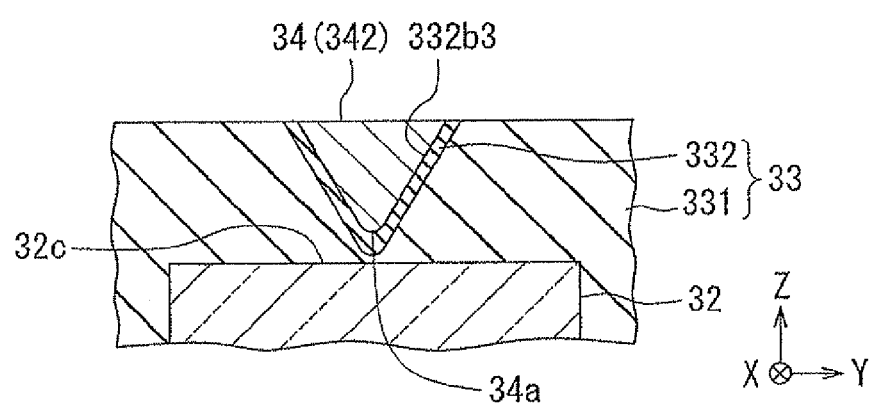

FIG. 21A to FIG. 21C show the next step. In this step, the metal film 34P is polished by, for example, chemical mechanical polishing, until the dielectric film 332 or the dielectric layer 331 is exposed. FIG. 21A to FIG. 21C show an example where the metal film 34P is polished until the dielectric layer 331 is exposed. As a result, the remaining dielectric layer 331 and dielectric film 332 constitute the clad layer 33. A part of the dielectric layer 331 and the dielectric film 332 constitute the buffer part 33A. The portion of the metal film 34P remaining in the shape changing portion 332b2 of the recess 332b becomes the shape changing portion 341 of the plasmon generator 34. The portion of the metal film 34P remaining in the constant shape portion 332b3 of the recess 332b becomes the constant shape portion 342 of the plasmon generator 34.

When the foregoing substructure is completed, the substructure is cut near the positions where the medium facing surfaces 12a are to be formed, so that the plurality of pre-slider portions are separated from each other. Subsequently, the surfaces formed by the cutting are polished into the respective medium facing surfaces 12a.

The effects of the heat-assisted magnetic recording head 1 according to the present embodiment will now be described. The plasmon generator 34 of the present embodiment has the outer surface including the propagation edge 34a, and has the near-field light generating part 34g lying at an end of the propagation edge 34a and located in the medium facing surface 12a. The propagation edge 34a faces the evanescent light generating surface 32c of the core 32 with a predetermined distance therebetween and extends in the direction perpendicular to the medium facing surface 12a. Surface plasmons 46 are excited on the propagation edge 34a through coupling with the evanescent light that occurs from the evanescent light generating surface 32c. The surface plasmons 46 are propagated along the propagation edge 34a to the near-field light generating part 34g. The near-field light generating part 34g generates near-field light 47 based on the surface plasmons 46.

According to the present embodiment, it is possible to transform the laser light that is propagated through the core 32 into near-field light with higher efficiency, as compared with the conventional technique of irradiating a plasmon antenna directly with laser light to produce near-field light from the plasmon antenna. Consequently, according to the present embodiment, it is possible to efficiently use the laser light that is propagated through the core 32, and to generate intense near-field light from the plasmon generator 34. The present embodiment also makes it possible to prevent a part of the medium facing surface 12a from protruding due to transformation of the energy of the laser light into thermal energy in the heat-assisted magnetic recording head.

The plasmon generator 34 includes the shape changing portion 341 in which the radius of curvature of the propagation edge 34a in the cross section parallel to the medium facing surface 12a continuously decreases with decreasing distance to the medium facing surface 12a. The shape changing portion 341 has an end located in the medium facing surface 12a. The radius of curvature of the propagation edge 34a at the medium facing surface 12a is equal to the minimum value of the radius of curvature of the propagation edge 34a in the shape changing portion 341.

If the plasmon generator 34 does not include the shape changing portion 341, the propagation edge 34a has the same radius of curvature as at the medium facing surface 12a across its entire length in the direction perpendicular to the medium facing surface 12a (the X direction). In such a case, if the radius of curvature of the propagation edge 34a at the medium facing surface 12a is reduced to make the spot diameter of the near-field light smaller, then the radius of curvature of the propagation edge 34a across the entire length in the direction perpendicular to the medium facing surface 12a also becomes smaller. This reduces the surface plasmons to be excited on the propagation edge 34a, so that the laser light propagated through the core 32 cannot be used with high efficiency. On the other hand, if the radius of curvature of the propagation edge 34a is made larger across the entire length in the direction perpendicular to the medium facing surface 12a, the surface plasmons to be excited on the propagation edge 34a increase, but the near-field light increases in spot diameter. This makes it difficult to increase the recording density.

In contrast, according to the present embodiment, the plasmon generator 34 includes the shape changing portion 341. This makes it possible to reduce the spot diameter of the near-field light by reducing the radius of curvature of the propagation edge 34a at the medium facing surface 12a, and also increase the surface plasmons to be excited on the propagation edge 34a by increasing the radius of curvature of the propagation edge 34a in positions away from the medium facing surface 12a. According to the present embodiment, it is therefore possible to use the light propagated through the core 32 of the waveguide with high efficiency and produce near-field light with a small spot diameter from the plasmon generator 34. Such effects are also evident from the results of first and second simulations on a second embodiment. The first and second simulations will be detailed later.

The other effects of the present embodiment will now be described. In the present embodiment, the magnetic pole 35 is in contact with the plasmon generator 34, being located at such a position that the plasmon generator 34 is interposed between the magnetic pole 35 and the core 32. According to the present embodiment, it is possible that the end face 35a of the magnetic pole 35 for generating the write magnetic field and the near-field light generating part 34g of the plasmon generator 34 for generating the near-field light can be put close to each other. This makes it possible to implement an advantageous configuration for heat-assisted magnetic recording. Moreover, according to the present embodiment, the plasmon generator 34 made of a nonmagnetic metal is disposed between the core 32 and the magnetic pole 35. The laser light propagated through the core 32 can thus be prevented from being absorbed by the magnetic pole 35. This can improve the use efficiency of the laser light propagated through the core 32.

The magnetic pole 35 is in contact with the plasmon generator 34 and also in contact with the top yoke layer 43 of high volume. Consequently, according to the present embodiment, the heat occurring from the plasmon generator 34 can be dissipated through the magnetic pole 35 and the top yoke layer 43. This can suppress an excessive rise in temperature of the plasmon generator 34, so that the front end face 34e of the plasmon generator 34 will not protrude from the medium facing surface 12a, nor will the plasmon generator 34 drop in use efficiency of the light. Moreover, according to the present embodiment, the plasmon generator 34 made of a metal is in contact with the magnetic pole 35 made of a magnetic metal material. The plasmon generator 34 is thus not electrically isolated. According to the present embodiment, it is therefore possible to avoid the occurrence of electrical static discharge (ESD) in the plasmon generator 34.

Second Embodiment

Figure 22:
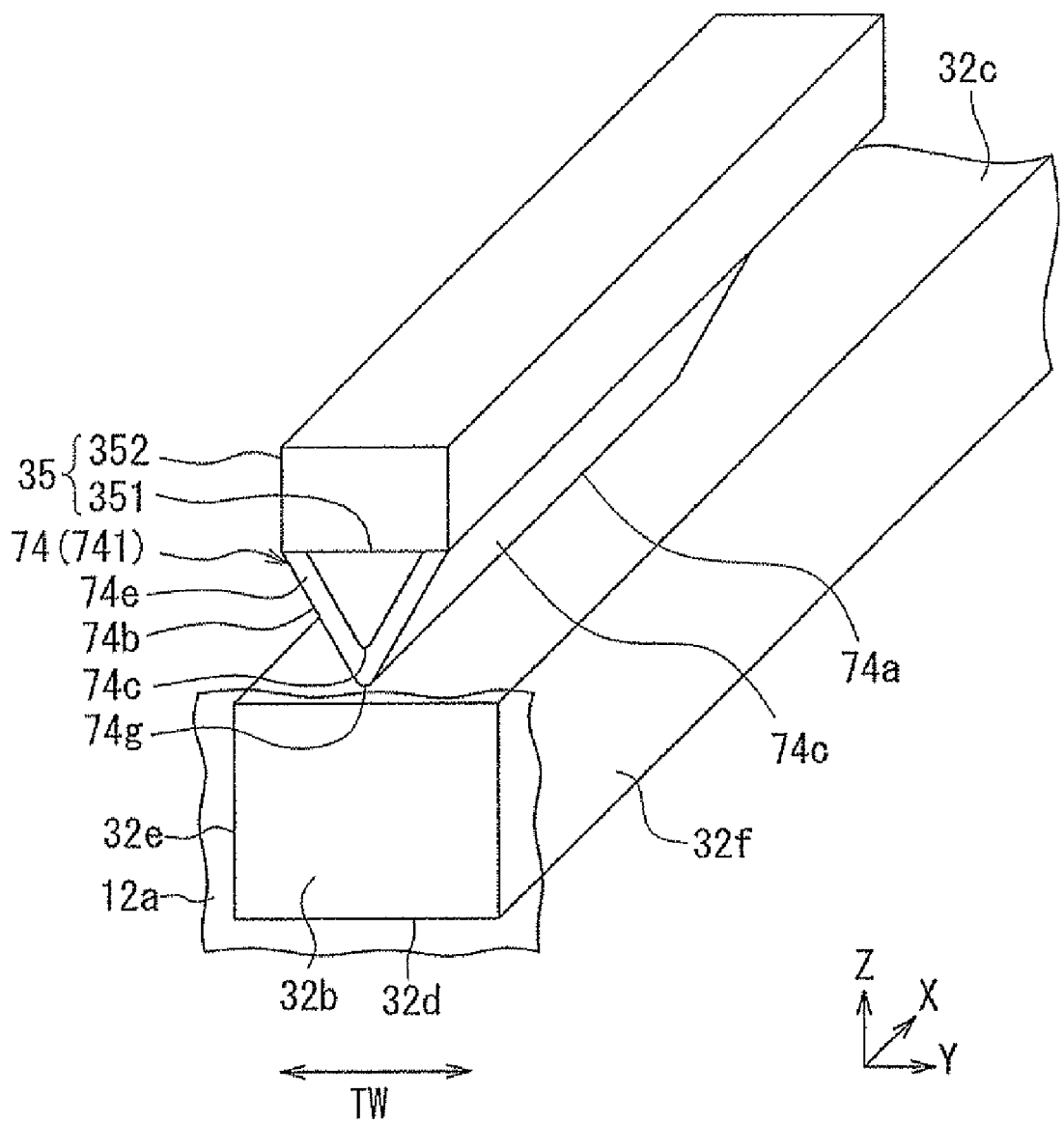
FIG. 22 is a perspective view showing a waveguide's core, a plasmon generator, and a magnetic pole of a heat-assisted magnetic recording head according to a second embodiment of the invention.
Figure 23:
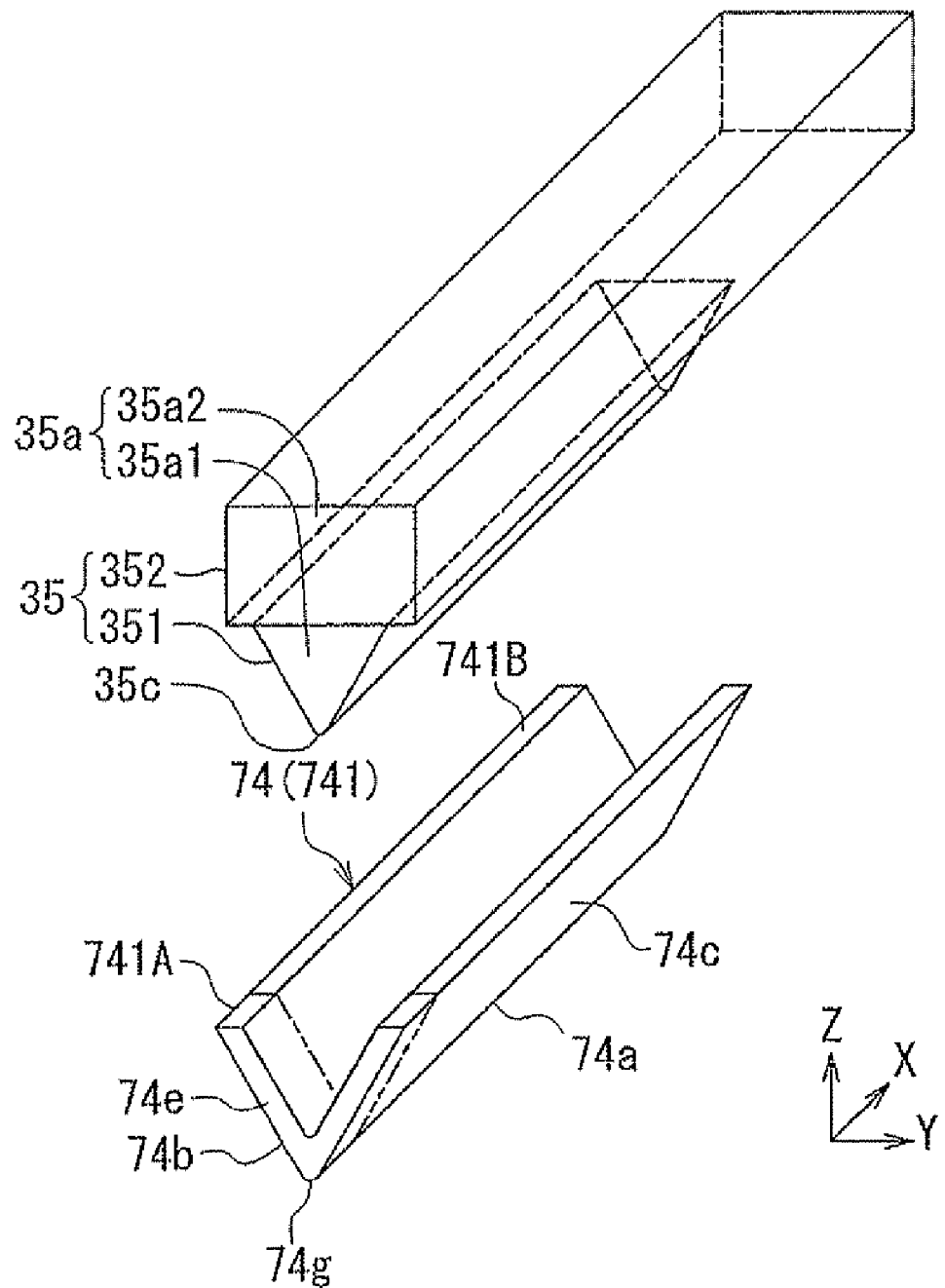
FIG. 23 is an exploded perspective view of the plasmon generator and the magnetic pole shown in FIG. 22.
Figure 24:
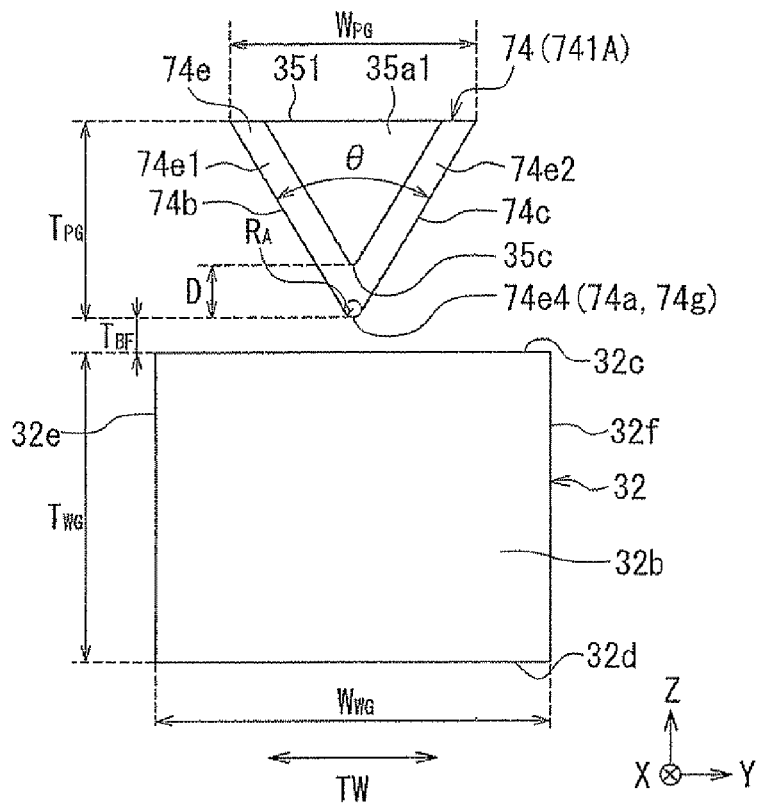
FIG. 24 is a front view showing the core, the plasmon generator, and a first layer of the magnetic pole shown in FIG. 22.
Figure 25:
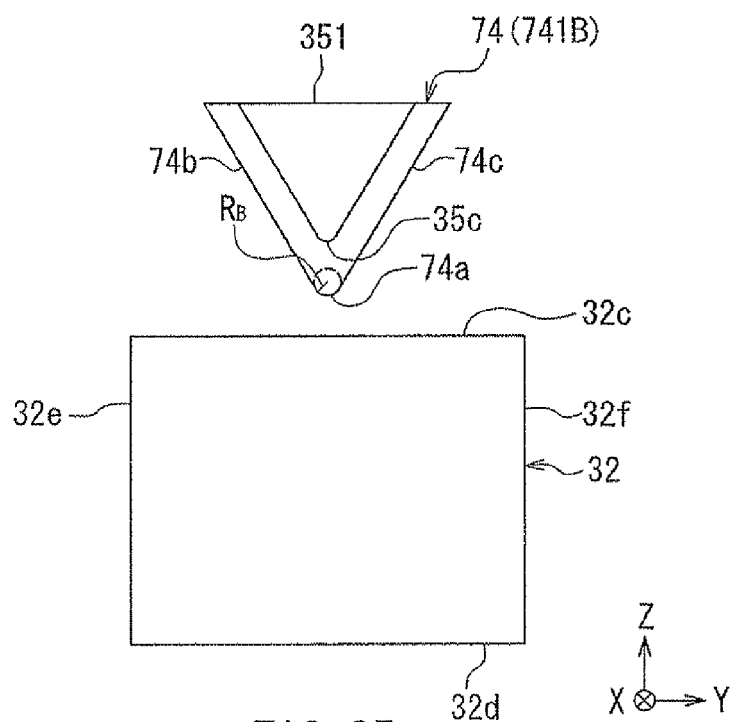
FIG. 25 is a cross-sectional view showing respective cross sections of the core, the plasmon generator, and the first layer of the magnetic pole shown in FIG. 22 parallel to the medium facing surface.
Figure 26:
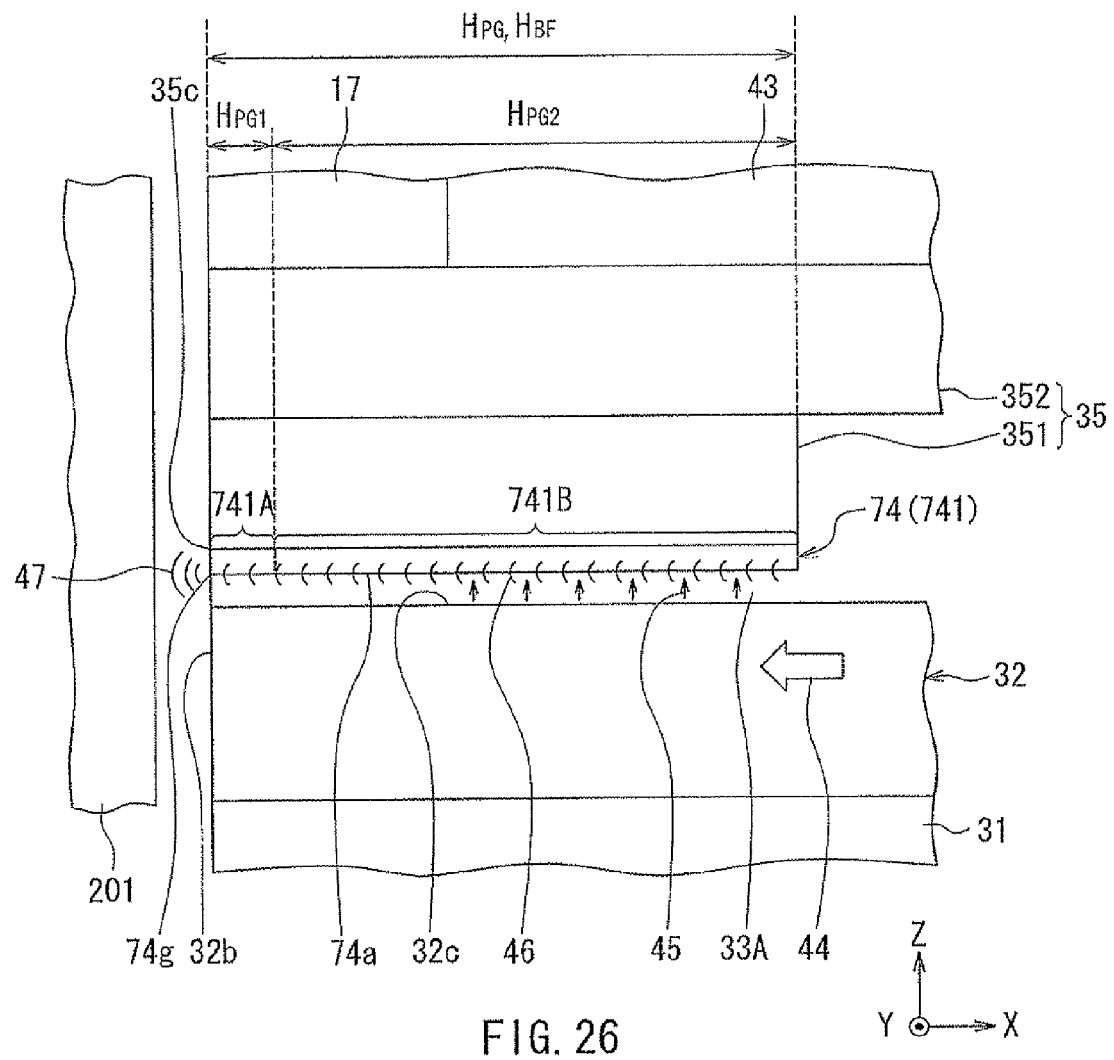
FIG. 26 is a cross-sectional view of the core, the plasmon generator, and the magnetic pole of the heat-assisted magnetic recording head according to the second embodiment of the invention.

A second embodiment of the present invention will now be described with reference to FIG. 22 to FIG. 25. FIG. 22 is a perspective view showing the core of the waveguide, the plasmon generator, and the magnetic pole of the heat-assisted magnetic recording head according to the present embodiment. FIG. 23 is an exploded perspective view of the plasmon generator and the magnetic pole shown in FIG. 22. FIG. 24 is a front view showing the core, the plasmon generator, and a first layer of the magnetic pole shown in FIG. 22. FIG. 25 is a cross-sectional view showing respective cross sections of the core, the plasmon generator, and the first layer of the magnetic pole shown in FIG. 22 parallel to the medium facing surface. FIG. 26 is a cross-sectional view showing the core of the waveguide, the plasmon generator, and the magnetic pole of the heat-assisted magnetic recording head according to the present embodiment. The heat-assisted magnetic recording head according to the present embodiment has a plasmon generator 74 instead of the plasmon generator 34 of the first embodiment.

The plasmon generator 74 has a V-shaped portion 741. The V-shaped portion 741 extends in the direction perpendicular to the medium facing surface 12a (the X direction). The V-shaped portion 741 is V-shaped in cross section parallel to the medium facing surface 12a. In the example shown in FIG. 22 and FIG. 23, the entire plasmon generator 74 is composed of the V-shaped portion 741.

The plasmon generator 74 has a near-field light generating part 74g located in the medium facing surface 12a. The outer surface of the plasmon generator 74 includes a propagation edge 74a, a first inclined surface 74b, a second inclined surface 74c, and a front end face 74e. The propagation edge 74a faces the evanescent light generating surface 32c with a predetermined distance therebetween and extends in the direction perpendicular to the medium facing surface 12a. In a cross section parallel to the medium facing surface 12a, the propagation edge 74a is shaped like a pointed edge in a macroscopic view, but has an arc shape in a microscopic view. The near-field light generating part 74g lies at an end of the propagation edge 74a. The first and second inclined surfaces 74b and 74c are each connected to the propagation edge 74a. The first and second inclined surfaces 74b and 74c increase in distance from each other with increasing distance from the propagation edge 74a. The first and second inclined surfaces 74b and 74c include surfaces of the V-shaped portion 741 that lie on opposite sides in the direction parallel to the medium facing surface 12a and the evanescent light generating surface 32c (the Y direction).

The front end face 74e is V-shaped. As shown in FIG. 24, the front end face 74e has two portions 74e1 and 74e2 that are connected to each other into a V-shape, and also has a tip 74e4 that lies at the bottom end of the front end face 74e. The tip 74e4 forms the near-field light generating part 74g. The tip 74e4 is shaped like a pointed edge in a macroscopic view, but has an arc shape in a microscopic view.

The V-shaped portion 741 includes the propagation edge 74a and the front end face 74e. The V-shaped portion 741 also includes a shape changing portion 741A and a constant shape portion 741B. The shape changing portion 741A is a portion of the V-shaped portion 741 where the cross section of the V-shaped portion 741 parallel to the medium facing surface 12a changes in shape according to the distance from the medium facing surface 12a. The change in shape is such that the radius of curvature of the propagation edge 74a in the cross section parallel to the medium facing surface 12a continuously decreases with decreasing distance to the medium facing surface 12a. The constant shape portion 741B is a portion of the V-shaped portion 741 where the cross section of the V-shaped portion 741 parallel to the medium facing surface 12a has a constant shape regardless of the distance from the medium facing surface 12a. In the constant shape portion 741B, the radius of curvature of the propagation edge 74a in the cross section parallel to the medium facing surface 12a is constant regardless of the distance from the medium facing surface 12a. It should be noted that the V-shaped portion 741 need not necessarily include the constant shape portion 741B. In such a case, the entire plasmon generator 74 is the V-shaped portion 741 and is the shape changing portion 741A.

The shape changing portion 741A has an end located in the medium facing surface 12a. The end of the shape changing portion 741A is the front end face 74e of the plasmon generator 74. The constant shape portion 741B is located farther from the medium facing surface 12a than is the shape changing portion 741A, such that the constant shape portion 741B is continuous with the shape changing portion 741A. In FIG. 23, the border between the shape changing portion 741A and the constant shape portion 741B is shown by a chain double-dashed line. In the shape changing portion 741A, the radius of curvature of the propagation edge 74a comes to a minimum at the end of the shape changing portion 741A, i.e., at the medium facing surface 12a, and comes to a maximum at the position of the border between the shape changing portion 741A and the constant shape portion 741B. The radius of curvature of the propagation edge 74a at the medium facing surface 12a is equal to the minimum value of the radius of curvature of the propagation edge 74a in the shape changing portion 741A. The radius of curvature of the propagation edge 74a in the constant shape portion 741B is equal to the maximum value of the radius of curvature of the propagation edge 74a in the shape changing portion 741A.

The magnetic pole 35 of the present embodiment includes a first layer 351, and a second layer 352 lying on the first layer 351. The first layer 351 is accommodated in the V-shaped portion 741. The magnetic pole 35 has an end face 35a located in the medium facing surface 12a. The end face 35a includes an end face 35a1 of the first layer 351 located in the medium facing surface 12a and an end face 35a2 of the second layer 352 located in the medium facing surface 12a. The end face 35a1 lies between the two portions 74e1 and 74e2 of the front end face 74e of the plasmon generator 74 and is generally triangle-shaped. The end face 35a1 has a tip 35c located at its bottom end. The second layer 352 has a bottom surface that is in contact with the top surface of the first layer 351 and the top end of the plasmon generator 74.

As shown in FIG. 24, the distance between the tip 74e4 of the front end face 74e of the plasmon generator 74 and the tip 35c of the end face 35a1 of the first layer 351 of the magnetic pole 35 will be represented by the symbol D. D preferably falls within the range of 10 to 100 nm. The angle formed between the first inclined surface 74b and the second inclined surface 74c will be represented by the symbol θ.

An example of the method of forming the plasmon generator 74 and the first layer 351 of the magnetic pole 35 will now be described. The method of forming the plasmon generator 74 and the first layer 351 of the magnetic pole 35 includes the same steps as those of the first example of the method of forming the plasmon generator 34 of the first embodiment shown in FIG. 12A to FIG. 14C or the second example of the method of forming the plasmon generator 34 of the first embodiment shown in FIG. 17A to FIG. 19C up to the step of forming a dielectric film corresponding to the dielectric film 332 of the first embodiment. After the formation of the dielectric film, the stack has a recess for accommodating the plasmon generator 74 to be formed later.

In the present embodiment, after the formation of the dielectric film, a metal film that is to become the plasmon generator 74 later is formed over the entire top surface of the stack. The metal film is formed also in the recess intended for accommodating the plasmon generator 74 to be formed later. After the formation of the metal film, the stack has a recess for accommodating the first layer 351 of the magnetic pole 35 to be formed later. Next, a magnetic film that is to become the first layer 351 of the magnetic pole 35 later is formed over the entire top surface of the stack. The magnetic film is formed into a thickness sufficient for at least filling the recess intended for accommodating the first layer 351 of the magnetic pole 35 to be formed later. Next, the metal film and the magnetic film are polished by chemical mechanical polishing, for example. This makes the metal film into the plasmon generator 74, and the magnetic film into the first layer 351 of the magnetic pole 35.

The effects of the heat-assisted magnetic recording head according to the present embodiment will now be described. In the present embodiment, the plasmon generator 74 includes the shape changing portion 741A in which the radius of curvature of the propagation edge 74a in the cross section parallel to the medium facing surface 12a continuously decreases with decreasing distance to the medium facing surface 12a. Consequently, according to the present embodiment, it is possible to use the laser light propagated through the core 32 with high efficiency and produce near-field light with a small spot diameter from the plasmon generator 74, as with the first embodiment. Such effects will now be described in detail with reference to the results of first and second simulations.

A description will initially be given of the result of the first simulation that was conducted to examine the relationship between the radius of curvature of the propagation edge and the light use efficiency, and the relationship between the radius of curvature of the propagation edge and the spot diameter of the near-field light. The first simulation used a model including a plasmon generator composed of a V-shaped portion that included only the constant shape portion 741B without the shape changing portion 741A (this plasmon generator will hereinafter be referred to as a plasmon generator of a first comparative example), instead of the plasmon generator 74 of the present embodiment. In the plasmon generator of the first comparative example, the propagation edge had a constant radius of curvature across the entire length in the direction perpendicular to the medium facing surface 12a.

In the first simulation, tantalum oxide was selected as the material of the core 32, alumina was selected as the material of the clad, and Au was selected as the material of the plasmon generator 74. The core 32 was 0.4 μm both in width $W_{WG}$ and thickness $T_{WG}$ in the vicinity of the plasmon generator 74. Both the distance between the tip of the front end face of the plasmon generator and the tip 35c of the end face 35a1 of the first layer 351 of the magnetic pole 35 and the distance between the propagation edge and the evanescent light generating surface 32c were 35 nm. The angle θ was 60 degrees. The length of the plasmon generator in the X direction was 1.5 μm. The dimension of the plasmon generator in the Z direction at the medium facing surface 12a was 0.2 μm. A Gaussian beam with a wavelength of 800 nm was selected as the laser light to be propagated through the core 32. The propagation edge had four types of radii of curvature, 5 nm, 10 nm, 15 nm, and 20 nm.

In the first simulation, the intensity distribution of the near-field light at the surface of a magnetic recording medium 201 located 6 nm away from the medium facing surface 12*a* was determined by using a three-dimensional finite-difference time-domain method (FDTD method). From the intensity distribution, the light use efficiency and the spot diameter of the near-field light (hereinafter, referred to as a light spot diameter) were determined. The light use efficiency was defined as the maximum value in the intensity distribution of the near-field light, divided by the intensity of the laser light incident on the core 32, in percentage figures. The light spot diameter was defined as the distance between two points having a value of $1/e^2$ the peak value in the intensity distribution.

Figure 27:
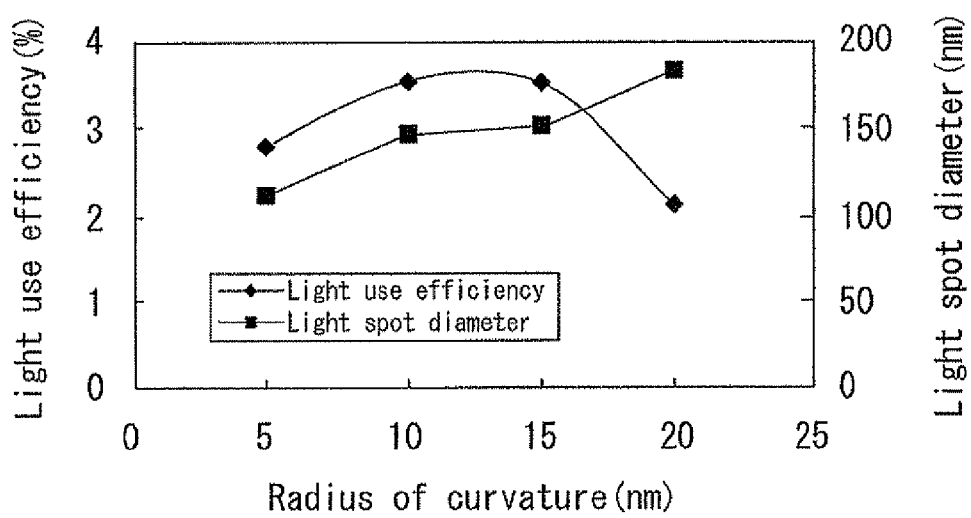
FIG. 27 is a characteristic chart showing the light use efficiency and the spot diameter of the near-field light in a model including a plasmon generator of a first comparative example, determined by a first simulation.

FIG. 27 shows the result of the first simulation. In FIG. 27, the horizontal axis indicates the radius of curvature of the propagation edge. The vertical axis on the left indicates the light use efficiency, and the vertical axis on the right indicates the light spot diameter. As shown in FIG. 27, the light use efficiency peaks when the propagation edge has a radius of curvature in the range of 10 nm to 15 nm. As shown in FIG. 27, the light spot diameter decreases as the propagation edge decreases in the radius of curvature. If the radius of curvature of the propagation edge is reduced to below 10 nm in order to reduce the light spot diameter, the light use efficiency drops as compared to when the propagation edge has a radius of curvature in the range of 10 nm to 15 nm. The reason why the light use efficiency drops when the radius of curvature of the propagation edge falls below 10 nm is considered to be that surface plasmons excited on the propagation edge decrease.

Next, a description will be given of the second simulation that was conducted to examine the relationship of the presence/absence of the shape changing portion 741A in the plasmon generator 74 with the light use efficiency and the light spot diameter. In the second simulation, the light use efficiency and the light spot diameter were determined by using the model including the plasmon generator of the first comparative example which was used in the first simulation, and a model including the plasmon generator 74 composed of the V-shaped portion 741 that included both the shape changing portion 741A and the constant shape portion 741B (hereinafter, referred to as the plasmon generator of a first practical example).

In the second simulation, the radius of curvature $R_A$ of the propagation edge 74*a* at the medium facing surface 12*a* (the minimum radius of curvature of the propagation edge 74*a* in the shape changing portion 741A) was 5 nm. The radius of curvature $R_B$ of the propagation edge 74*a* in the constant shape portion 741B (the maximum radius of curvature of the propagation edge 74*a* in the shape changing portion 741A) was 15 nm. The length $H_{PG}$ of the plasmon generator 74 in the X direction was 1.5 μm. The length $H_{PG1}$ of the shape changing portion 741A in the X direction was 0.1 μm. The rest of the condition of the model including the plasmon generator of the first practical example was the same as that of the model including the plasmon generator of the first comparative example.

Table 1 shows the result of the second simulation. As shown in Table 1, with the model including the plasmon generator of the first comparative example, the light spot diameter decreases from 135 nm to 101 nm when the radius of curvature of the propagation edge is reduced from 15 nm to 5 nm. With the model including the plasmon generator of the first comparative example, the light use efficiency falls from 3.5% to 2.8% when the radius of curvature of the propagation edge is reduced from 15 nm to 5 nm. In contrast, the model of the first practical example is capable of providing a light use efficiency equivalent to that of the model of the first comparative example when the propagation edge has a radius of curvature of 15 nm, and also providing a light spot diameter close to that of the model of the first comparative example when the propagation edge has a radius of curvature of 5 nm.

TABLE 1

|  | Radius of curvature of propagation edge (nm) | Light use efficiency (%) | Spot diameter of near-field light (nm) |
| --- | --- | --- | --- |
| First comparative example | 5 | 2.8 | 101 |
|  | 15 | 3.5 | 135 |
| First practical example | $R_A = 5$ $R_B = 15$ | 3.4 | 107 |

As can be seen from the results of the foregoing first and second simulations, it is possible according to the present embodiment to reduce the light spot diameter and increase the light use efficiency as well. That is, according to the present embodiment, it is possible to use the laser light that is propagated through the core 32 with high efficiency and to produce near-field light with a small spot diameter from the plasmon generator 74.

The propagation edge 34*a* and its vicinity in the plasmon generator 34 of the first embodiment have the same shape as the shape of the propagation edge 74*a* and its vicinity in the plasmon generator 74. The near-field light generating part 34*g* and its vicinity in the plasmon generator 34 of the first embodiment have the same shape as the shape of the near-field light generating part 74*g* and its vicinity in the plasmon generator 74. Consequently, the foregoing effects that have been described with reference to the results of the first and second simulations also apply to the plasmon generator 34 of the first embodiment. In other words, it is apparent that the inclusion of the shape changing portion 341 in the plasmon generator 34 in the first embodiment also makes it possible to reduce the light spot diameter and increase the light use efficiency as well.

The other effects of the present embodiment will now be described. In the present embodiment, the front end face 74*e* of the plasmon generator 74 has the two portions 74*e*1 and 74*e*2 that are connected to each other into a V-shape. The end face 35*a* of the magnetic pole 35 located in the medium facing surface 12*a* includes the end face 35*a*1 of the first layer 351, which is a generally triangle-shaped portion lying between the two portions 74*e*1 and 74*e*2 of the front end face 74*e*. The end face 35*a*1 has the tip 35*c* located at its bottom end. Of the end face 35*a* of the magnetic pole 35, the tip 35*c* is closest to the bottom shield layer 29. Magnetic fluxes therefore concentrate at the vicinity of the tip 35*c* of the end face 35*a* of the magnetic pole 35, so that a high write magnetic field occurs from the vicinity of the tip 35*c*. Consequently, according to the present embodiment, the position of occurrence of a high write magnetic field in the end face 35*a* of the magnetic pole 35 can be brought closer to the near-field light generating part 74*g* of the plasmon generator 74 which generates near-field light.

The remainder of configuration, function and effects of the present embodiment are similar to those of the first embodiment.

Third Embodiment

Figure 28:
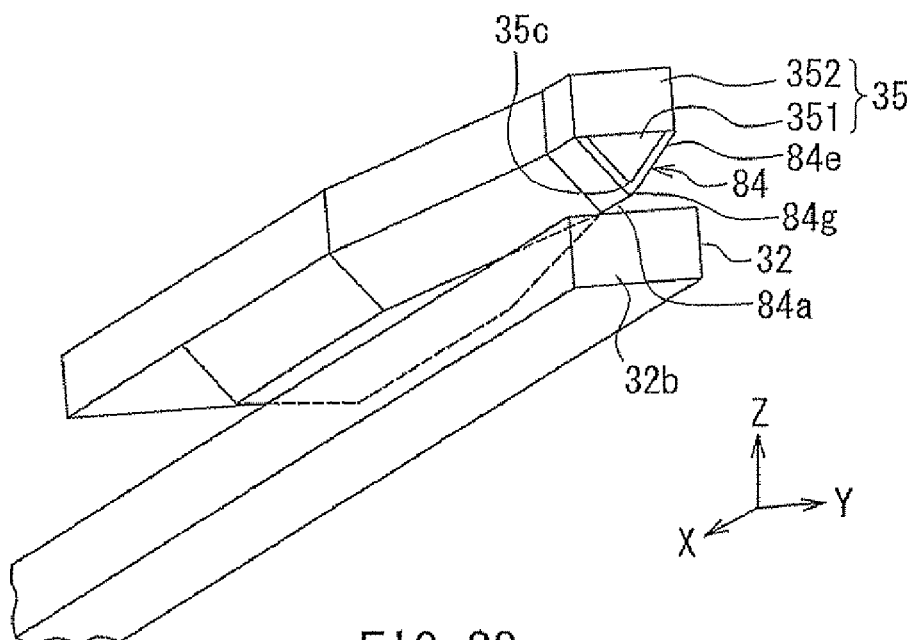
FIG. 28 is a perspective view showing a waveguide's core, a plasmon generator, and a magnetic pole of a heat-assisted magnetic recording head according to a third embodiment of the invention.
Figure 29:
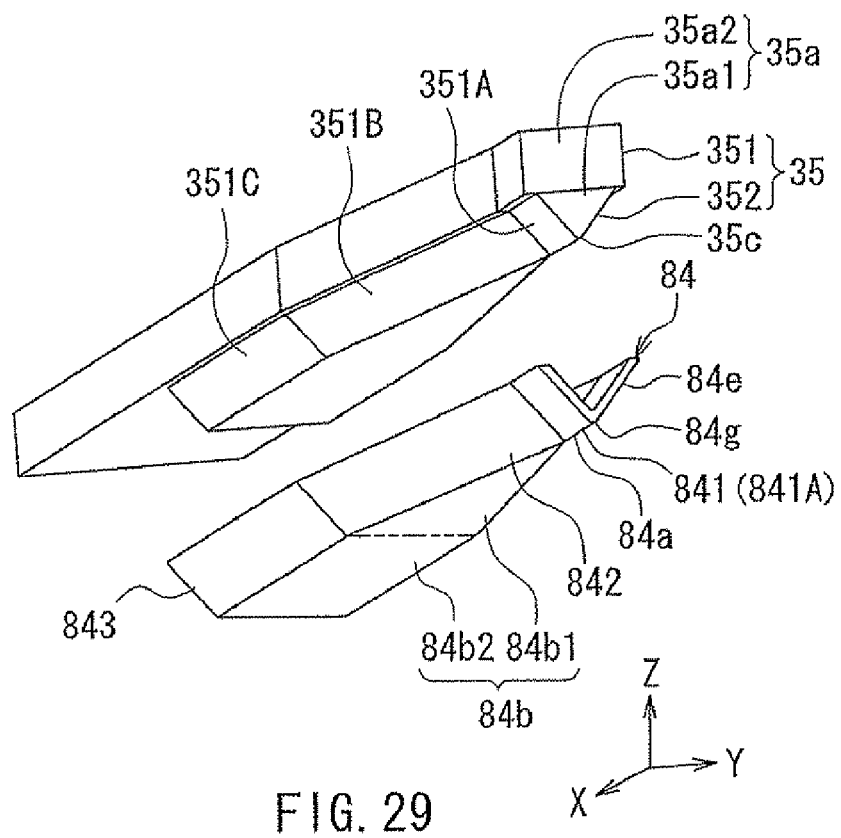
FIG. 29 is an exploded perspective view of the plasmon generator and the magnetic pole shown in FIG. 28.
Figure 30:
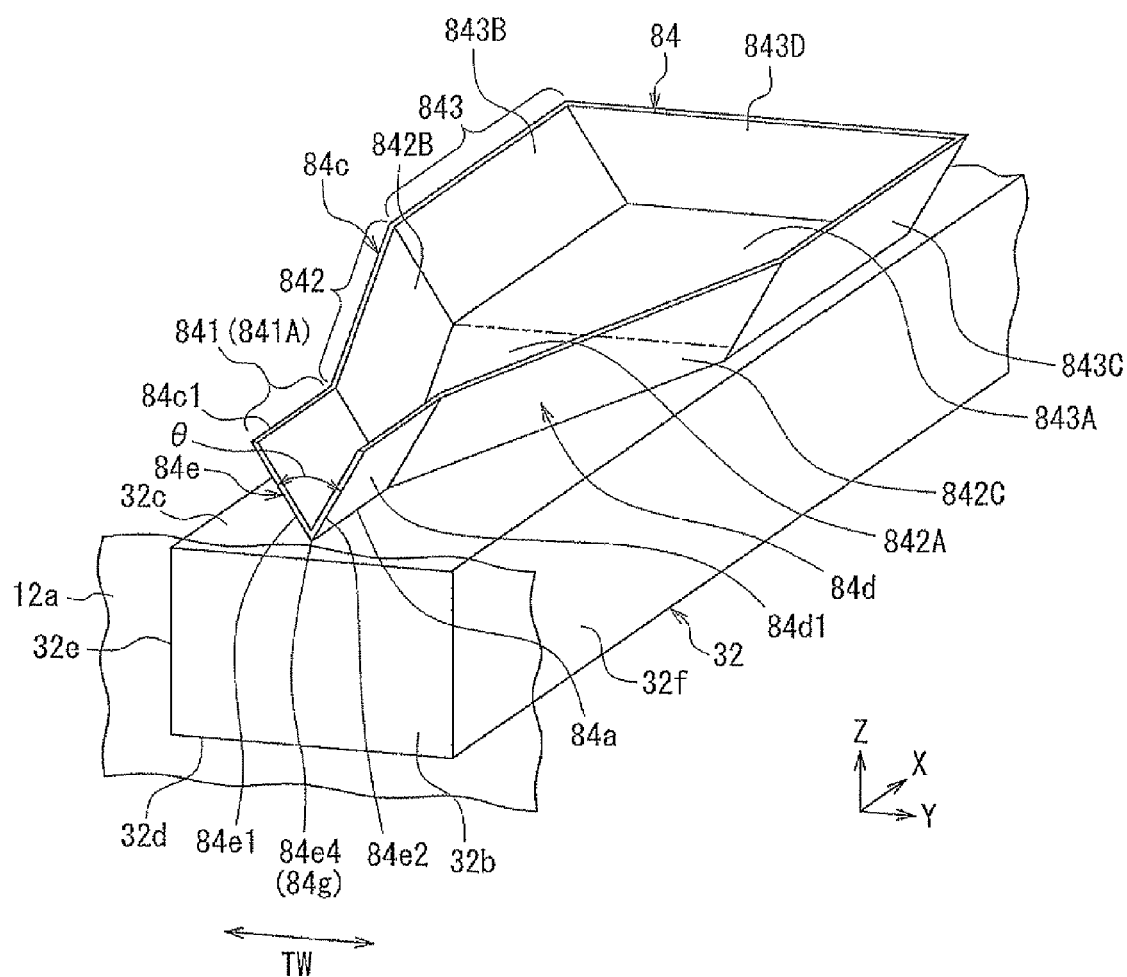
FIG. 30 is a perspective view of the core and the plasmon generator shown in FIG. 28.

A third embodiment of the present invention will now be described with reference to FIG. 28 to FIG. 30. FIG. 28 is a perspective view showing the core of the waveguide, the plasmon generator, and the magnetic pole of the present embodiment. FIG. 29 is an exploded perspective view of the plasmon generator and the magnetic pole shown in FIG. 28. FIG. 30 is a perspective view of the core and the plasmon generator shown in FIG. 28. The heat-assisted magnetic recording head according to the present embodiment has a plasmon generator 84 instead of the plasmon generator 34 of the first embodiment. In the present embodiment, as in the second embodiment, the magnetic pole 35 includes a first layer 351 and a second layer 352, the second layer 352 lying on the first layer 351.

As shown in FIG. 30, the plasmon generator 84 has a V-shaped portion 841 that has an end face located in the medium facing surface 12a. The V-shaped portion 841 extends in the direction perpendicular to the medium facing surface 12a (the X direction). The V-shaped portion 841 is V-shaped in cross section parallel to the medium facing surface 12a.

The plasmon generator 84 further has a second portion 842 and a third portion 843. The second portion 842 is located farther from the medium facing surface 12a than is the V-shaped portion 841, such that the second portion 842 is continuous with the V-shaped portion 841. The third portion 843 is located farther from the medium facing surface 12a than is the second portion 842, such that the third portion 843 is continuous with the second portion 842. In FIG. 30, the border between the second portion 842 and the third portion 843 is shown by a chain double-dashed line.

The second portion 842 has: a bottom part 842A that is shaped like a plate and faces the evanescent light generating surface 32c; and two sidewall parts 842B and 842C that are each shaped like a plate. The sidewall parts 842B and 842C are located farther from the evanescent light generating surface 32c than is the bottom part 842A, and are connected to opposite ends of the bottom part 842A in the direction parallel to the medium facing surface 12a and the evanescent light generating surface 32c (the Y direction). The bottom part 842A and the sidewall parts 842B and 842C are located farther from the medium facing surface 12a than is the V-shaped portion 841, such that they are continuous with the V-shaped portion 841.

The bottom part 842A has a width that decreases with decreasing distance to the medium facing surface 12a, the width being in the direction parallel to the medium facing surface 12a and the evanescent light generating surface 32c (the Y direction). The bottom part 842A has an end closer to the medium facing surface 12a. At this end of the bottom part 842A, the bottom part 842A has a zero width and the respective bottom ends of the sidewall parts 842B and 842C are in contact with each other.

The distance between the two sidewall parts 842B and 842C in the direction parallel to the medium facing surface 12a and the evanescent light generating surface 32c (the Y direction) increases with increasing distance from the evanescent light generating surface 32c, and decreases with decreasing distance to the medium facing surface 12a.

The third portion 843 has: a bottom part 843A that is continuous with the bottom part 842A of the second portion 842; a sidewall part 843B that is continuous with the sidewall part 842B of the second portion 842; a sidewall part 843C that is continuous with the sidewall part 842C of the second portion 842; and a wall part 843D that connects respective ends of the bottom part 843A and the sidewall parts 843B and 843C to each other, the ends being farther from the medium facing surface 12a. The bottom part 843A has a constant width in the direction parallel to the medium facing surface 12a and the evanescent light generating surface 32c (the Y direction) regardless of the distance from the medium facing surface 12a. Note that the third portion 843 need not necessarily have the wall part 843D.

The distance between the two sidewall parts 843B and 843C in the direction parallel to the medium facing surface 12a and the evanescent light generating surface 32c (the Y direction) increases with increasing distance from the evanescent light generating surface 32c, but does not change according to the distance from the medium facing surface 12a.

As shown in FIG. 30, the V-shaped portion 841, the second portion 842, and the third portion 843 of the plasmon generator 84 form inside a space for accommodating the first layer 351 of the magnetic pole 35. Note that the plasmon generator 84 need not necessarily have the third portion 843.

The plasmon generator 84 has an outer surface including a plurality of portions described below, and has a near-field light generating part 84g located in the medium facing surface 12a. As shown in FIG. 29, the outer surface of the plasmon generator 84 includes a propagation edge 84a that faces the evanescent light generating surface 32c with a predetermined distance therebetween and extends in the direction perpendicular to the medium facing surface 12a. The propagation edge 84a is formed by the bottom end of the V-shaped portion 841. In a cross section parallel to the medium facing surface 12a, the propagation edge 84a is shaped like a pointed edge in a macroscopic view, but has an arc shape in a microscopic view. The near-field light generating part 84g lies at an end of the propagation edge 84a.

The outer surface of the plasmon generator 84 further includes a plasmon exciting surface 84b which is a flat surface that faces the evanescent light generating surface 32c with a predetermined distance therebetween. The plasmon exciting surface 84b includes a width changing portion 84b1 formed by the bottom surface of the bottom part 842A of the second portion 842, and a constant width portion 84b2 formed by the bottom surface of the bottom part 843A of the third portion 843. In FIG. 29, the border between the width changing portion 84b1 and the constant width portion 84b2 is shown by a chain double-dashed line.

The width changing portion 84b1 has a width that decreases with decreasing distance to the medium facing surface 12a, the width being in the direction parallel to the medium facing surface 12a and the evanescent light generating surface 32c (the Y direction). The width changing portion 84b1 has two sides that are opposite in the direction of the width (the Y direction). The angle that one of the two sides forms with respect to the direction perpendicular to the medium facing surface 12a (the X direction) is equal to the angle that the other of the two sides forms with respect to the direction perpendicular to the medium facing surface 12a (the X direction). This angle falls within the range of 3 to 50 degrees, and preferably within the range of 10 to 25 degrees.

The constant width portion 84b2 is located farther from the medium facing surface 12a than is the width changing portion 84b1, such that the constant width portion 84b2 is continuous with the width changing portion 84b1. The constant width portion 84b2 has a constant width in the direction parallel to the medium facing surface 12a and the evanescent light generating surface 32c (the Y direction) regardless of the distance from the medium facing surface 12a.

The part of the clad layer 33 that is interposed between the evanescent light generating surface 32c and each of the propagation edge 84a and the plasmon exciting surface 84b forms a buffer part 33A having a refractive index lower than that of the core 32.

The outer surface of the plasmon generator 84 further includes a first inclined surface 84c and a second inclined surface 84d that are each connected to the propagation edge 84a and the plasmon exciting surface 84b. The first and second inclined surfaces 84c and 84d increase in distance from each other with increasing distance from the propagation edge 84a and the plasmon exciting surface 84b. The propagation edge 84a and the plasmon exciting surface 84b connect respective ends of the inclined surfaces 84c and 84d to each other, the ends being closer to the evanescent light generating surface 32c. The first inclined surface 84c includes an inclined surface 84c1 that is included in the V-shaped portion 841. The second inclined surface 84d includes an inclined surface 84d1 that is included in the V-shaped portion 841. The propagation edge 84a is formed by the inclined surfaces 84c1 and 84d1 meeting each other. As shown in FIG. 30, the angle formed between the inclined surfaces 84c1 and 84d1 will be represented by the symbol θ.

The outer surface of the plasmon generator 84 further includes a front end face 84e located in the medium facing surface 12a. The front end face 84e is formed by the end face of the V-shaped portion 841. The front end face 84e has two portions 84e1 and 84e2 that are connected to each other into a V-shape, and a tip 84e4 that lies at the bottom end of the front end face 84e. The tip 84e4 forms the near-field light generating part 84g. The tip 84e4 is shaped like a pointed edge in a macroscopic view, but has an arc shape in a microscopic view.

The V-shaped portion 841 includes a shape changing portion 841A. The shape changing portion 841A is a portion of the V-shaped portion 841 where the cross section of the V-shaped portion 841 parallel to the medium facing surface 12a changes in shape according to the distance from the medium facing surface 12a. The change in shape is such that the radius of curvature of the propagation edge 84a in the cross section parallel to the medium facing surface 12a continuously decreases with decreasing distance to the medium facing surface 12a. In the example shown in FIG. 28 to FIG. 30, the entire V-shaped portion 841 is composed of the shape changing portion 841A. The shape changing portion 841A has an end located in the medium facing surface 12a. The end of the shape changing portion 841A is the end face of the V-shaped portion 841 and also is the front end face 84e of the plasmon generator 84. The V-shaped portion 841 may include a constant shape portion where the cross section of the V-shaped portion 841 parallel to the medium facing surface 12a has a constant shape regardless of the distance from the medium facing surface 12a. In the constant shape portion, the radius of curvature of the propagation edge 84a in the cross section parallel to the medium facing surface 12a is constant regardless of the distance from the medium facing surface 12a. In such a case, the constant shape portion is located farther from the medium facing surface 12a than is the shape changing portion 841A, such that the constant shape portion is continuous with the shape changing portion 841A.

As shown in FIG. 29, the magnetic pole 35 has an end face 35a located in the medium facing surface 12a. The end face 35a includes an end face 35a1 of the first layer 351 located in the medium facing surface 12a and an end face 35a2 of the second layer 352 located in the medium facing surface 12a.

The first layer 351 of the magnetic pole 35 is accommodated in the space formed by the V-shaped portion 841, the second portion 842, and the third portion 843 of the plasmon generator 84. The first layer 351 includes a first portion 351A, a second portion 351B, and a third portion 351C. The first portion 351A is accommodated in the space formed by the V-shaped portion 841. The second portion 351B is accommodated in the space formed by the second portion 842 (the bottom part 842A and the sidewall parts 842B and 842C). The third portion 3510 is accommodated in the space formed by the third portion 843 (the bottom part 843A and the sidewall parts 843B and 8430).

The first portion 351A is generally triangular-prism-shaped. The first portion 351A has a constant width in the direction parallel to the medium facing surface 12a and the evanescent light generating surface 32c (the Y direction) regardless of the distance from the medium facing surface 12a. The end face of the first portion 351A located in the medium facing surface 12a, i.e., the end face 35a1 of the first layer 351 located in the medium facing surface 12a, lies between the two portions 84e1 and 84e2 of the front end face 84e of the plasmon generator 84, and is generally triangle-shaped. The end face 35a1 has a tip 35c located at its bottom end.

The second portion 351B lies between the two sidewall parts 842B and 842C of the second portion 842 of the plasmon generator 84, and is in contact with the bottom part 842A and the two sidewall parts 842B and 842C. The width of the second portion 351B in the direction parallel to the medium facing surface 12a and the evanescent light generating surface 32c (the Y direction) increases with increasing distance from the evanescent light generating surface 32c, and decreases with decreasing distance to the medium facing surface 12a.

The third portion 3510 lies between the two sidewall parts 843B and 843C of the third portion 843 of the plasmon generator 84, and is in contact with the bottom part 843A and the two sidewall parts 843B and 843C. The width of the third portion 351C in the direction parallel to the medium facing surface 12a and the evanescent light generating surface 32c (the Y direction) increases with increasing distance from the evanescent light generating surface 32c, but does not change according to the distance from the medium facing surface 12a.

The second layer 352 of the magnetic pole 35 has a bottom surface that is in contact with the top surface of the first layer 351 and the top end of the plasmon generator 84.

The length of the plasmon generator 84 in the X direction falls within the range of 0.6 to 4.0 μm, for example. The length of the V-shaped portion 841 in the X direction falls within the range of 0.01 to 1.0 μm, for example. The length of the second portion 842 in the X direction falls within the range of 0.1 to 4.0 μm, for example. The length of the third portion 843 in the X direction falls within the range of 0.0 to 3.9 μm, for example.

As in the second embodiment, the distance between the tip 84e4 of the front end face 84e of the plasmon generator 84 and the tip 35c of the end face 35a1 of the first layer 351 of the magnetic pole 35 preferably falls within the range of 10 to 100 nm.

An example of the method of forming the plasmon generator 84 and the first layer 351 of the magnetic pole 35 will now be described with reference to FIG. 31A to FIG. 35C. FIG. 31A to FIG. 35C each show a part of a stack of layers fabricated in the process of forming the plasmon generator 84 and the first layer 351 of the magnetic pole 35. Of FIG. 31A to FIG. 35C, FIG. nA (n is any integer between 31 and 35 inclusive) is a plan view of a part of the stack. FIG. nB is a cross-sectional view of a part of the stack at the position shown by the line nB-nB in FIG. nA. FIG. nC is a cross-sectional view of a part of the stack at the position shown by the line nC-nC in FIG. nA. The position shown by the line nB-nB is the position where the medium facing surface 12a is to be formed.

Figure 31A:
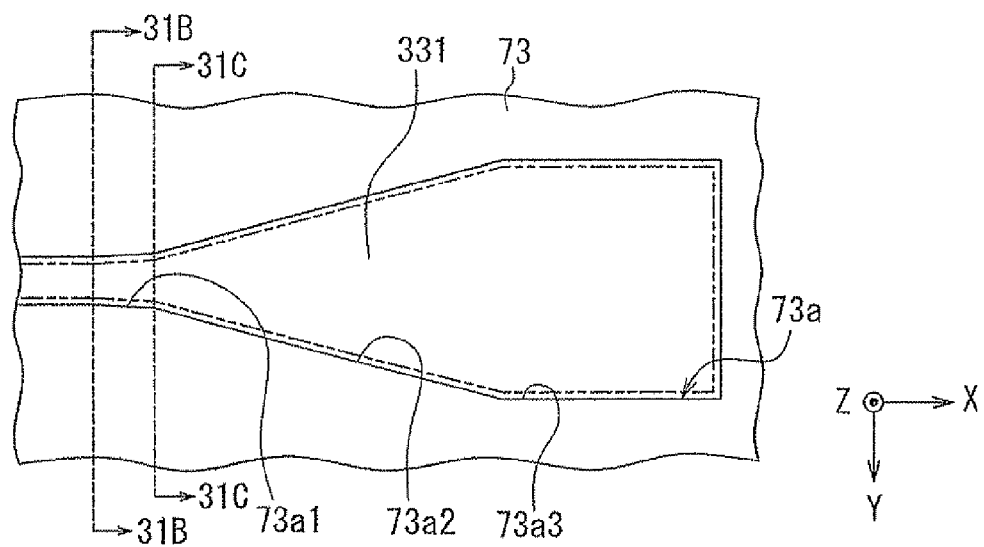
FIG. 31A to FIG. 31C are explanatory diagrams showing a step of an example of the method of forming the plasmon generator and the first layer of the magnetic pole of the third embodiment of the invention.
Figure 31B:
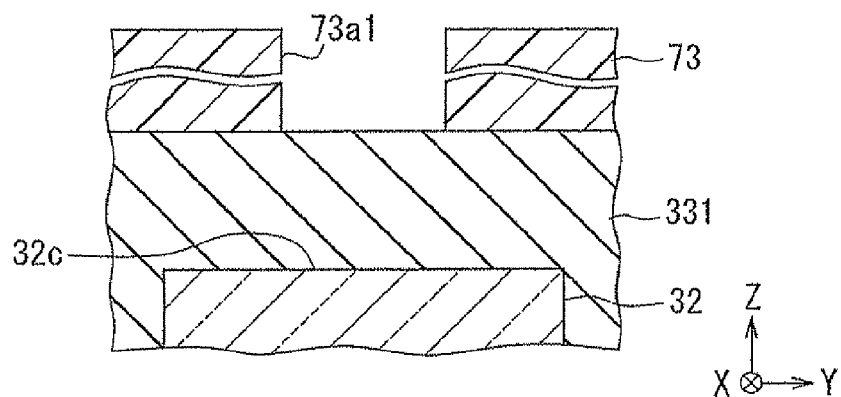
Figure 31C:
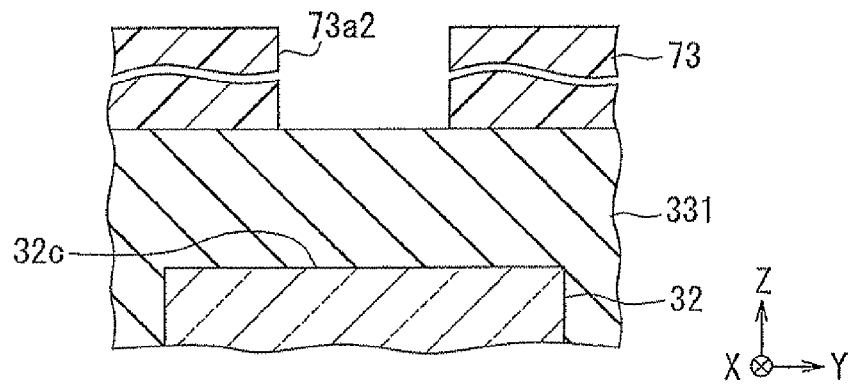

FIG. 31A to FIG. 31C show a step of the method of forming the plasmon generator 84 and the first layer 351 of the magnetic pole 35. In this step, the core 32 of the waveguide is initially formed on the clad layer 31 and then a dielectric layer 331 is formed to cover the clad layer 31 and the core 32. The material of the dielectric layer 331 is the same as that of the clad layer 33. Next, an etching mask 73 made of photoresist or metal is formed on the dielectric layer 331. The etching mask 73 has an opening 73a that has a size slightly larger than the outer edge (shown by a chain double-dashed line in FIG. 31A) of the top end of the plasmon generator 84 to be formed later. The opening 73a includes a first width changing portion 73a1 that has a shape corresponding to the planar shape of the V-shaped portion 841, a second width changing portion 73a2 that has a shape corresponding to the planar shape of the second portion 842, and a constant width portion 73a3 that has a shape corresponding to the planar shape of the third portion 843. The width changing portions 73a1 and 73a2 continuously decrease in width in the Y direction with decreasing distance to the position where the medium facing surface 12a is to be formed. The constant width portion 73a3 has a constant width in the Y direction regardless of the distance from the position where the medium facing surface 12a is to be formed. The Y-direction width of the width changing portion 73a1 in the position where the medium facing surface 12a is to be formed is slightly smaller than that in the position of the border between the width changing portions 73a1 and 73a2.

Figure 32A:
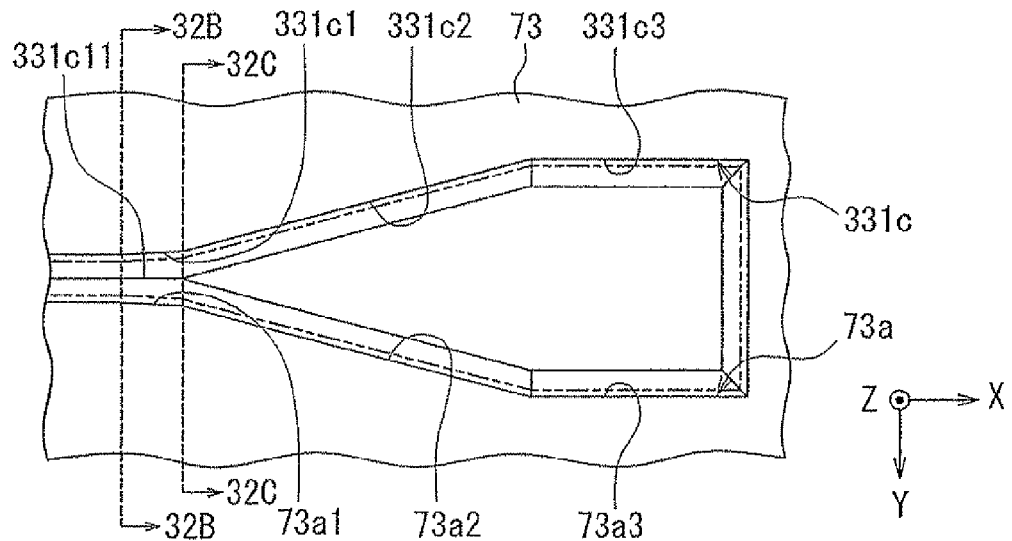
FIG. 32A to FIG. 32C are explanatory diagrams showing a step that follows the step shown in FIG. 31A to FIG. 31C.
Figure 32B:
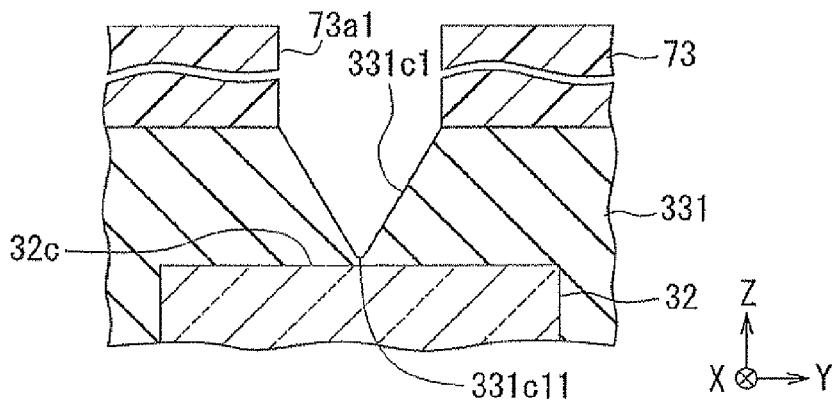
Figure 32C:
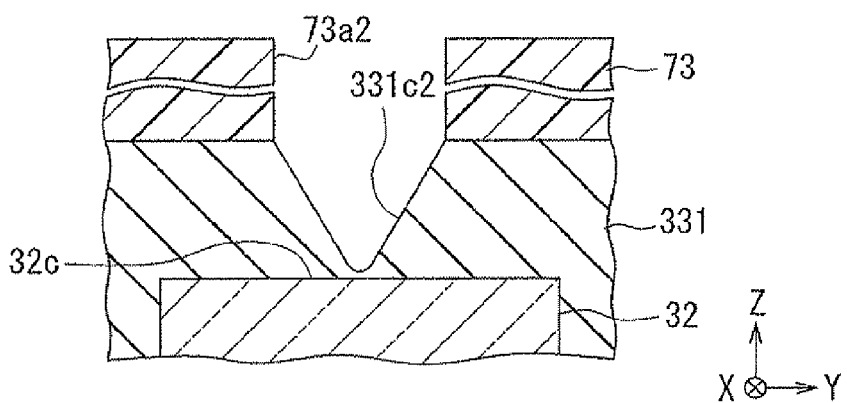

FIG. 32A to FIG. 32C show the next step. In this step, the dielectric layer 331 is etched by, for example, ion beam etching or reactive ion etching, whereby a groove 331c is formed in the dielectric layer 331. The groove 331c is shaped to be slightly larger than the outer shape of the plasmon generator 84 to be formed later. The groove 331c includes a V-shaped groove 331c1 that has a shape corresponding to the V-shaped portion 841, a width changing portion 331c2 that has a shape corresponding to the second portion 842, and a constant width portion 331c3 that has a shape corresponding to the third portion 843. The groove 331c is formed such that its bottom end reaches the evanescent light generating surface 32c or faces the evanescent light generating surface 32c with a predetermined distance therebetween. In this step, the V-shaped groove 331c1 is formed so that the radius of curvature of its bottom end 331c11 continuously decreases with decreasing distance to the position where the medium facing surface 12a is to be formed. The reason that the groove 331c1 is formed in such a shape is the same as the reason described for the shape changing portion 331b2 of the groove 331b in the second example of the method of forming the plasmon generator 34 in the first embodiment. Next, the etching mask 73 is removed.

Figure 33A:
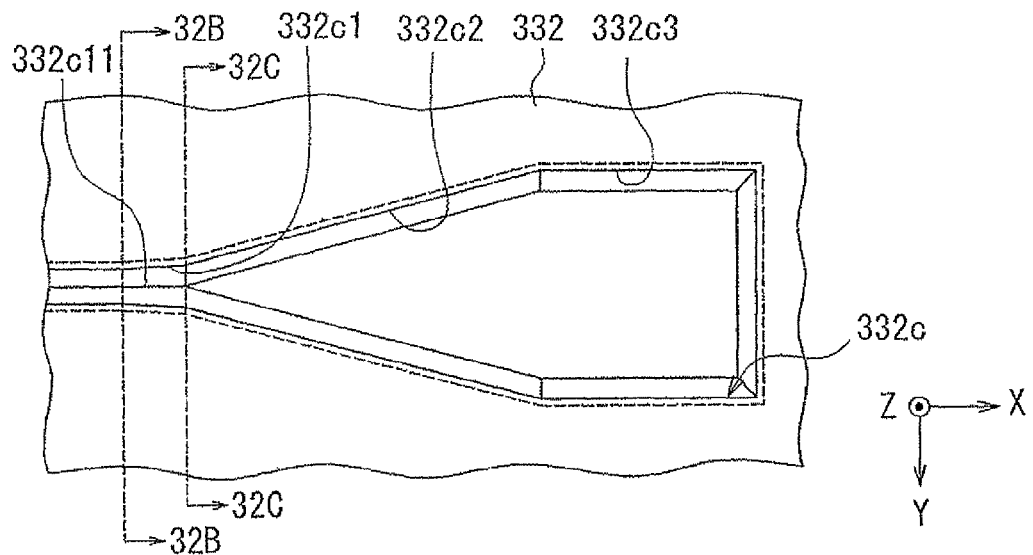
FIG. 33A to FIG. 33C are explanatory diagrams showing a step that follows the step shown in FIG. 32A to FIG. 32C.
Figure 33B:
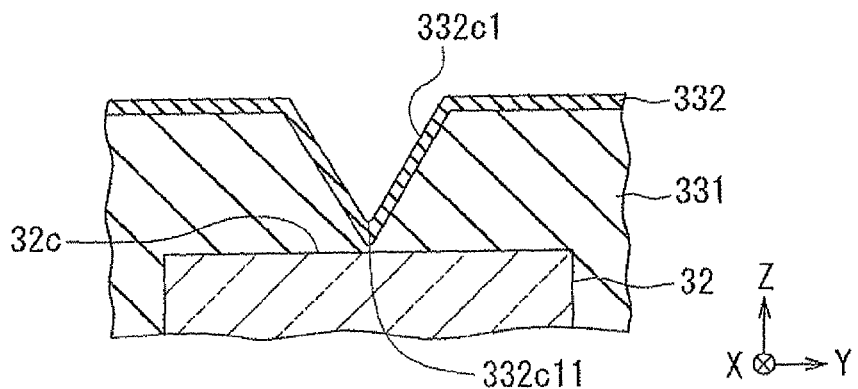
Figure 33C:
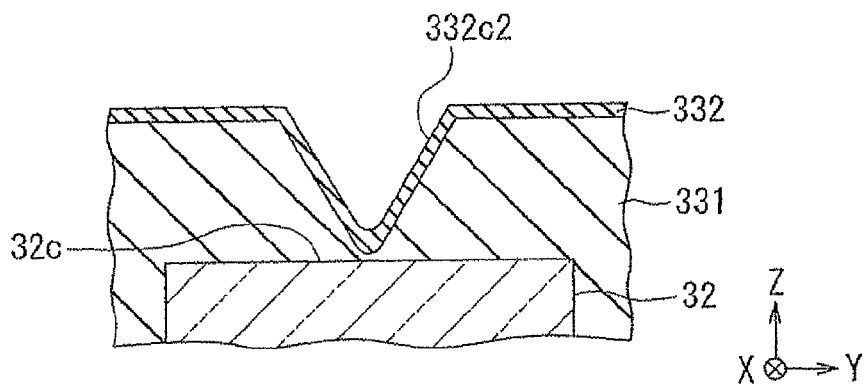

FIG. 33A to FIG. 33C show the next step. In this step, a dielectric film 332 is formed by, for example, sputtering, so as to cover the entire top surface of the stack shown in FIG. 32A to FIG. 32C. The material of the dielectric film 332 is the same as that of the clad layer 33. The dielectric film 332 is formed also in the groove 331c. The stack after the formation of the dielectric film 332 has a recess 332c for accommodating the plasmon generator 84 to be formed later. The recess 332c includes a first portion 332c1 that has a shape corresponding to the V-shaped portion 841, a second portion 332c2 that has a shape corresponding to the second portion 842, and a third portion 332c3 that has a shape corresponding to the third portion 843. In the first portion 332c1, the radius of curvature of the bottom end 332c11 continuously decreases with decreasing distance to the position where the medium facing surface 12a is to be formed.

Figure 34A:
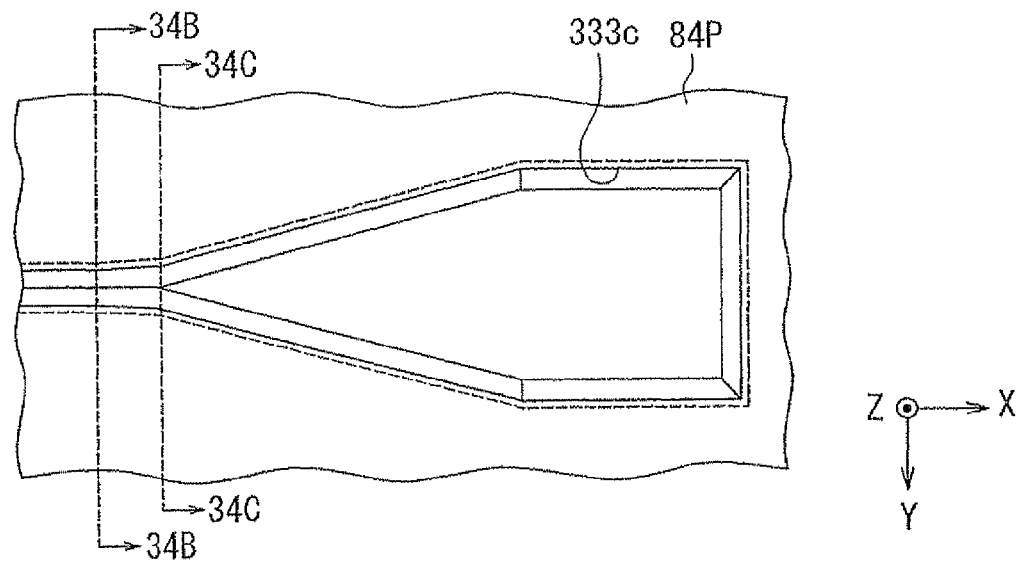
FIG. 34A to FIG. 34C are explanatory diagrams showing a step that follows the step shown in FIG. 33A to FIG. 33C.
Figure 34B:
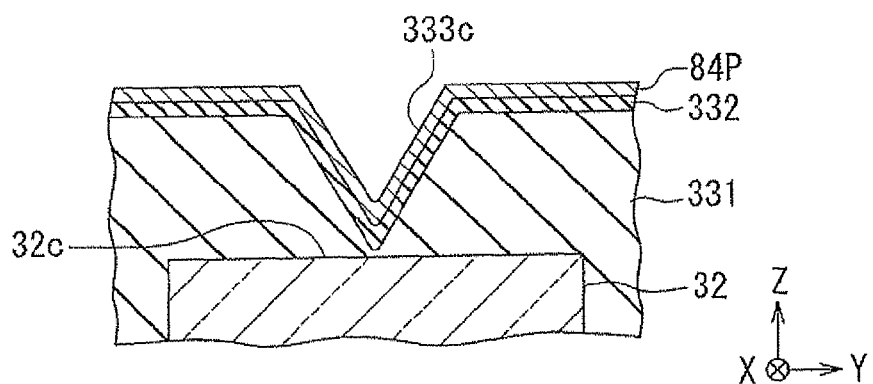
Figure 34C:
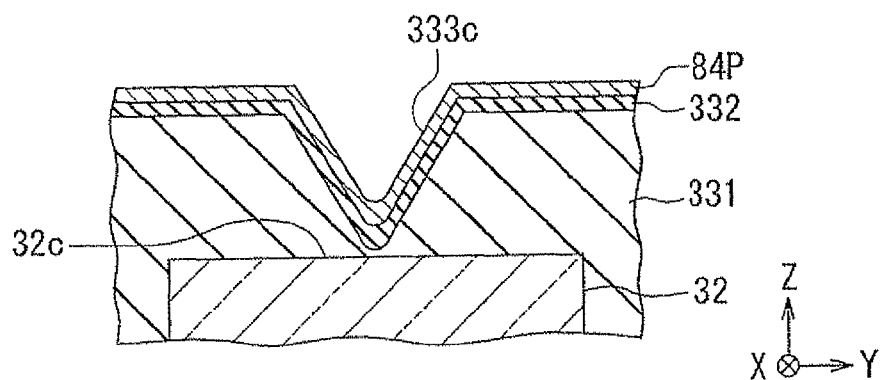

FIG. 34A to FIG. 34C show the next step. In this step, a metal film 84P, which is to become the plasmon generator 84 later, is formed over the entire top surface of the stack shown in FIG. 33A to FIG. 33C. The metal film 84P is formed also in the recess 332c. The stack after the formation of the metal film 84P has a recess 333c for accommodating the plasmon generator 84 to be formed later. Before forming the metal film 84P, as in the first embodiment, an adhesion film may be formed on the dielectric film 332 for the purpose of improving the adhesion of the metal film 84P to the dielectric film 332.

Figure 35A:
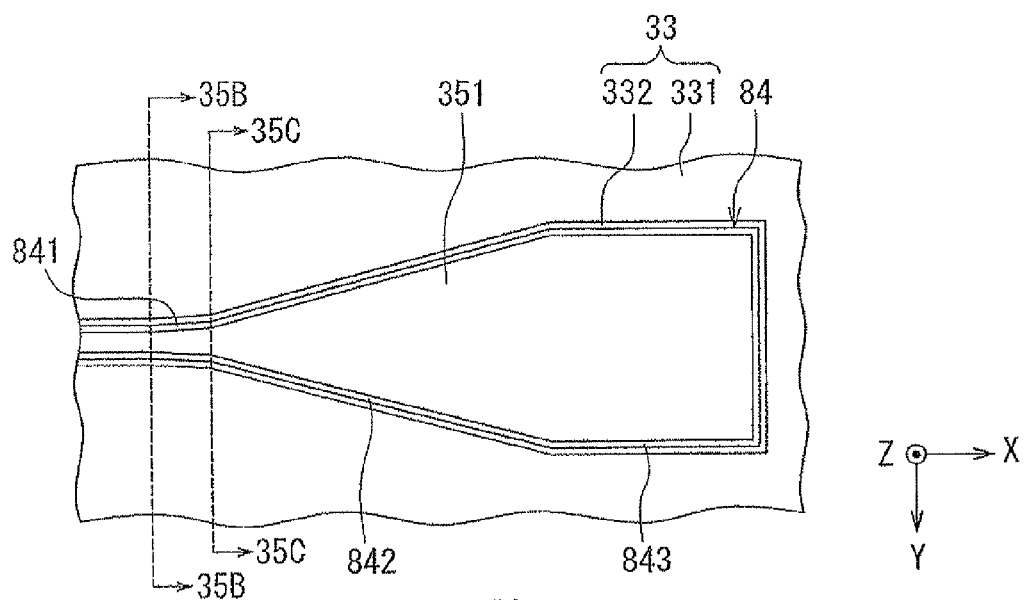
FIG. 35A to FIG. 35C are explanatory diagrams showing a step that follows the step shown in FIG. 34A to FIG. 34C.
Figure 35B:
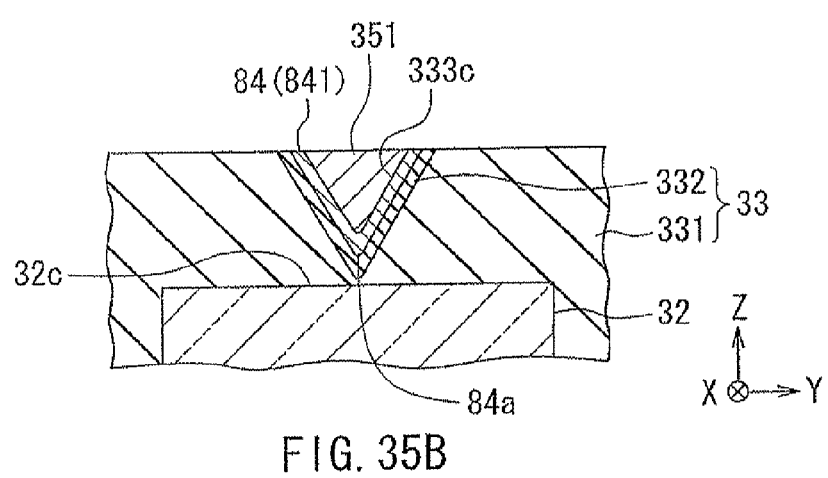
Figure 35C:
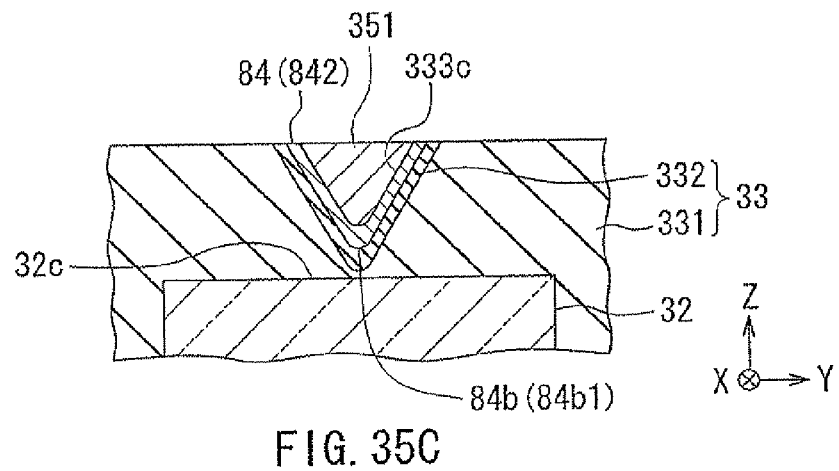

FIG. 35A to FIG. 35C show the next step. In this step, a magnetic film that is to become the first layer 351 of the magnetic pole 35 later is initially formed over the entire top surface of the stack shown in FIG. 34A to FIG. 34C. The magnetic film is formed into a thickness sufficient for at least filling the recess 333c. Next, the metal film 84P and the magnetic film are polished by, for example, chemical mechanical polishing, until the dielectric film 332 or the dielectric layer 331 is exposed. FIG. 35A to FIG. 35C show an example where the metal film 84P and the magnetic film are polished until the dielectric layer 331 is exposed. As a result, the remaining dielectric layer 331 and dielectric film 332 constitute the clad layer 33. A part of the dielectric layer 331 and the dielectric film 332 constitute the buffer part 33A. The metal film 84P becomes the plasmon generator 84. The magnetic film becomes the first layer 351 of the magnetic pole 35.

The effects of the heat-assisted magnetic recording head according to the present embodiment will now be described. In the present embodiment, the plasmon generator 84 includes the shape changing portion 841A in which the radius of curvature of the propagation edge 84a in the cross section parallel to the medium facing surface 12a continuously decreases with decreasing distance to the medium facing surface 12a. Consequently, according to the present embodiment, it is possible to use the laser light propagated through the core 32 with high efficiency and produce near-field light with a small spot diameter from the plasmon generator 84, as with the first embodiment. Such effects will now be described in detail with reference to the results of third and fourth simulations.

A description will initially be given of the result of the third simulation. Like the first simulation on the second embodiment, the third simulation was conducted to examine the relationship between the radius of curvature of the propagation edge and the light use efficiency, and the relationship between the radius of curvature of the propagation edge and the light spot diameter. The third simulation used models including a plasmon generator of a second comparative example. The plasmon generator of the second comparative example had the same configuration as that of the plasmon generator 84 except the shape of the V-shaped portion 841. The V-shaped portion 841 of the plasmon generator of the second comparative example was such that the propagation edge had a constant radius of curvature regardless of the distance from the medium facing surface 12a. The models including the plasmon generator of the second comparative example include one in which the V-shaped portion 841 had a length of 0.1 µm in the X direction, and one in which the V-shaped portion 841 had a length of 0.3 µm in the X direction.

In the third simulation, the angle θ formed between the inclined surfaces 84c1 and 84d1 of the V-shaped portion 841 was 60 degrees. The length of the plasmon generator in the X direction was 1.5 µm. The length of the second portion 842 in the X direction was 0.75 µm. In the plasmon exciting surface 84b, the two sides of the width changing portion 84b1 that are opposite in the direction of the width (the Y direction) formed an angle of 30 degrees therebetween.

In the third simulation, the light use efficiency and the light spot diameter were determined with propagation edges having four types of radii of curvature, 5 nm, 10 nm, 15 nm, and 20 nm. The rest of the condition of the models including the plasmon generator of the second comparative example was the same as that of the model including the plasmon generator of the first comparative example in the second embodiment.

Figure 36:
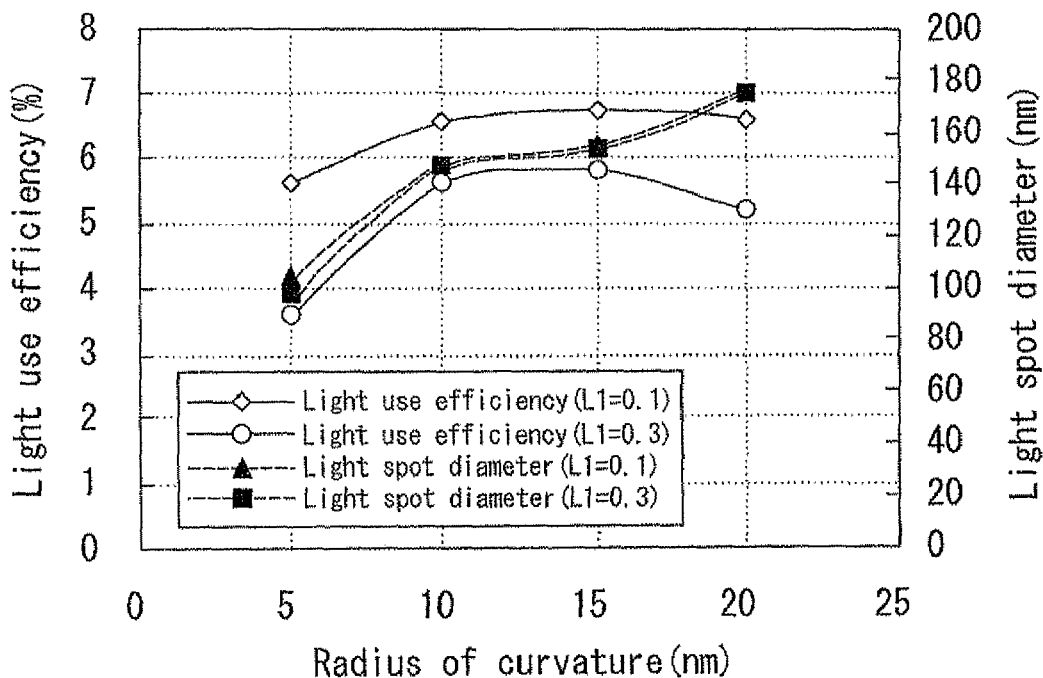
FIG. 36 is a characteristic chart showing the light use efficiency and the spot diameter of the near-field light in a model including a plasmon generator of a second comparative example, determined by a third simulation.

FIG. 36 shows the result of the third simulation. In FIG. 36, the horizontal axis indicates the radius of curvature of the propagation edge. The vertical axis on the left indicates the light use efficiency, and the vertical axis on the right indicates the light spot diameter. The symbol L1 in FIG. 36 represents the length of the V-shaped portion 841 in the X direction.

As shown in FIG. 36, in both the cases where the V-shaped portion 841 has a length of 0.1 μm in the X direction and where the V-shaped portion 841 has a length of 0.3 μm in the X direction, the light use efficiency peaks when the propagation edge has a radius of curvature in the range of 10 nm to 15 nm. As shown in FIG. 36, in both the cases where the V-shaped portion 841 has a length of 0.1 μm in the X direction and where the V-shaped portion 841 has a length of 0.3 μm in the X direction, the light spot diameter decreases with decreasing radius of curvature of the propagation edge. If the radius of curvature of the propagation edge is reduced to below 10 nm in order to reduce the light spot diameter, the light use efficiency drops as compared to when the propagation edge has a radius of curvature in the range of 10 nm to 15 nm.

A description will now be given of the result of the fourth simulation. Like the second simulation on the second embodiment, the fourth simulation was conducted to examine the relationship of the presence/absence of the shape changing portion 841A in the plasmon generator 84 with the light use efficiency and the light spot diameter. In the fourth simulation, the light use efficiency and the light spot diameter were determined by using a model including the plasmon generator of the second comparative example which was used in the third simulation, and a model including the plasmon generator 84 having the V-shaped portion 841 composed of the shape changing portion 841A (hereinafter, referred to as a plasmon generator of a second practical example).

In the fourth simulation, the V-shaped portion of the plasmon generator of second comparative example had a length of 0.1 μm in the X direction. In both the plasmon generator of the second comparative example and the plasmon generator of the second practical example, the angle θ formed between the inclined surfaces 84c1 and 84d1 of the V-shaped portion 841 was changed to 30 degrees, 45 degrees, and 60 degrees. In the plasmon generator of the second practical example, the radius of curvature $R_A$ of the propagation edge 84a at the medium facing surface 12a (the minimum radius of curvature of the propagation edge 84a in the shape changing portion 841A) was 5 nm. The radius of curvature $R_B$ of the propagation edge 84a in the position of the border between the V-shaped portion 841 and the second portion 842 (the maximum radius of curvature of the propagation edge 84a in the shape changing portion 841A) was 15 nm. The rest of the condition of the model including the plasmon generator of the second practical example was the same as that of the model including the plasmon generator of the second comparative example.

Figure 37:
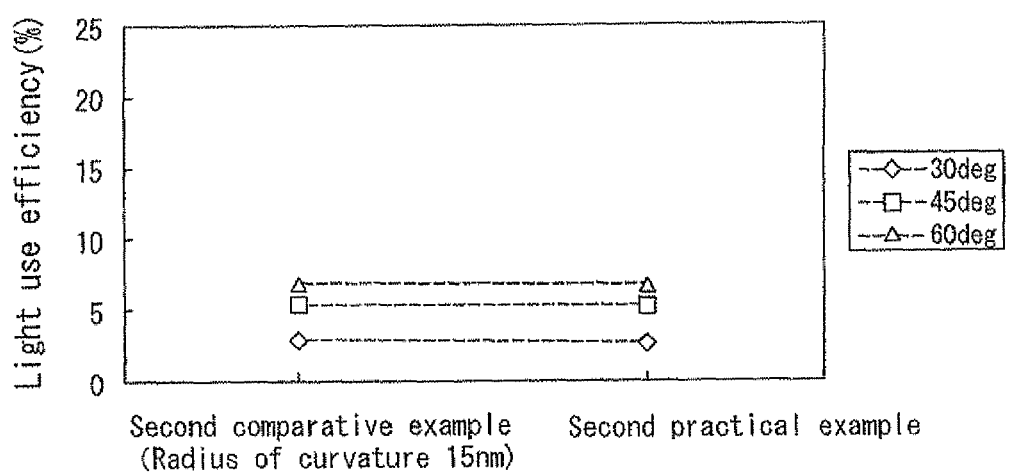
FIG. 37 is a characteristic chart showing the light use efficiency in a model including a plasmon generator of a second practical example and the model including the plasmon generator of the second comparative example, determined by a fourth simulation.
Figure 38:
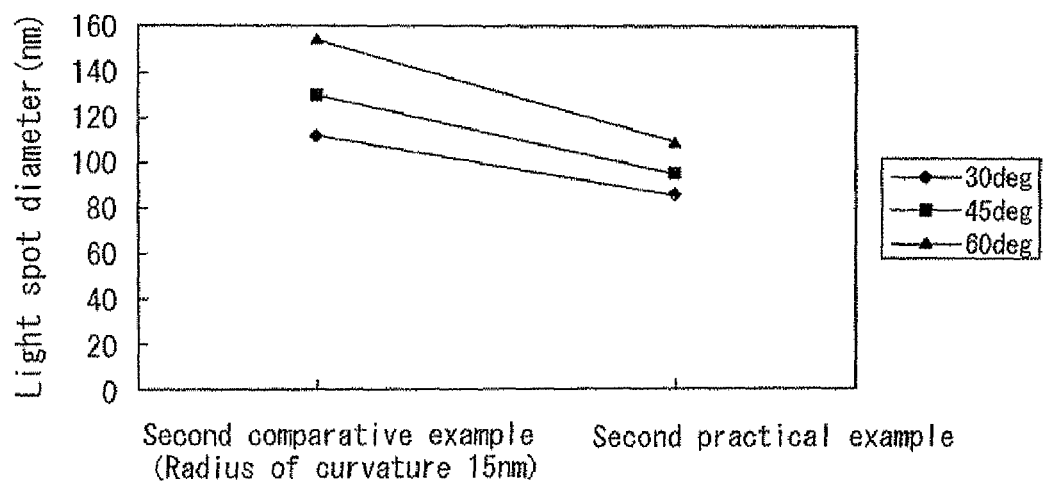
FIG. 38 is a characteristic chart showing the spot diameter of the near-field light in the model including the plasmon generator of the second practical example and the model including the plasmon generator of the second comparative example, determined by the fourth simulation.

FIG. 37, FIG. 38 and Table 2 show the result of the fourth simulation. In FIG. 37, the vertical axis indicates the light use efficiency. In FIG. 38, the vertical axis indicates the light spot diameter. Table 2 shows the light use efficiencies and light spot diameters when the angle θ was 60 degrees.

As shown in Table 2, with the model including the plasmon generator of the second comparative example, the light spot diameter decreases from 154 nm to 105 nm when the radius of curvature of the propagation edge is reduced from 15 nm to 5 nm. With the model including the plasmon generator of the second comparative example, the light use efficiency falls from 6.8% to 5.6% when the radius of curvature of the propagation edge is reduced from 15 nm to 5 nm. In contrast, as shown in FIG. 37 and FIG. 38, the model of the second practical example is capable of providing a light use efficiency equivalent to that of the model of the second comparative example when the propagation edge has a radius of curvature of 15 nm, and also providing a light spot diameter close to that of the model of the second comparative example when the propagation edge has a radius of curvature of 5 nm.

TABLE 2

| | Radius of curvature of propagation edge (nm) | Light use efficiency (%) | Spot diameter of near-field light (nm) |
|---|---|---|---|
| Second comparative example | 5 | 5.6 | 105 |
| | 15 | 6.8 | 154 |
| Second practical example | $R_A = 5$ $R_B = 15$ | 6.7 | 109 |

As can be seen from the results of the foregoing third and fourth simulations, it is possible according to the present embodiment to reduce the light spot diameter and increase the light use efficiency as well. That is, according to the present embodiment, it is possible to use the laser light that is propagated through the core 32 with high efficiency and to produce near-field light with a small spot diameter from the plasmon generator 84.

The other effects of the present embodiment will now be described. In the present embodiment, surface plasmons are excited on the propagation edge 84a and the plasmon exciting surface 84b through coupling with the evanescent light occurring from the evanescent light generating surface 32c of the core 32. The propagation edge 84a faces the evanescent light generating surface 32c with a predetermined distance therebetween and extends in the direction perpendicular to the medium facing surface 12a. The plasmon exciting surface 84b is a flat surface that faces the evanescent light generating surface 32c with a predetermined distance therebetween. Consequently, it is possible to excite more surface plasmons.

The plasmon exciting surface 84b includes the width changing portion 84b1. The width of the width changing portion 84b1 in the direction parallel to the medium facing surface 12a and the evanescent light generating surface 32c (the Y direction) decreases with decreasing distance to the medium facing surface 12a. The surface plasmons excited on the width changing portion 84b1 are gradually transformed into edge plasmons, which are surface plasmons to propagate along the two sides of the width changing portion 84b1 that are opposite in the direction of the width (the Y direction), while propagating over the width changing portion 84b1. The surface plasmons (including edge plasmons) propagating over the width changing portion 84b1 reach the propagation edge 84a, and are transformed into edge plasmons to propagate along the propagation edge 84a. The propagation edge 84a propagates the edge plasmons that are based on the surface plasmons excited on the width changing portion 84b1, and the edge plasmons that are excited on the propagation edge 84a. Those edge plasmons are propagated along the propagation edge 84a to the near-field light generating part 84g.

In the width changing portion 84b1, the propagating plasmons increase in electric field intensity. This is presumably based on the following first and second principles. Initially, a description will be given of the first principle. The wave number of the surface plasmons propagating over the width changing portion 84b1 increases as the width of the width changing portion 84b1 decreases. As the wave number of the surface plasmons increases, the speed of travel of the surface plasmons decreases. This consequently increases the energy density of the surface plasmons and enhances the electric field intensity of the surface plasmons.

Next, a description will be given of the second principle. When the surface plasmons propagate over the width changing portion 84b1, some of the surface plasmons impinge on the two sides of the width changing portion 84b1 that are opposite in the direction of the width (the Y direction) to scatter, thereby generating a plurality of plasmons with different wave numbers. Some of the plurality of plasmons thus generated are transformed into edge plasmons which have a wave number higher than that of the surface plasmons propagating over a flat surface. In this way, the surface plasmons are gradually transformed into the edge plasmons to propagate along the two sides, whereby the edge plasmons gradually increase in electric field intensity. As compared with the surface plasmons propagating over a flat surface, the edge plasmons are higher in wave number and lower in speed of travel. Consequently, the transformation of the surface plasmons into the edge plasmons increases the energy density of the plasmons. In the width changing portion 84b1, the foregoing transformation of the surface plasmons into the edge plasmons is accompanied by the generation of new surface plasmons based on the evanescent light occurring from the evanescent light generating surface 32c. The new surface plasmons are also transformed into edge plasmons. As a result, the edge plasmons increase in electric field intensity. Those edge plasmons are transformed into edge plasmons that propagate over the propagation edge 84a. This generates the edge plasmons of enhanced electric field intensity as compared with the surface plasmons originally generated.

In the width changing portion 84b1, the surface plasmons propagating over the flat surface and the edge plasmons having a wave number higher than that of the surface plasmons coexist. It can be considered that both the surface plasmons and the edge plasmons increase in electric field intensity in the width changing portion 84b1 based on the first and second principles described above. In the width changing portion 84b1, the electric field intensity of the plasmons can thus be enhanced as compared with a case where either one of the first principle and the second principle is in operation.

In the present embodiment, the second portion 842 of the plasmon generator 84 has the bottom part 842A that is shaped like a plate and faces the evanescent light generating surface 32c, and has the two sidewall parts 842B and 842C that are each shaped like a plate. The width of the bottom part 842A in the direction parallel to the medium facing surface 12a and the evanescent light generating surface 32c (the Y direction) decreases with decreasing distance to the medium facing surface 12a. The distance between the two sidewall parts 842B and 842C in the direction parallel to the medium facing surface 12a and the evanescent light generating surface 32c (the Y direction) increases with increasing distance from the evanescent light generating surface 32c, and decreases with decreasing distance to the medium facing surface 12a. The magnetic pole 35 includes the second portion 351B that lies between the two sidewall parts 842B and 842C and is in contact with the bottom part 842A and the two sidewall parts 842B and 842C. The width of the second portion 351B in the direction parallel to the medium facing surface 12a and the evanescent light generating surface 32c (the Y direction) decreases with decreasing distance to the medium facing surface 12a. The magnetic pole 35 includes the first portion 351A accommodated in the V-shaped portion 841. The first portion 351A is located between the medium facing surface 12a and the second portion 351B. According to the present embodiment, it is possible in the second portion 351B to concentrate the magnetic flux passing through the magnetic pole 35 with decreasing distance to the first portion 351A. This makes it possible to produce a high write magnetic field from the end face 35a1.

The remainder of configuration, function and effects of the present embodiment are similar to those of the second embodiment.

The present invention is not limited to the foregoing embodiments, and various modifications may be made thereto. For example, the plasmon generator of the present invention may include a second constant shape portion between the medium facing surface 12a and the shape changing portion. The radius of curvature of the propagation edge in the second constant shape portion is equal to the minimum value of the radius of curvature of the propagation edge in the shape changing portion. According to such a modification example, it is possible to keep the front end face of the plasmon generator constant in shape even if the position of the medium facing surface 12a somewhat varies. This makes it possible to prevent the near-field light generated by the plasmon generator from varying in characteristic due to variations in the position of the medium facing surface 12a.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A heat-assisted magnetic recording head comprising:
a medium facing surface that faces a magnetic recording medium;
a magnetic pole that has an end face located in the medium facing surface and produces a write magnetic field for writing data on the magnetic recording medium;
a waveguide including a core and a clad, the core propagating light; and
a plasmon generator, wherein:
the core has an evanescent light generating surface that generates evanescent light based on the light propagated through the core;
the plasmon generator has an outer surface including a propagation edge, and has a near-field light generating part lying at an end of the propagation edge and located in the medium facing surface, the propagation edge facing the evanescent light generating surface with a predetermined distance therebetween and extending in a direction perpendicular to the medium facing surface;
the propagation edge is arc-shaped in a cross section parallel to the medium facing surface;
a surface plasmon is excited on the propagation edge through coupling with the evanescent light generated from the evanescent light generating surface, the surface plasmon is propagated along the propagation edge to the near-field light generating part, and the near-field light generating part generates near-field light based on the surface plasmon; and
the plasmon generator includes a shape changing portion in which a radius of curvature of the propagation edge in the cross section parallel to the medium facing surface continuously decreases with decreasing distance to the medium facing surface.

2. The heat-assisted magnetic recording head according to claim 1, wherein the radius of curvature of the propagation edge at the medium facing surface is equal to a minimum value of the radius of curvature of the propagation edge in the shape changing portion.

3. The heat-assisted magnetic recording head according to claim 2, wherein the shape changing portion has an end located in the medium facing surface.

4. The heat-assisted magnetic recording head according to claim 1, wherein the outer surface of the plasmon generator further includes a front end face located in the medium facing surface, the front end face including a tip that forms the near-field light generating part.

5. The heat-assisted magnetic recording head according to claim 4, wherein:
the plasmon generator has a V-shaped portion including the propagation edge and the front end face, the V-shaped portion being V-shaped in cross section parallel to the medium facing surface; and
the magnetic pole includes a portion accommodated in the V-shaped portion.

6. The heat-assisted magnetic recording head according to claim 5, wherein:
the plasmon generator further has a bottom part that is shaped like a plate and faces the evanescent light generating surface, and two sidewall parts that are each shaped like a plate and are located farther from the evanescent light generating surface than is the bottom part, the two sidewall parts being connected to opposite ends of the bottom part in a direction parallel to the medium facing surface and the evanescent light generating surface;
the bottom part has a width that decreases with decreasing distance to the medium facing surface, the width being in the direction parallel to the medium facing surface and the evanescent light generating surface;
a distance between the two sidewall parts in the direction parallel to the medium facing surface and the evanescent light generating surface increases with increasing distance from the evanescent light generating surface, and decreases with decreasing distance to the medium facing surface;
the bottom part and the two sidewall parts are located farther from the medium facing surface than is the V-shaped portion, such that the bottom part and the two sidewall parts are continuous with the V-shaped portion; and
the magnetic pole includes a portion that is accommodated in a space formed by the bottom part and the two sidewall parts so as to be in contact with the bottom part and the two sidewall parts.

7. The heat-assisted magnetic recording head according to claim 1, further comprising a buffer part that is located between the evanescent light generating surface and the propagation edge and has a refractive index lower than that of the core.

8. A head gimbal assembly comprising: the heat-assisted magnetic recording head according to claim 1; and a suspension that supports the heat-assisted magnetic recording head.

9. A magnetic recording device comprising: a magnetic recording medium; the heat-assisted magnetic recording head according to claim 1; and a positioning device that supports the heat-assisted magnetic recording head and positions the heat-assisted magnetic recording head with respect to the magnetic recording medium.

* * * * *